United States Patent
Komine et al.

(10) Patent No.: US 10,172,081 B2
(45) Date of Patent: Jan. 1, 2019

(54) INFORMATION PROCESSING SYSTEM AND INFORMATION PROCESSING METHOD

(71) Applicants: Yoshitaka Komine, Kanagawa (JP); Takehito Kuroko, Kanagawa (JP); Masayuki Osugi, Tokyo (JP)

(72) Inventors: Yoshitaka Komine, Kanagawa (JP); Takehito Kuroko, Kanagawa (JP); Masayuki Osugi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 15/057,225

(22) Filed: Mar. 1, 2016

(65) Prior Publication Data

US 2016/0269989 A1  Sep. 15, 2016

(30) Foreign Application Priority Data

Mar. 10, 2015  (JP) ................................ 2015-046762
Feb. 1, 2016  (JP) ................................ 2016-017487

(51) Int. Cl.
*H04W 48/20* (2009.01)
*H04L 29/06* (2006.01)
(Continued)

(52) U.S. Cl.
CPC ......... *H04W 48/20* (2013.01); *H04L 63/0876* (2013.01); *H04L 63/102* (2013.01);
(Continued)

(58) Field of Classification Search
CPC ..... H04W 12/08; H04W 48/20; H04W 48/16; H04W 40/248; H04W 84/12; H04L 63/0876; H04L 63/102
See application file for complete search history.

(56) References Cited

U.S. PATENT DOCUMENTS 8,370,670 B2  2/2013  Yamashiro
8,966,244 B2  2/2015  Kuroko et al.
(Continued)

FOREIGN PATENT DOCUMENTS

EP  2605176  6/2013
EP  2750425  7/2014
(Continued)

OTHER PUBLICATIONS

Extended European Search Report dated Jul. 1, 2016.

*Primary Examiner* — Rebecca E Song
*Assistant Examiner* — Nourali Mansoury
(74) *Attorney, Agent, or Firm* — IPUSA, PLLC

(57) ABSTRACT

An information processing system transmits, via a first network, connection information for a second network that is different from the first network to a plurality of terminal apparatuses; carries out communications with the terminal apparatuses via the second network based on the transmitted connection information; stores respective items of terminal identification information for the terminal apparatuses, with which the communications are carried out via the second network; determines whether the terminal apparatuses that are identified by the stored items of terminal identification information can carry out communications via the second network; and, when determining that the terminal apparatuses cannot carry out communications via the second network, carries out such control as to prevent the second network from being used to carry out communications.

17 Claims, 51 Drawing Sheets

(51) Int. Cl.
*H04W 12/08* (2009.01)
*H04W 40/24* (2009.01)
*H04W 48/16* (2009.01)
*H04W 84/12* (2009.01)

(52) U.S. Cl.
CPC ......... *H04W 12/08* (2013.01); *H04W 40/248* (2013.01); *H04W 48/16* (2013.01); *H04W 84/12* (2013.01)

(56) References Cited

U.S. PATENT DOCUMENTS

| | | | |
|---|---|---|---|
| 2003/0233332 A1* | 12/2003 | Keeler | G06Q 20/206 705/64 |
| 2006/0086788 A1* | 4/2006 | Zhang | H04N 1/00204 235/382 |
| 2007/0250717 A1 | 10/2007 | Kumagai et al. | |
| 2009/0077169 A1 | 3/2009 | Ikeura et al. | |
| 2013/0243467 A1 | 9/2013 | Yamanishi et al. | |
| 2013/0278631 A1* | 10/2013 | Border | G02B 27/017 345/633 |
| 2014/0068719 A1 | 3/2014 | Kiukkonen et al. | |
| 2014/0089182 A1* | 3/2014 | Short | H04L 63/08 705/40 |
| 2014/0280725 A1* | 9/2014 | Kasatani | H04L 67/02 709/217 |
| 2016/0056879 A1* | 2/2016 | Shimomoto | H04W 12/08 370/315 |

FOREIGN PATENT DOCUMENTS

| | | |
|---|---|---|
| JP | 2005-117458 | 4/2005 |
| JP | 2005-216260 | 8/2005 |
| JP | 2006-173786 | 6/2006 |
| JP | 2008-022281 | 1/2008 |
| JP | 2008-065839 | 3/2008 |
| JP | 2009-220334 | 10/2009 |
| WO | 2006/106393 | 10/2006 |

\* cited by examiner

FIG.6

| CONFERENCE NAME | CONFERENCE ROOM | TIME | WIRELESS APPARATUS | ADMINISTRATOR | PARTICIPANT | SSID | PASSWORD | SHARED AREA PATH |
|---|---|---|---|---|---|---|---|---|
| CONFERENCE A | CONFERENCE ROOM 1 | 13:00-14:00 | MS1 | A | B, C, D, E | ab1234 | xxxxx | ¥12¥** |
| CONFERENCE B | CONFERENCE ROOM 2 | 13:00-15:00 | MS2 | H | I, J, K, L | cd1234 | yyyyy | ¥34¥** |
| CONFERENCE C | CONFERENCE ROOM 3 | 14:00-14:30 | MS3 | P | Q, R, S | ef3456 | zzzzz | ¥12¥aa |
| | | | | | | | | |

| CONFERENCE ROLE | DEFAULT | USER LIST ACQUISITION | USER CHANGE | APPARATUS LIST ACQUISITION | APPARATUS CHANGE | USE OF APPARATUS X | USE OF APPARATUS Y | USE OF APPARATUS Z | ... | DATA PROVISION | DATA READING | DATA EDITING |
|---|---|---|---|---|---|---|---|---|---|---|---|---|
| CONFERENCE ADMINISTRATOR | O | O | O | O | O | O | O | O | O | O | O | O |
| ATTENDANT | | O | | O | | O | O | O | | O | O | |
| HEARER | | | | | | O | | | | | | |
| CHAIRPERSON | | O | | O | | | | | | | | |
| RECORDER | | O | | | | | | O | | | O | |
| ... | | | | | | | | | | | | |

DB2

| PARTICIPANT | TERMINAL ID | VALID/INVALID | ACCESS LEVEL |
|---|---|---|---|
| PARTICIPANT A | xxx-xxx-xxx | VALID | CONFERENCE ADMINISTRATOR |
| PARTICIPANT B | xxx-xxx-xxx | VALID | ATTENDANT |
| PARTICIPANT C | xxx-xxx-xxx | VALID | HEARER |
| PARTICIPANT D | xxx-xxx-xxx | VALID | CHAIRPERSON |
| PARTICIPANT E | xxx-xxx-xxx | INVALID | RECORDER |
| ... | | | |

FIG.15

| No. | USER | USER TERMINAL IDENTIFIER | AUTHORITY |
|---|---|---|---|
| 1 | Abcd Efgh | one | CONFERENCE RESPONSIBLE PERSON |
| 2 | Ijklm Nopq | two | CONFERENCE PARTICIPANT |
| 3 | Rstuv Wxyz | three | CONFERENCE PARTICIPANT |

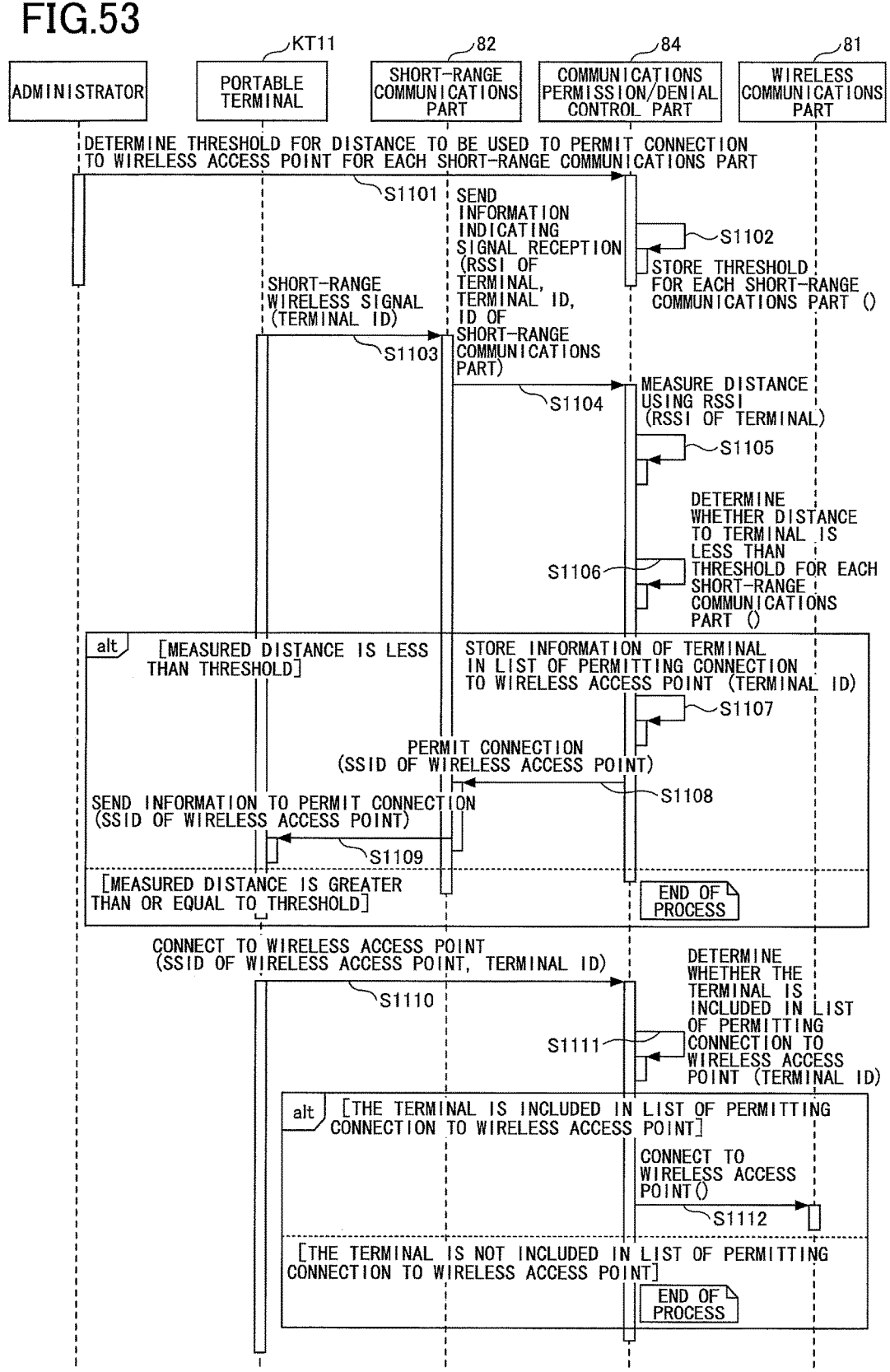

INFORMATION PROCESSING SYSTEM AND INFORMATION PROCESSING METHOD

CROSS-REFERENCE TO RELATED APPLICATIONS

The present patent application is based on and claims the benefit of priority of Japanese Priority Application No. 2015-046762, filed on Mar. 10, 2015, and Japanese Priority Application No. 2016-017487, filed on Feb. 1, 2016, the entire contents of which are hereby incorporated herein by reference.

BACKGROUND

1. Technical Field

The present disclosure relates to an information processing system and an information processing method. In particular, the present invention relates to an information processing system and an information processing method, for managing digitized information (data).

2. Description of the Related Art

Recently, digitization has been improved and various data (information) has been digitized to be used for various uses, and it becomes an essential problem to keep security of digitized electronic data.

A conference in a company or the like has been carried out using, as a conference system, an information processing system where a copying apparatus, a multifunction peripheral apparatus, a printer apparatus, an electronic blackboard, a projector, and/or the like, are connected to a network.

In such a conference, a wireless access point is connected to the network, to which electronic apparatuses are connected, users (company employees, or the like) who participate in the conference carry their portable terminals that have communications functions and portability, such as tablets, smartphones, notebook-type personal computers, and/or the like. The users use the access point, the network, the electronic apparatuses in the network, memories that the electronic apparatuses have, and so forth, for data provision, reception, display, editing, and/or the like.

In the related art, data security management is achieved in such a manner that, access to data that is stored in an electronic apparatus connected to a network is permitted when a user, for whom a password (authentication information) for accessing the electronic apparatus is previously registered, inputs the password (see Japanese Laid-Open Patent Application No. 2005-216260).

When a wireless terminal is connected to a wireless network using Wi-Fi (Wireless Fidelity) or the like, the security concerning connection to the network is ensured by using a Service Set Identifier (SSID) as connection information and passwords that are previously registered in a network management apparatus or an access point.

In such an information processing system in the related art, after access is permitted, it is possible to access all the electronic apparatuses connected to a network. Thus, it is possible to read, edit, and so forth, of the data stored in the electronic apparatuses.

SUMMARY

According to one aspect, an information processing system includes at least one communications apparatus. The information processing system includes at least one processor, and the at least one processor transmit, via a first network, connection information for a second network that is different from the first network to a plurality of terminal apparatuses; carry out communications with the terminal apparatuses via the second network based on the transmitted connection information; store respective items of terminal identification information of the terminal apparatuses, with which the communications are carried out via the second network; determine whether the terminal apparatuses that are identified by the stored items of terminal identification information can carry out communications via the second network; and, when determining that the terminal apparatuses cannot carry out communications via the second network, carry out such control as to prevent the second network from being used to carry out communications.

Other objects, features, and advantages will become more apparent from the following detailed description when read in conjunction with the accompanying drawings.

BRIEF DESCRIPTION OF THE DRAWINGS

FIG. 6 illustrates one example of a conference information database;

FIG. 7 illustrates one example of a conference access authority database;

FIG. 15 illustrates one example of a user list;

FIG. 53 is a sequence diagram illustrating a process of controlling communications permission/denial.

DETAILED DESCRIPTION OF EMBODIMENTS

In the above-described configuration, connection information for wireless connection and authentication information such as passwords are previously registered for each user, for whom access is permitted, and the connection information and the authentication information are previously sent to the users.

Thus, it is necessary to previously register and send the connection information and the authentication information such as passwords for wireless connection to each user, for whom access is permitted. Thus, work to previously send the information to the users is needed, and thus, the convenience is not satisfactory.

An object of the present disclosure is to enable carrying out wireless connection to electronic apparatuses connected to a network in a state of improving the convenience while ensuring the security.

Below, preferable embodiments will be described with reference drawings. The embodiments described below are preferable embodiments, and thus, various technically desirable features are included. However, embodiments are not limited thereto, and all the features illustrated for the embodiments are not essential.

Figure 1:
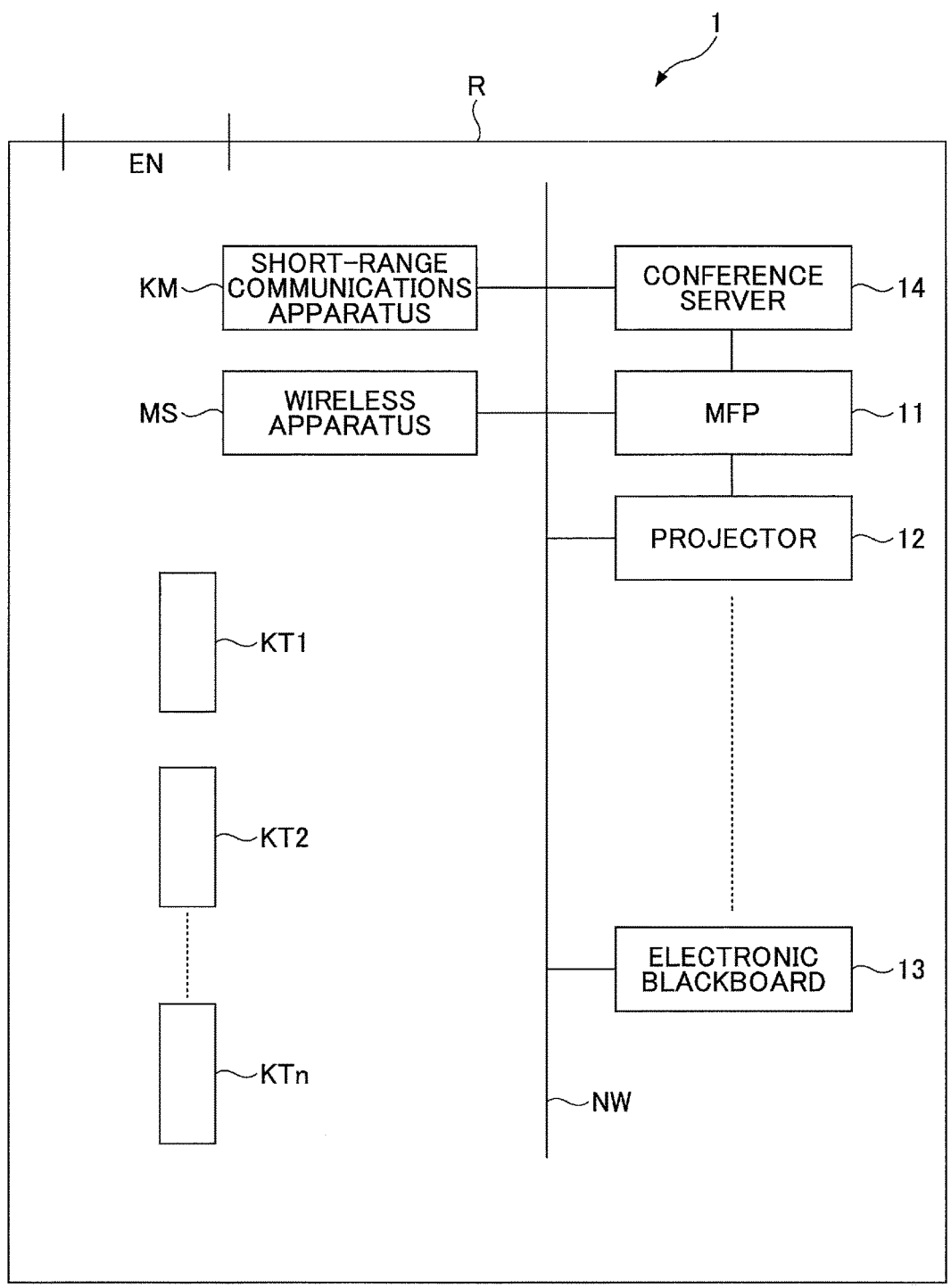
FIG. 1 is a configuration diagram of a conference system according to a first embodiment.

FIGS. 1-50 illustrate an information processing system and an information processing method according to a first embodiment. FIG. 1 is a block configuration diagram illustrating a conference system 1, in which an information processing system and an information processing method according to the first embodiment are implemented.

As shown in FIG. 1, according to the conference system 1, a wired or wireless network (the first network) NW such as a Local Area Network (LAN) is provided in a conference room R. The conference room R has a doorway EN, through which users who use the conference room R enter. Using the doorway EN, users who carry portable terminals KT1 through KTn such as tablets, smartphones, notebook-type personal computers, or the like, enter the conference room R.

In the conference system 1, electronic apparatuses DK such as a MultiFunction Peripheral (MFP) 11, a projector 12, an electronic blackboard 13, a conference server 14, and so forth, are connected to the network NW, and also, a short-range communications apparatus KM and a wireless apparatus MS are connected to the network NW.

Figure 2:
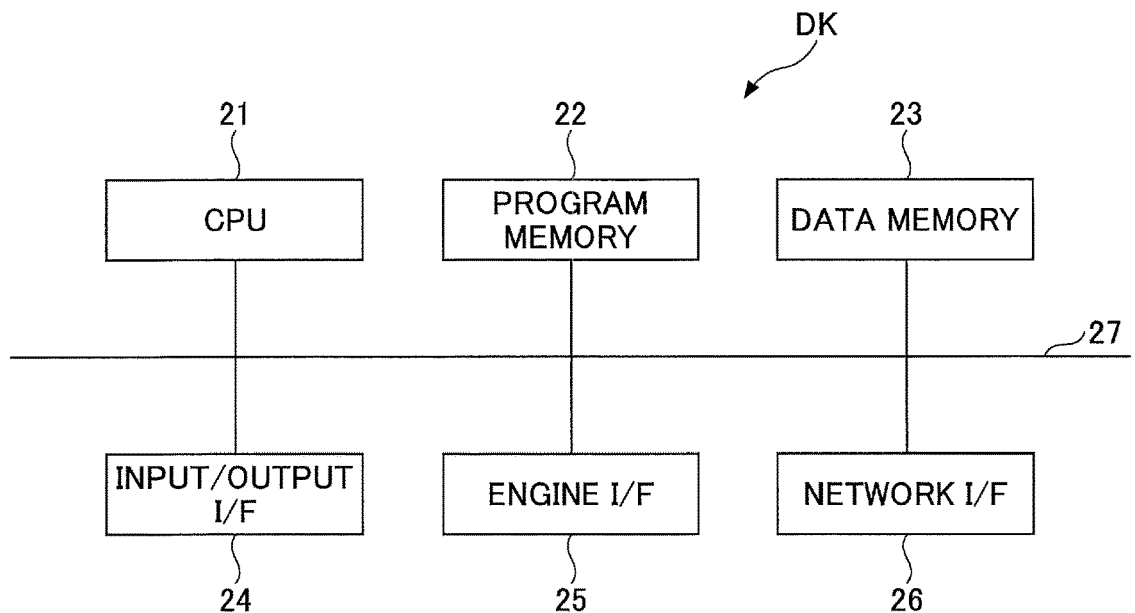
FIG. 2 is a block configuration diagram of an electronic apparatus.

Generally speaking, each electronic apparatus DK has a hardware block configuration as shown in FIG. 2. The electronic apparatus DK has a Central Processing Unit (CPU) 21, a program memory 22, a data memory 23, an input/output interface (I/F) 24, an engine I/F 25, a network I/F 26, and so forth. The respective devices/elements are connected via a bus 27.

The program memory 22 is implemented by a Read Only Memory (ROM) or the like, and stores a basic program and necessary system data for the electronic apparatus DK. Also, the program memory 22 stores an information processing program that causes the electronic apparatus DK to carry out a corresponding part of an information processing method when the data memory 23 of the electronic apparatus DK stores data to be shared by the portable terminals KT1 through KTn.

The data memory 23 is implemented by a Random Access Memory (RAM), a hard disk drive, a Solid State Drive (SSD), or the like, and is used as a work memory and a memory to store data by the CPU 21. The data memory 23 stores data that is processed by the electronic apparatus DK, for example, image data of the MFP 11, projection data of the projector 12, image data of the electronic blackboard 13, and so forth. Also, the data memory 23 can store shared data to be shared by the portable terminals KT1 through KTn according to the information processing method. In this case, the data memory 23 has a folder dedicated for the shared data (hereinafter, which may be referred to as a "shared storage area"), and the shared data is stored only in the shared storage area.

The CPU 21 controls the respective parts of the electronic apparatus DK, based on the program in the program memory 22, and carries out a basic process of the electronic apparatus DK. Also, when the program memory 22 stores the information processing program, the CPU 21 executes the corresponding part of the information processing method, which is to be executed by the electronic apparatus DK based on the information processing program. According to the information processing method, for example, the CPU 21 discloses only the shared storage area of the data memory 23 to other electronic apparatuses DK, and/or the portable terminals KT1 through KTn, and controls access to data depending on user levels that will be described later.

Hardware keys, software keys, an input device to input a sound or the like, and an output device such as a liquid crystal display are connected to the input/output I/F 24. The input/output I/F 24 outputs a command that is input via the input device to the CPU 21, and outputs information that is output by the CPU 21, via the output device.

Engines depending on the type of each particular electronic apparatus DK are connected to the engine I/F 25. For example, when the electronic apparatus DK is the MFP 11, a printer engine, a scanner engine, a facsimile engine, and so forth, are connected to the engine I/F 25. The engine I/F 25 transfers engine control signals and data between the CPU 21 and the engines, so that the engines are driven, and signals that indicate the operation states of the engines and data are output to the CPU 21.

The network I/F 26 is connected to the network NW. Under the control of the CPU 21, the network I/F 26 transfers signals between apparatuses in the network NW, for example, the conference server 14, the other electronic apparatuses DK and the wireless apparatus MS, and carries out communications with the other apparatuses via the network NW.

Figure 3:
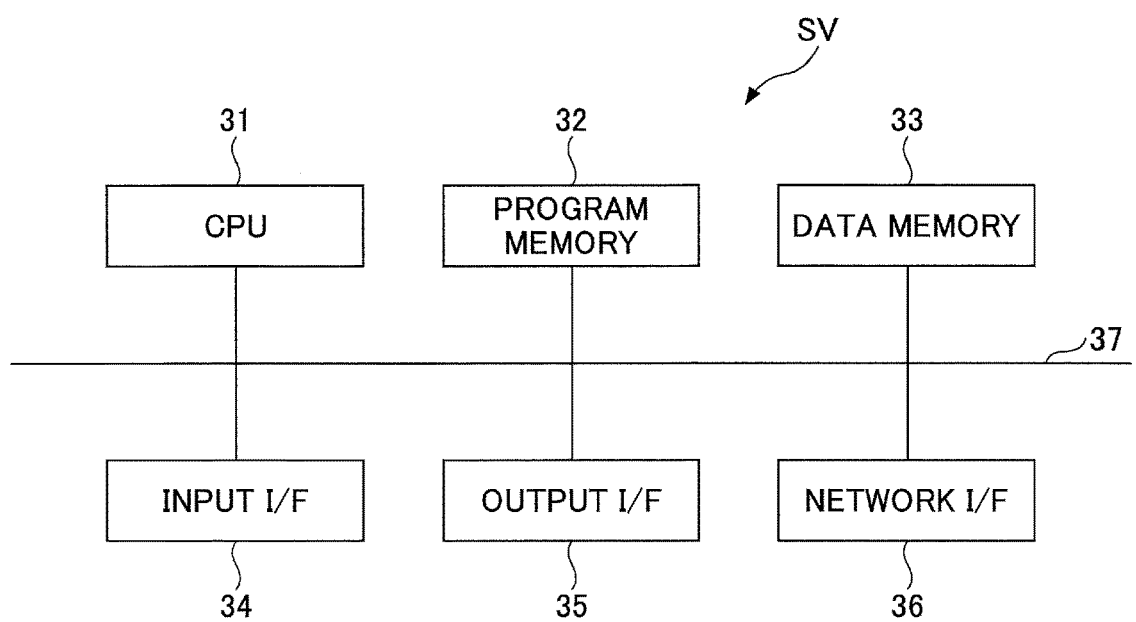
FIG. 3 is a block configuration diagram of a conference server.

The conference server 14 includes, as shown in FIG. 3, a CPU 31, a program memory 32, a data memory 33, an input I/F 34, an output I/F 35 and a network I/F 36. The respective parts are connected via a bus 37.

The program memory 32 is implemented by a ROM or the like, and stores a basic program and necessary system data for the conferenced server 14. Also, when the conference server 14 controls connection of the portable terminals KT1 through KTn or provides the shared storage area according to the information processing method, the program memory 32 stores an information processing program, which is used to cause the conference server 14 to execute the corresponding part of the information processing method.

The data memory 33 is implemented by a RAM, a hard disk drive, a SSD, or the like, and is used as a work memory and a memory to store data by the CPU 31. The data memory 33 stores data to be stored by the conference server 14. Also, the data memory 33 can store data to be shared by the portable terminals KT1 through KTn according to the information processing method. In this case, the data memory 33 has a folder (the shared storage area) dedicated for the shared data, and stores the shared data only in the shared storage area.

The CPU 31 controls the respective parts of the conference server 14 based on the program in program memory 32, and carries out a basic process of the conference server 14. Also, when the program memory 32 stores the information processing program, the CPU 31 carries out the corresponding part of the information processing method to be executed by the conference server 14 based on the information processing program. The CPU 31, for example, discloses only the shared storage area of the data memory 33 to the electronic apparatuses DK and the portable terminals KT1 through KTn according to the information processing method, and controls access to data depending on the user levels.

Hardware keys, software keys, an input device to input a sound or the like, and an output device such as a liquid crystal display are connected to the input I/F 34. The input/output I/F 34 outputs a command that is input via the input device to the CPU 31.

Output devices such as a liquid crystal display device and a printer apparatus are connected to the output I/F 35. The output I/F 35 outputs output information from the CPU 31 via the output devices.

The network I/F 36 is connected to the network NW. The network I/F 36 transfers signals among the apparatuses in the network NW, for example, the electronic apparatuses DK, the wireless apparatus MS and the short-range communications apparatus KM, under the control of the CPU 31, and carries out communications with the other apparatuses via the network NW.

Figure 4:
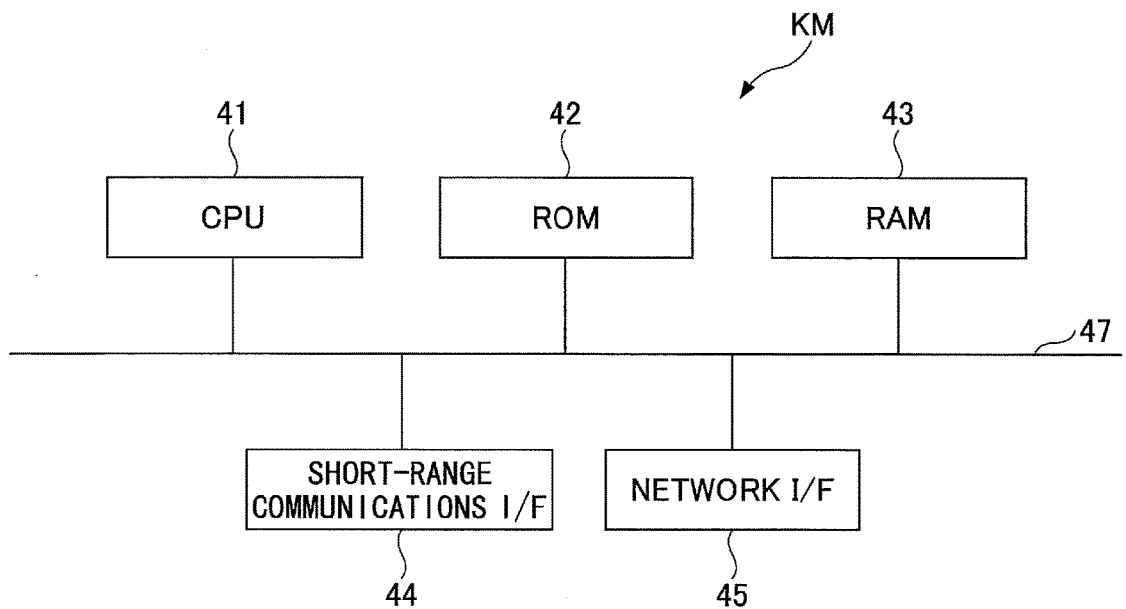
FIG. 4 is a block configuration diagram of a short-range communications apparatus.

The short-range communications apparatus KM includes, as shown in FIG. 4, a CPU 41, a ROM 42, a RAM 43, a short-range communications I/F 44 and a network I/F 45. The respective parts are connected via a bus 46.

The ROM 42 stores a program and system data for the short-range communications apparatus KM.

The RAM 43 is used as a work memory and a data memory by the CPU 41. The RAM 43 stores, under the control of the CPU 41, an SSID, described later, as authentication information for each conference (i.e., each predetermined communications unit). The SSID for the conference is deleted when the conference is finished.

The ROM 42 or the RAM 43 stores the Internet Protocol Address (IP address) of the wireless apparatus MS, which is read under the control of the CPU 41.

A short-range communications device such as that of Bluetooth (registrar trademark), Near Field Communications (NFC), or the like, is connected to the short-range communications I/F 44. Under the control of the CPU 41, the short-range communications I/F 44 carries out communications with ones of the portable terminals KT1 through KTn, which are present within a communications range narrower than the communications range of the wireless apparatus MS. The short-range communications I/F 44 causes the short-range communications device to transmit the SSID and the IP address as wireless communications information ("communications information"), which are given by the CPU 41, necessary to carry out communications with the wireless apparatus MS. Also, the short-range communications I/F 44 receives the terminal identification information of the portable terminals KT1 through KTn transmitted by the portable terminals KT1 through KTn, and transfers it to the CPU 41. That is, the short-range communications I/F 44 carries out communications with the portable terminals KT1 through KTn via short-range wireless communications (the first network).

The network I/F 45 is connected to the network NW. The network I/F 45 transfers signals between the apparatuses in the network NW, for example, the conference server 14, the electronic apparatuses DK and the wireless apparatus MS, under the control of the CPU 41, and carries out communications with the other apparatuses via the network NW.

The CPU 41 acquires, for each conference, the SSID to be set to the access point of the wireless apparatus MS, from the wireless apparatus MS via the network NW and the network I/F 45, and stores it in the RAM 43. The CPU 41 sends, to the short-range communications device connected to the short-range communications I/F 44, the SSID and the IP address of the wireless apparatus MS stored in the RAM 43, as communications information. Also, the CPU 41 transmits the terminal identification information of the portable terminals KT1 through KTn received via the short-range communications I/F 44 to the wireless apparatus MS via the network I/F 45. When the conference is finished, the CPU 41 deletes the SSID for the conference stored in the RAM 43. The SSID for each conference can be stored in the wireless apparatus MS, or can be stored in the conference server 14. For simplifying the description, it is assumed that the SSID for each conference is stored in the wireless apparatus MS according to the first embodiment.

Figure 5:
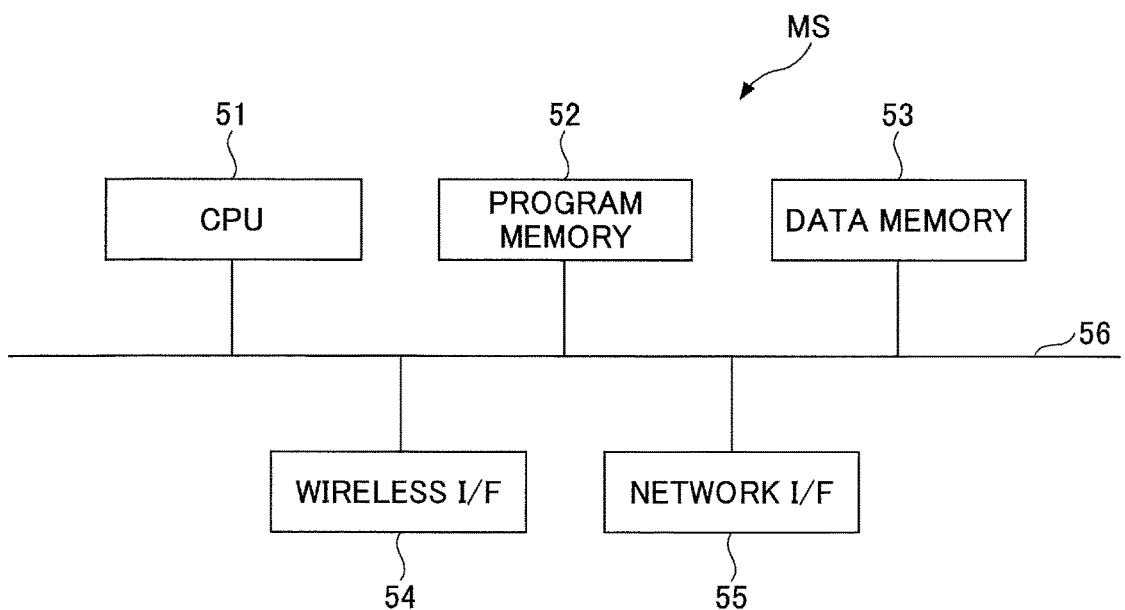
FIG. 5 is a block configuration diagram of a wireless apparatus.

The wireless apparatus MS includes, as shown in FIG. 5, a CPU 51, a program memory 52, a data memory 53, a wireless I/F 54 and a network I/F 55. The respective parts are connected via a bus 56.

The program memory 52 stores a program and system data for the wireless apparatus MS, and also, stores an information processing program for a part of the information processing method to be executed by the wireless apparatus MS.

The data memory 53 is used as a work memory and a data memory by the CPU 51, and also, stores various data necessary to implement the information processing method. Also, the data memory 53, under the control of the CPU 51, stores the SSID and the IP address as communications information for each conference, described later. When a conference is finished, the SSID for the conference is deleted.

The program memory 52 or the data memory 53 stores the IP address of the own apparatus, i.e., the wireless apparatus MS, which is read under the control of the CPU 51, used for carrying out wireless communications, and transmitted to the short-range communications apparatus KM.

The data memory 53 stores, for example, a conference information database DB1, as shown in FIG. 6. Under the control of the CPU 51, the data memory 53 registers, in the conference information database DB1, conference information for each conference such as a conference room R, a time (a conference time), the wireless apparatus MS, a person who holds the conference, participants, the SSID, the IP address (password), and a path for the shared storage area.

Also, the data memory 53 stores, for example, as shown in FIG. 7, default access authority for data used in the conference and the electronic apparatus DK, in a conference access authority databased DB2. In the conference access authority database DB2, for roles in the conference such a conference administrator, attendants, hearers, a chairperson, a recorder, and so forth, access authority is registered for various types of access such as default, user list acquisition, user change, apparatus list acquisition, apparatus change, use of each apparatus (use of the apparatus X, . . . ), data provision, data reading, data editing, and so forth. Also, in the data memory 53, a user terminal database is registered where the respective items of terminal identification information of the portable terminals KT1 through KTn and the users of the portable terminals KT1 through KTn are associated with each other.

Figure 8:
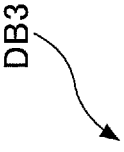
FIG. 8 illustrates one example of a conference participant access authority database.

Further, after the conference has been started, when the short-range communications apparatus KM transmits the received terminal identification information of the portable terminals KT1 through KTn, the CPU 51 creates, as shown in FIG. 8, a conference participant access authority database DB3, in the data memory 53. In the conference participant access authority database DB3, as shown in FIG. 8, the conference participants, the terminal identification information (the terminal IDs (identifications), participation being permitted or denied (valid/invalid), and the access levels (for the conference participants, the attendants, the hearers, the chairperson, the recorder, and so forth) are registered. If the CPU 51 receives the terminal identification information from the short-range communications apparatus KM, it reads the conference information database DB1 and the user terminal database, and carries out registration in the conference participant access authority database DB3 as shown in FIG. 8.

A wireless communications device that uses Wi-Fi or such is connected to the wireless I/F 54. Under the control of the CPU 51, the wireless I/F 54 carries out communications with the portable terminals KT1 through KTn, using wireless communications (a second network) which have a communications range that is wider than that of the short-range communications apparatus KM but is a relatively short-distance communications range.

The network I/F 55 is connected to the network NW. the network I/F 55 transfers signals, under the control of the CPU 51, between the apparatuses in the network NW, for example, the conference server 14, the electronic apparatuses DK and the short-range communications apparatus KM, and carries out communications with the other apparatuses via the network NW.

The CPU 51 sets the SSID and the IP address stored in the RAM 43 as an access point for each conference, and causes the network device connected to the wireless I/F 54 to carry out wireless communications using the SSID and the IP address. The CPU 51 sets the SSID for each conference, stores it in the RAM 43, and sends the information of the SSID and the IP address to the short-range communications apparatus KM via the network I/F 55. After the conference is finished, the CPU 51 deletes the SSIDs for the conference stored in the memory 53. Also, the CPU 51 sends information that the conference is finished to the short-range communications apparatus KM, and causes it to delete the SSID and the IP address for the conference.

Figure 9:
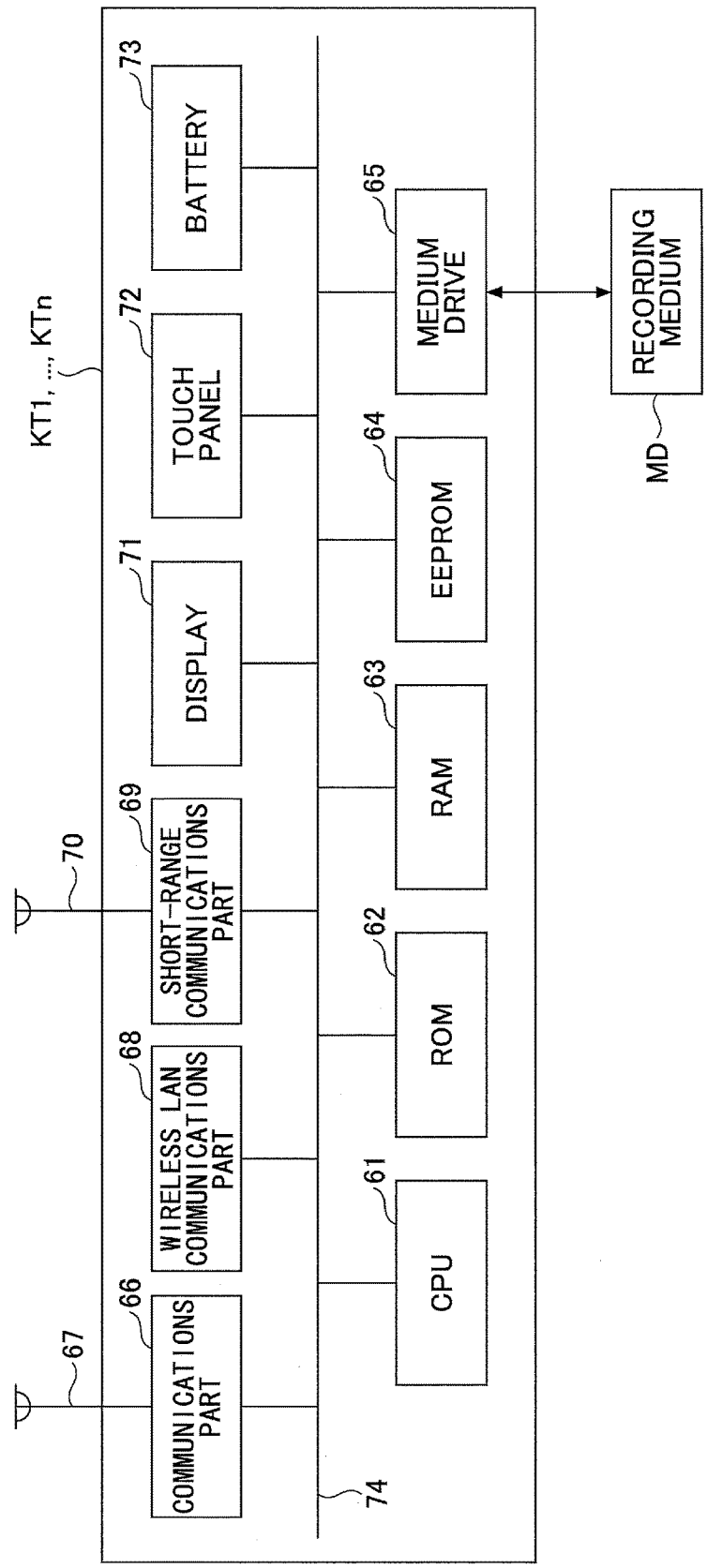
FIG. 9 is a block configuration diagram of a portable terminal.

Each of the portable terminals KT1 through KTn includes, as shown in FIG. 9, a CPU 61, a ROM 62, a RAM 63, an EEPROM (Electrically Erasable Programmable Read-Only Memory) 64, a medium drive 65, a communications part 66, a communications antenna 67, a wireless LAN communications part 68, a short-range communications part 69, a short-range communications antenna 70, a display 71, a touch panel 72 and a battery 73. The respective parts are connected via a bus 74.

The ROM 62 stores a basic program and system data for the corresponding one of the portable terminals KT1 through KTn, and also, stores an information processing program corresponding to a part of the information processing method to be executed by the corresponding one of the portable terminals KT1 through KTn.

The RAM 63 is used as a work memory of the CPU 61, and stores various data.

The EEPROM 64 is a nonvolatile memory that holds stored contents even after the power of the corresponding one of the portable terminals KT1 through KTn is turned off, and stores the terminal identification information of the own terminal (the terminal ID), and various data. The terminal identification information can be stored in the ROM 62 alternatively.

The medium drive 65 has a storage medium MD inserted thereto, for example, a SD (Secure Digital) card memory, a USB (Universal Serial Bus) memory, or the like. Under the control of the CPU 61, the medium drive 65 writes data to and reads data form the storage medium MD.

An antenna 67 is connected to the communications part 66. The communications part 66 uses the SSID and the IP address received from the short-range communications apparatus KM, and, under the control of the CPU 61, carries out wireless communications with the wireless apparatus MS.

The wireless LAN communications part 68 carries out a LAN wireless communications process with the network NW using the communications part 66, the antenna 67 and the wireless apparatus MS.

An antenna 70 is connected to the communications part 66. Under the control of the CPU 61, the short-range communications part 69 carries out wireless communications with the short-range communications apparatus KM via the antenna 70. The short-range communications part 69 receives the SSID and the IP address transmitted by the short-range communications apparatus KM, and transfers it to the CPU 61.

The CPU 61 stores the SSID and the IP address received by the short-range communications part 69 in the EEPROM 64, uses the SSID and the IP address to carry out wireless communications with the wireless apparatus MS using the communications part 66. Also, if the short-range communications part 69 receives the SSID and the IP address, the CPU 61 transmits, via the short-range communications part 69, the terminal identification information of the own terminal stored in the EEPROM 64 or the like to the short-range communications apparatus KM.

The display 71 uses a LCD (Liquid Crystal Display) or the like, and, under the control of the CPU 61, displays display data.

The touch panel 72 is used in such a manner that it is placed on and adheres to the screen of the display 71, detects a touching operation at a position corresponding to the display screen, acquires an instruction given in response to the displayed contents of the display 71, a data selection, a character/letter input, and so forth, and outputs corresponding signals to the CPU 61.

The battery 73 uses a lithium battery or the like having a predetermined capacity, and supplies the necessary power to the respective parts of the corresponding one of the portable terminals KT1 through KTn.

The conference system 1 implements the information processing system, which executes the information processing method. According to the information processing method, wireless connection to the electronic apparatuses DK, which are connected to the network NW, is carried out in a state where the security is ensured and the convenience is satisfactory. The information processing method is implemented as a result of the electronic apparatuses DK that include the conference server 14, the short-range communications apparatus KM, the wireless apparatus MS and the portable terminals KT1 through KTn reading, storing in their internal storage media, and executing the corresponding information processing programs, which are stored in computer readable recording media such as ROMs, Electrically Erasable and Programmable Read-Only Memories (EEPROMs), EPROMs, flash memories, flexible disks, Compact Disc Read-Only Memories (CD-ROMs), Compact Discs Rewritable (CD-RW), Digital Versatile Disks (DVDs), USB memories, SD card memories, Magneto-Optical Discs (MOS), or the like. The information processing programs can be computer executable programs such as those described in a legacy programming language such as assembler, C, C++, C#, Java (registered trademark), or the like, an object-oriented programming language, or the like, and can be distributed in such a form that the programs are stored in the above-mentioned recording media.

Figure 10:
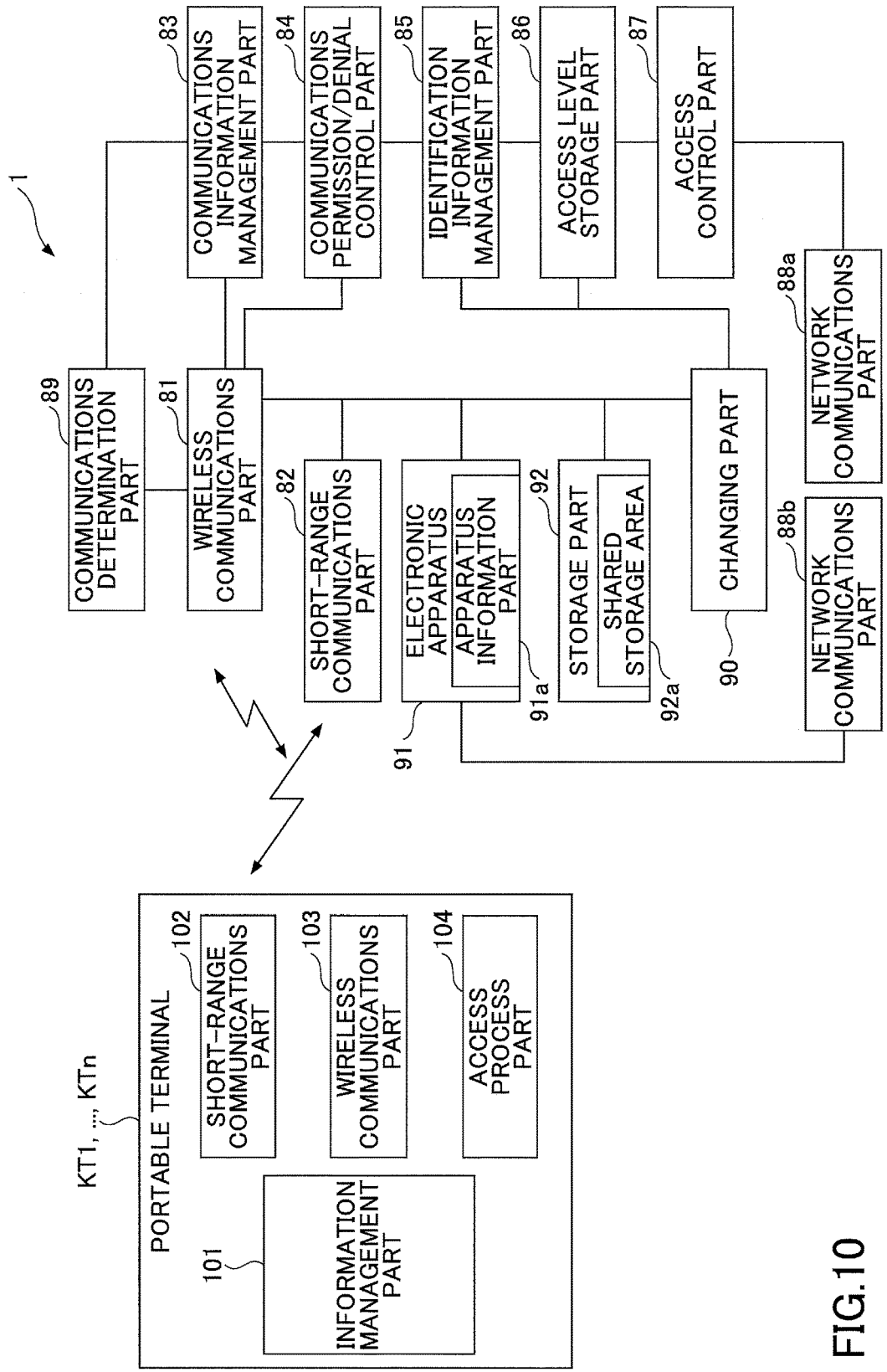
FIG. 10 is a function block diagram of the conference system.

In the conference system 1, as a result of the information processing programs being introduced, functional blocks shown in FIG. 10 are implemented. That is, the conference system 1 includes, as shown in FIG. 10, a wireless communications part 81, a short-range communications part 82, a communications information management part 83, a communications permission/denial control part 84, an identification information management part 85, an access level storage part 86, an access control part 87, a network communications parts 88a and 88b, a communications determination part 89, a changing part 90, an electronic apparatus 91, an apparatus information part 91a, a storage part 92, and a shared storage area 92a created in the storage part 92. Also, each of the portable terminals KT1 through KTn includes an information management part 101, a short-range communications part 102, a wireless communications part 103 and an access process part 104.

The wireless communications part 81 is implemented in the wireless apparatus MS. The wireless communications part 81 is connected to the network NW, detects ones of the portable terminals KT1 through KTn present within the wireless communications area, and carries out wireless communications with the ones of the portable terminals KT1 through KTn via the wireless network (the second network). Therefore, the wireless communications part 81 functions as a second communications part.

The short-range communications part 82 is implemented in the short-range communications apparatus KM. The short-range communications part 82 carries out communications with the portable terminals KT1 through KTn via the short-range wireless network (the first network). The short-range communications part 82 detects ones of the portable terminals KT1 through KTn present invention within the predetermined short-range communications area narrower than the wireless communications area (the second network) of the wireless communications part 81. Then, the short-range communications part 82 transmits, to the ones of the portable terminals KT1 through KTn, communications information to be used to carry out communications for a predetermined communications unit such as a conference, i.e., connection information (the SSID and the IP address) to be used to connect to the network NW. Also, the short-range communications part 82 receives the terminal identification information transmitted from the portable terminals KT1 through KTn. Therefore, the short-range communications part 82 functions as a first communications part.

The communications information management part 83 is implemented by the RAM 43 of the short-range communications apparatus KM, the data memory 53 of the wireless apparatus MS, and so forth. The communications information management part 83 stores and manages, for each predetermined unit of communications, for example, each conference, communications information required for the portable terminals KT1 through KTn to carry out wireless communications with the wireless communications part 81. Also, if the communications determination part 89 determines to finish wireless communications using communications information for a communications unit such as a conference, the communications information management part 83 deletes or changes the communications information. A condition for the communications determination part 89 to determine to finish communications can be, for example, a condition (i) that it is determined that it is not possible to connect to the portable terminals KT1 through KTn via the network NW using the wireless communications part 81; a condition (ii) that it is determined that it is not possible to connect to the portable terminals KT1 through KTn via the short-range wireless network using the short-range communications part 82; a condition (iii) that it is determined that it is possible to connect to the portable terminals KT1 through KTn via either one of the network NW using the wireless communications part 81 and the short-range wireless network using the short-range communications part 82 but it is possible to connect to the portable terminals KT1 through KTn via the other; a condition (iv) that it is determined that it is not possible to connect to the portable terminals KT1 through KTn via the network NW using the wireless communications part 81 and it is not possible to connect to the portable terminals KT1 through KTn via the short-range wireless network using the short-range communications part 82, or the like.

The identification information management part 85 is implemented by the data memory 53 and the CPU 51 of the wireless apparatus MS. The identification information management part 85 stores and manages the terminal identification information of ones of the portable terminals KT1 through KTn, for which communications with the wireless communications part 81 are permitted, and functions as a storage part. Actually, the identification information management part 85 stores the user terminal database where the terminal identification information of ones of the portable terminals KT1 through KTn, for which communications with wireless communications part 81 are permitted, and the users who have the ones of the portable terminals KT1 through KTn are associated with each other.

The communications permission/denial control part 84 is implemented by the CPU 51 of the wireless apparatus MS. The communications permission/denial control part 84 controls permission/denial of communications with one of the portable terminals KT1 through KTn, which carries out communications to the wireless communications part 81, based on the communications information of the communications information management part 83 and the terminal identification information of the identification information management part 85, and functions as a communications permission/denial control part. That is, the communications permission/denial control part 84 controls permission/denial of communications depending on whether the communications information transmitted by the one of the portable terminals KT1 through KTn is coincident with the communications information of the communications information management part 83, and also, whether the transmitted terminal identification information is coincident with the terminal identification information registered in the user terminal database of the identification information management part 85.

Thus, the communications information management part 83 and the communications permission/denial control part 84 function as a control part as a whole.

The access level storage part 86 is implemented by the data memory 53 of the wireless apparatus MS. The access level storage part 86 stores the conference information database DB1 where, for each conference, conference information such as the conference room R (in a case where there are a plurality of conference rooms R), the wireless apparatus MS, the person who holds the conference, the participants, the SSID, the password, the path for the shared storage area, and so forth, are registered.

The access level storage part 86 stores a list of the electronic apparatuses DK ("electronic apparatus list information"), connected to the network NW, which include the conference server 14, and the access levels for the electronic apparatuses DK. The access level storage part 86 also stores, as the electronic apparatus list information, and the shared storage area 92a of the storage part 92, and also stores the access level for the shared storage area 92a.

Further, the access level storage part 86 stores, in a manner of associating with the terminal identification information and the users, the default access levels of the users for the electronic apparatuses 91 and the shared storage area 92a of the storage part 92, and also, stores the access levels after being changed (described later). Therefore, the access level storage part 86 functions as an access level storage part. The access level storage part 86 actually stores the access levels, for example, the default access authority for the electronic apparatuses DK, in a form of the conference access authority database DB2. The access level storage part 86 registers, for example, in the form of the conference access authority database DB2 as shown in FIG. 7, the access authority (the access levels) for various sorts of access such as default, user list acquisition, user change, apparatus list acquisition, apparatus change, use of each apparatus (use of the apparatus X, . . . ), data provision, data reading, data editing, and so forth, for respective roles in a conference such as the conference administrator, attendants, hearers, chairperson, recorder, and so forth. If the access level of a designated user (an attendant, a hearer, or the like) has been changed in response to an access level change request from the user having the highest access level, the access level storage part 86 stores also the thus changed access level.

The access control part 87 is implemented by the CPU 51 of the wireless apparatus MS, the CPUs 21 of the electronic apparatuses DK other than the conference server 14 and the CPU 31 of the conference server 14. The access control part 87 controls permission/denial of access to the shared storage area 92a and the electronic apparatuses DK from the user of one of the portable terminals KT1 through KTn, for whom communications are permitted, based on the user's access level (access authority), and thus, functions as an access control part. Also, as will be described later, the access control part 87 searches for the electronic apparatuses DK connected to the network NW, which include the conference server 14, registers these electronic apparatuses DK in the access level storage part 86, and, in response to a setting by the conference server 14, or the like, registers the access levels for the electronic apparatuses DK and the shared storage area 92a of the storage part 92.

The network communications part 88a is implemented by the network I/F 45 of the short-range communications part KM and the network I/F 55 of the wireless apparatus MS. The network communications part 88b is implemented by the network I/Fs 26 of the electronic apparatuses DK other than the conference server SV and the network I/F 36 of the conference server SV. The network communications parts 88a and 88b are used for the electronic apparatuses DK, the conference server SV, the short-range communications part KM and the wireless apparatus MS to mutually carry out communications via the network NW.

The communications determination part 89 is implemented by the CPU 51 of the wireless apparatus MS. The communications determination part 89 detects, for a communications unit such as a conference, a finish of communications carried out by all of ones of the portable terminals KT1 through KTn, for which the communications permission/denial control part 84 permits communications, with the wireless communications part 81, and finishes the wireless communications using the communications information concerning the communications unit. For example, after the communications determination part 89 detects communications disconnection operations of all the portable terminals KT1 through KTn concerning the communications unit, it finishes the wireless communications. Also, if all the portable terminals KT1 through KTn concerning the communications unit enter a state where they cannot be detected by the wireless communications part 81 (a condition (i)), the communications determination part 89 finishes the wireless communications. Another condition for the communications determination part 89 to determine to finish the communications can be a condition (ii) that it is determined that it is not possible to connect to the portable terminals KT1 through KTn via the short-range wireless network using the short-range communications part 82; a condition (iii) that it is determined that it is possible to connect to the portable terminals KT1 through KTn via either one of the network NW using the wireless communications part 81 and the short-range wireless network using the short-range communications part 82 but it is possible to connect to the portable terminals KT1 through KTn via the other; a condition (iv) that it is determined that it is not possible to connect to the portable terminals KT1 through KTn via the network NW using the wireless communications part 81 and it is not possible to connect to the portable terminals KT1 through KTn via the short-range wireless network using the short-range communications part 82, or the like. Therefore, communications determination part 89 functions as a determination part.

The changing part 90 is implemented by the CPU 51 of the wireless apparatus MS. In response to a request from the user of the highest access level stored in the access level storage part 86, the changing part 90 changes at least the access level of each user stored in the access level storage part 86, or the terminal identification information, for which communications are permitted, stored in the identification information management part 85. Therefore, the changing part 90 functions as a changing part.

The electronic apparatus 91 corresponds to each of the electronic apparatuses DK such as the MFP 11, the projector 12, the electronic blackboard 13, the conference server 14, and so forth. The electronic apparatus 91 has an apparatus information part 91a that manages the own apparatus identification information, the access level, if necessary, and so forth. The apparatus information part 91a is implemented by the CPU 21 of the electronic apparatus DK, the CPU 31 of the conference server SV, and so forth.

Each electronic apparatus 91 has the storage part 92. The storage part 92 has the shared storage area 92a, to which access from the portable terminals KT1 through KTn is permitted. The shared storage area 92a can include a single area or a plurality of storage areas such that an accessible one thereof is different depending on the access level. The apparatus information part 91a controls access to the shared storage area 92a from the portable terminals KT1 through KTn based on the access level of the shared storage area 92a and the access levels of the portable terminals KT1 through KTn. Therefore, the storage part 92 functions as a storage part that has the predetermined number of shared storage areas 92a accessible depending on the access levels. Access to the electronic apparatus 91 itself and access to the shared storage area 92a can be controlled by the apparatus information part 91a, or by the access control part 87. According to the first embodiment, it is assumed that the access control part 87 carries out the control.

Each of the portable terminals KT1 through KTn includes, due to an application installed thereto, the information management part 101, the short-range communications part 102, the wireless communications part 103 and the access process part 104.

The information management part 101 manages the terminal identification information of the own terminal and information concerning information processing, and carries out an information management process.

The short-range communications part 102 carries out communications with the short-range communications part 82, and carries out a terminal identification information transmission process.

The wireless communications part 103 carries out communications with the wireless communications part 81, and carries out a wireless communications process.

After the short-range communications part 102 receives a search from the short-range communications part 82, the access process part 104 causes the short-range communications part 102 to transmit the terminal identification information of the own terminal. After the short-range communications part 102 receives communications information (the SSID, the IP address) from the short-range communications part 82, the access process part 104 causes the wireless communications part 103 to carry out communications with the wireless communications part 81 using the communications information and the terminal identification information, and accesses the electronic apparatus 91 and the shared storage area 92a. Thus, the access process part 104 carries out an access process.

Next, operations of the first embodiment will be described. The conference system 1 as the information processing system according to the first embodiment enables wireless connection to the electronic apparatus DK connected to the network NW under the condition where the convenience is satisfactory while the security is ensured.

In the conference system 1 according to the first embodiment, the wireless apparatus MS manages uses ("use management") of the electronic apparatuses DK connected to the network NW and including the conference server 14 by the portable terminals KT1 through KTn. In the wireless apparatus MS, necessary information for the use management, for example, the conference access authority database DB2 shown in FIG. 7, the user terminal database, and so forth, are previously registered in the data memory 53.

Figure 11:
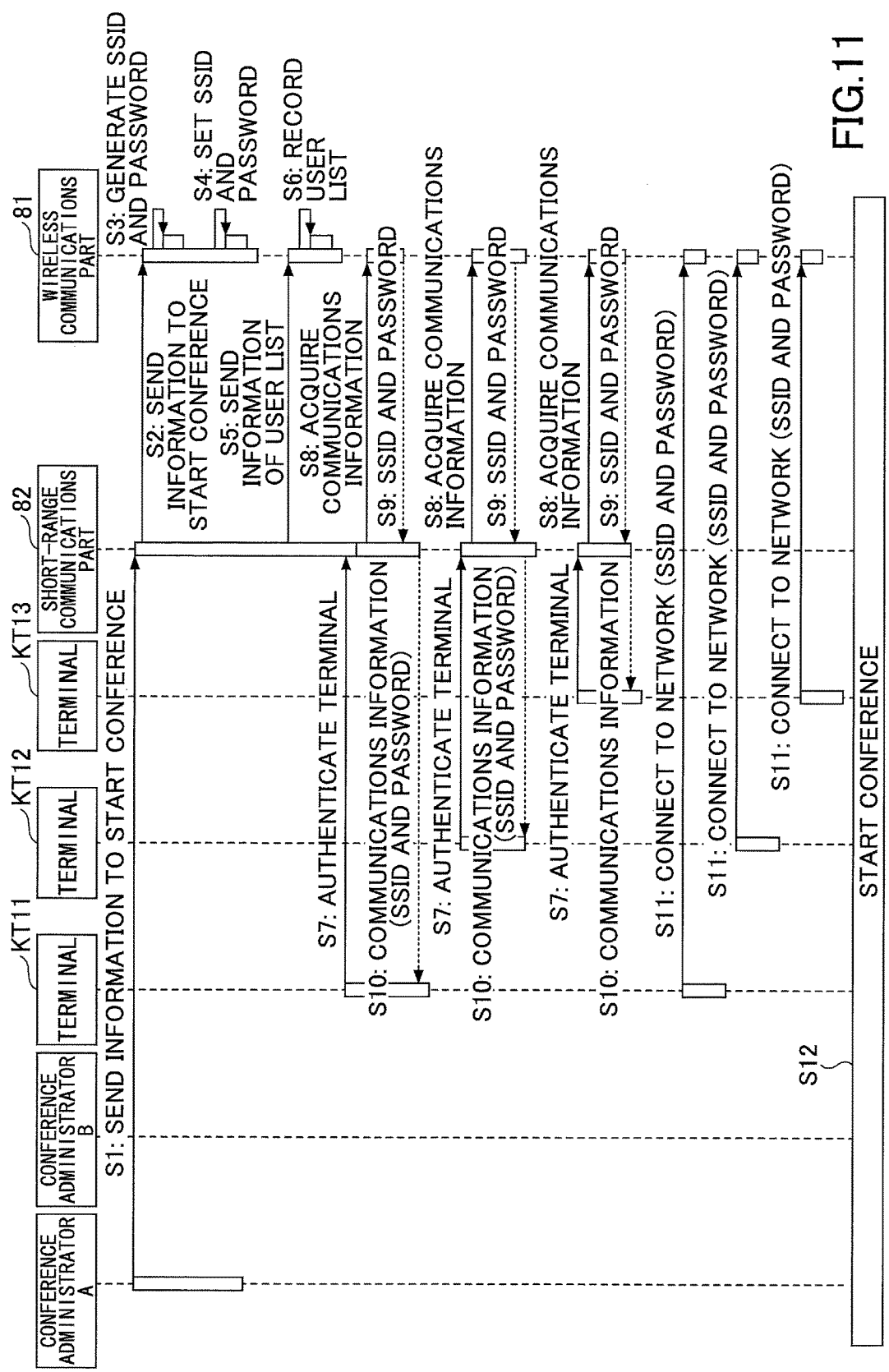
FIG. 11 is a sequence diagram illustrating information processing.
Figure 12:
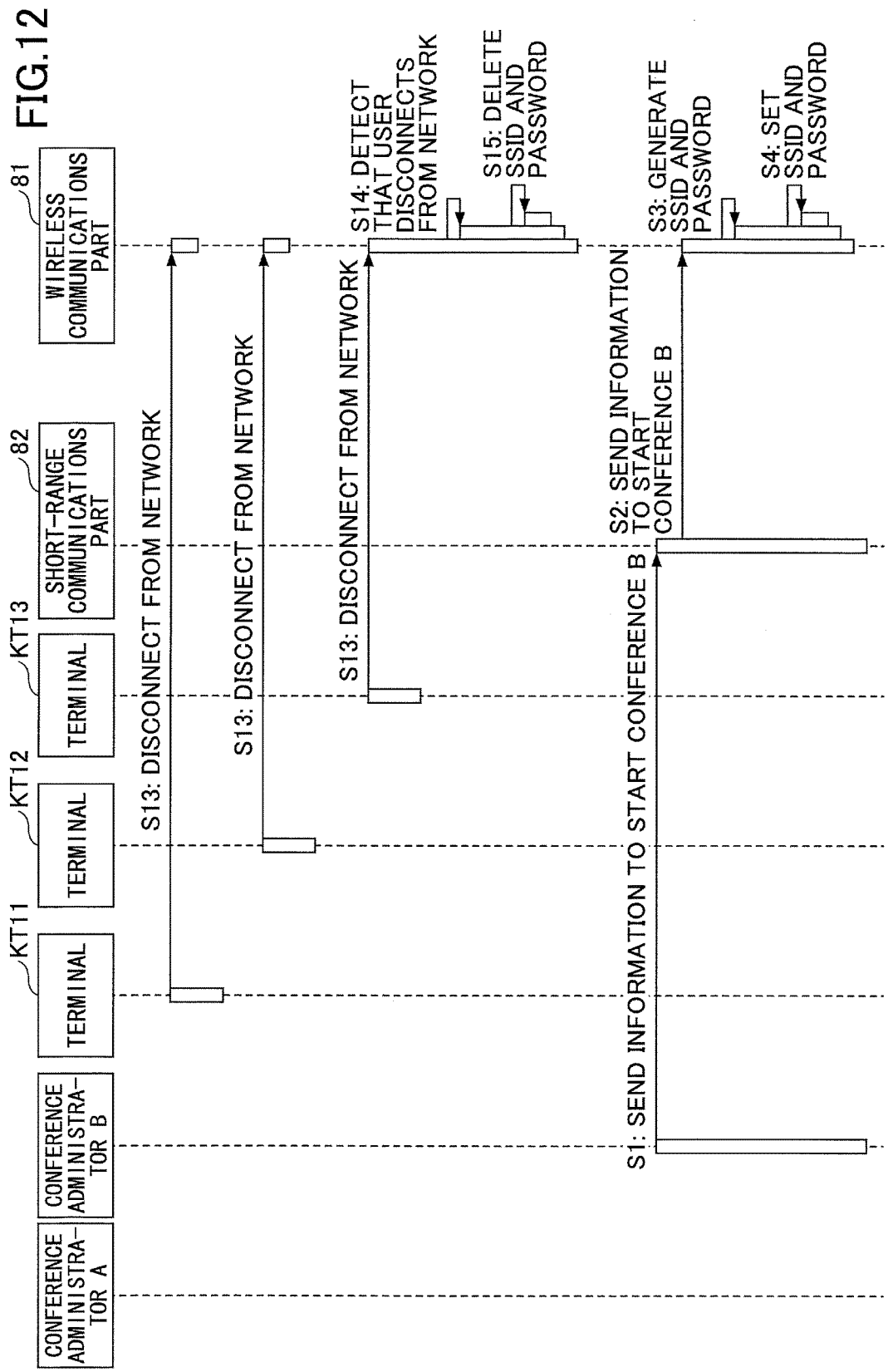
FIG. 12 is a sequence diagram illustrating information processing subsequent to FIG. 11.

It is assumed that, as shown in FIGS. 11 and 12, a conference administrator A and a conference administrator B hold and finish, with a time difference therebetween, a conference A and a conference B, respectively. In FIGS. 11 and 12, the conference administrator A and the conference administrator B use the portable terminals KT1 and KT2, respectively, and participants of the conference A use the portable terminal KT11, KT12, and KT13. The terminal identification information and the users of these portable terminals KT1 through KTn are registered in the abovementioned user terminal database.

Figure 13:
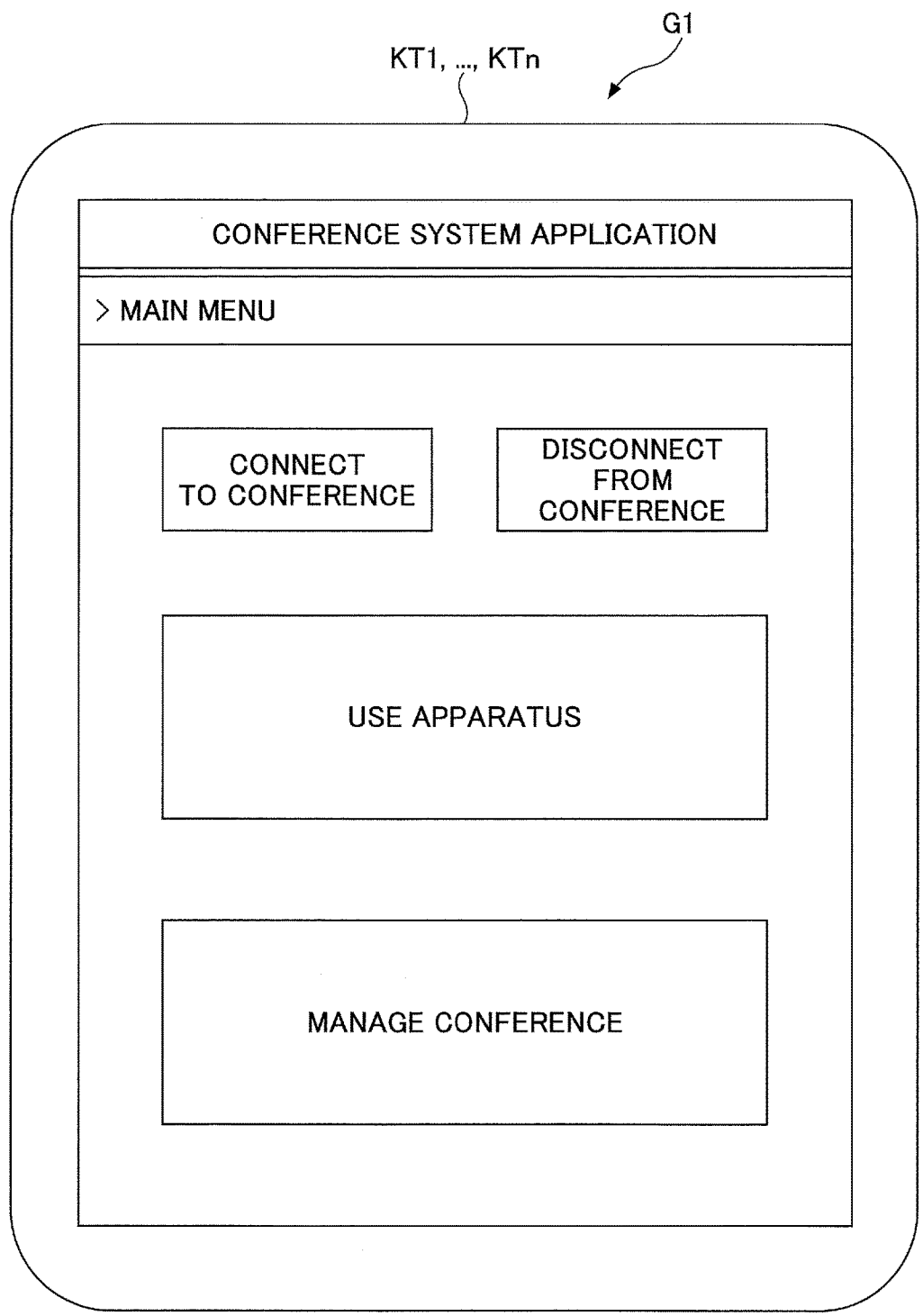
FIG. 13 illustrates one example of a main screen page of the portable terminal.

As shown in FIG. 11, in order that the conference administrator A holds the conference A, the conference administrator A goes to a conference room R, and, in response to communications from the short-range communications part 82, uses the portable terminal KT1 of the conference administrator A, and transmits information to start the conference A (S1). Alternatively, the information to start the conference A can be transmitted to the wireless communications part 81 as a result of the conference administrator A operating the conference server 14, operating the short-range communications part KM, or the like. At the time of starting the conference A, for example, a conference system application in the portable terminal KT1 displays, for example, a main screen page G1 as shown in FIG. 13 on the display 71, and the conference administrator A presses a "connect to conference" button. Thus, the conference administrator A can request to start the conference.

Figure 14:
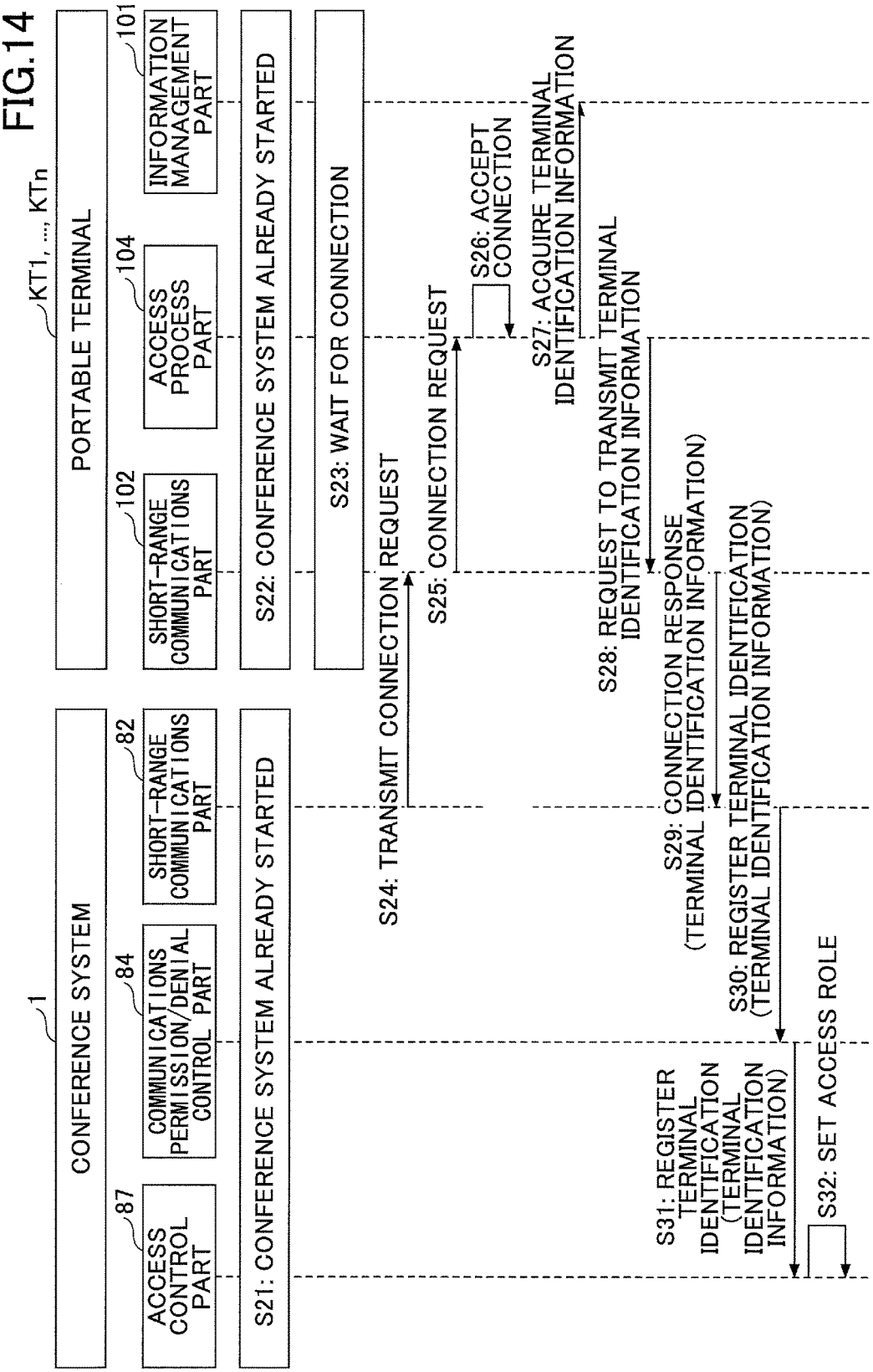
FIG. 14 is a sequence diagram of a terminal registration process.

In this case, for example, as shown in FIG. 14, when the conference system 1 and the portable terminals KT1 through KTn are in a started state (S21, S22), the short-range communications part 82 transmits, at predetermined time intervals, a connection request (S23, S24). When the short-range communications part 102 of one of the portable terminals KT1 through KTn, for example, the portable terminal KT1, of the conference administrator A receives the connection request, the access process part 104 responds to the connection request and transfers information to the display 71 such as to indicate that it has received the connection request (S25, S26). When the conference administrator A operates the "connect to conference" button (see FIG. 13) in response thereto, the access process part 104 acquires, from the information management part 101, the terminal identification information of the own terminal (S27), and causes the short-range communications part 102 to transmit the terminal identification information as a response to the connection request (S28).

When the short-range communications part 82 receives the terminal identification information from the portable terminal KT1 (S29), it sends the terminal identification information to the communications permission/denial control part 84 (S30), and the communications permission/denial control part 84 compares the terminal identification information with the terminal identification information of the identification information management part 85, and carries out control concerning communications permission/denial. If the received terminal identification information is already registered, the communications permission/denial control part 84 permits communications, and transfers the terminal identification information to the access control part (S31).

The access control part 87 reads the access level storage part 86, and, based on the received terminal identification information, reads the access level of the user of the terminal identification information and sets it (i.e., an access role setting) (S32). Thereafter, communications between the portable terminal KT1 and the conference system 1 via the wireless communications part 81 is enabled on the access level that is thus set.

Returning to FIG. 11, when the access control part 87 identifies the conference administrator A, the conference system 1 sends information to the wireless communications part 81, which indicates to start the conference (S2). The wireless communications part 81 generates the SSID and the IP address (the password) from the communications information management part 83 (S3) as the conference A communications information, and stores them in the communications information management part 83 (S4). Also, if the short-range communications part 82 receives a user list from the conference A administrator's terminal KT1, or the like, it transfers the user list to the wireless communications part 81 (S5), and the wireless communications part 81 resisters the user list in the access level storage part 86 as the conference information database DB1 (S6). This user list is a registered list that includes, for example, as shown in FIG. 15, users, user terminal identifiers, and authority (a conference administrator, a conference participant, and so forth).

Thereafter, when users such as participants of the conference A enter the conference room R, who carry the portable terminals KT11, KT12, KT13, and so forth, the short-range communications part 82 authenticates these portable terminals KT11, KT12, KT13, and determines whether communications are permitted therefor. If communications are permitted for the portable terminals KT11 through KT13, the short-range communications part 82 requests communications information from the wireless communications part 81, and acquires the corresponding SSID and password from the wireless communications part 81 as the communications information. The short-range communications part 82 carries out a process to send the acquired communications information to the portable terminals KT11 through KT13 (S7, S8). The short-range communications part 82 transmits, also to the portable terminal KT1 or KT2 of the conference administrator A or B, in the same way as the portable terminals KT11 through KT13, the SSID and IP address as the communications information. After the short-range communications part 82 receives the terminal identification information from the portable terminal KT1 or KT2, and acquires the same. The "password" means the "IP address" here.

The portable terminals KT1, and KT11 through KT13, which thus have received the communications information, carry out communications with the wireless communications part 81 using the communications information (the SSID and the password), and, for example, carry out the conference A using the shared storage area 92a (S12).

Figure 16:
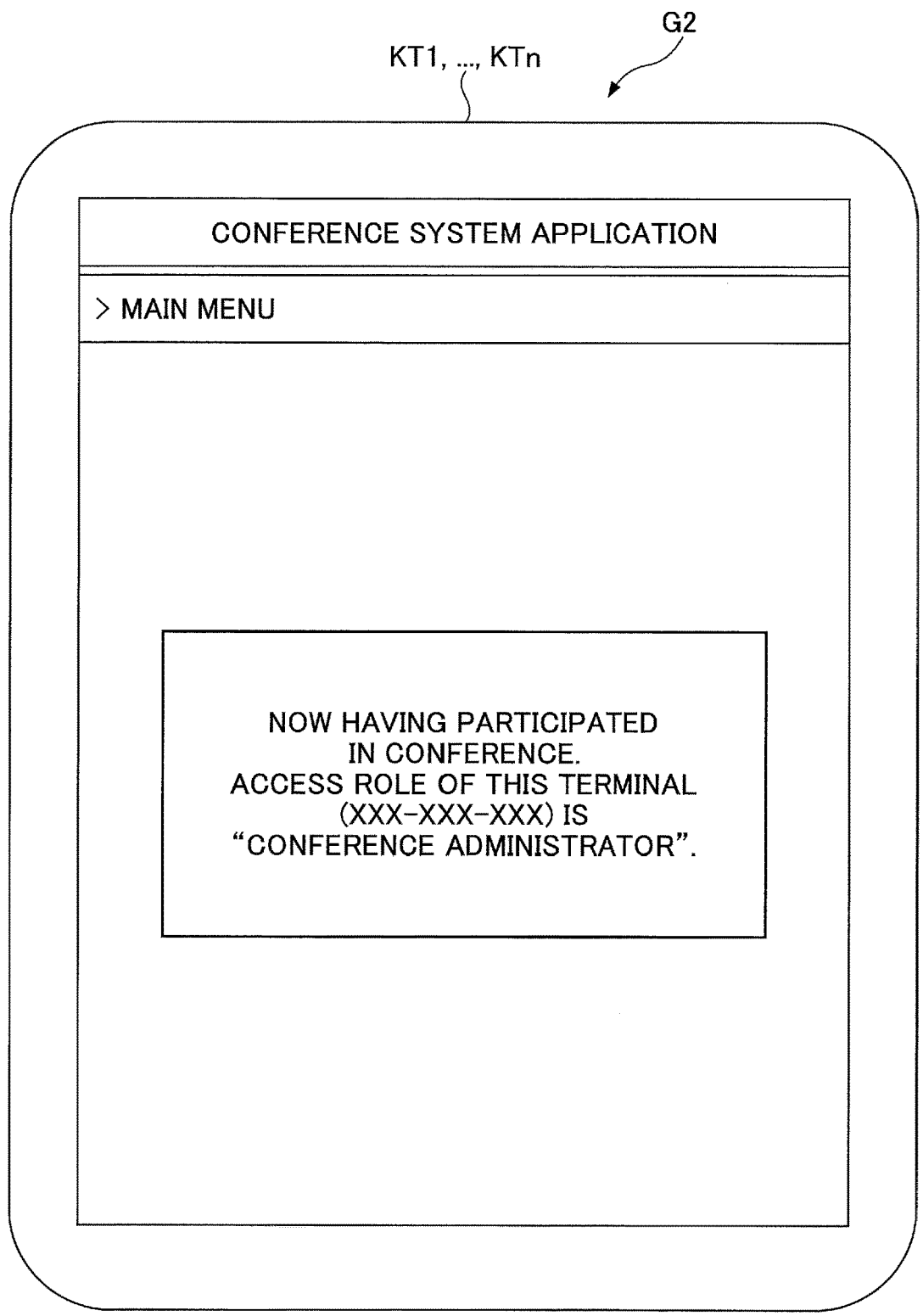
FIG. 16 illustrates one example of an access level reporting screen page.
Figure 17:
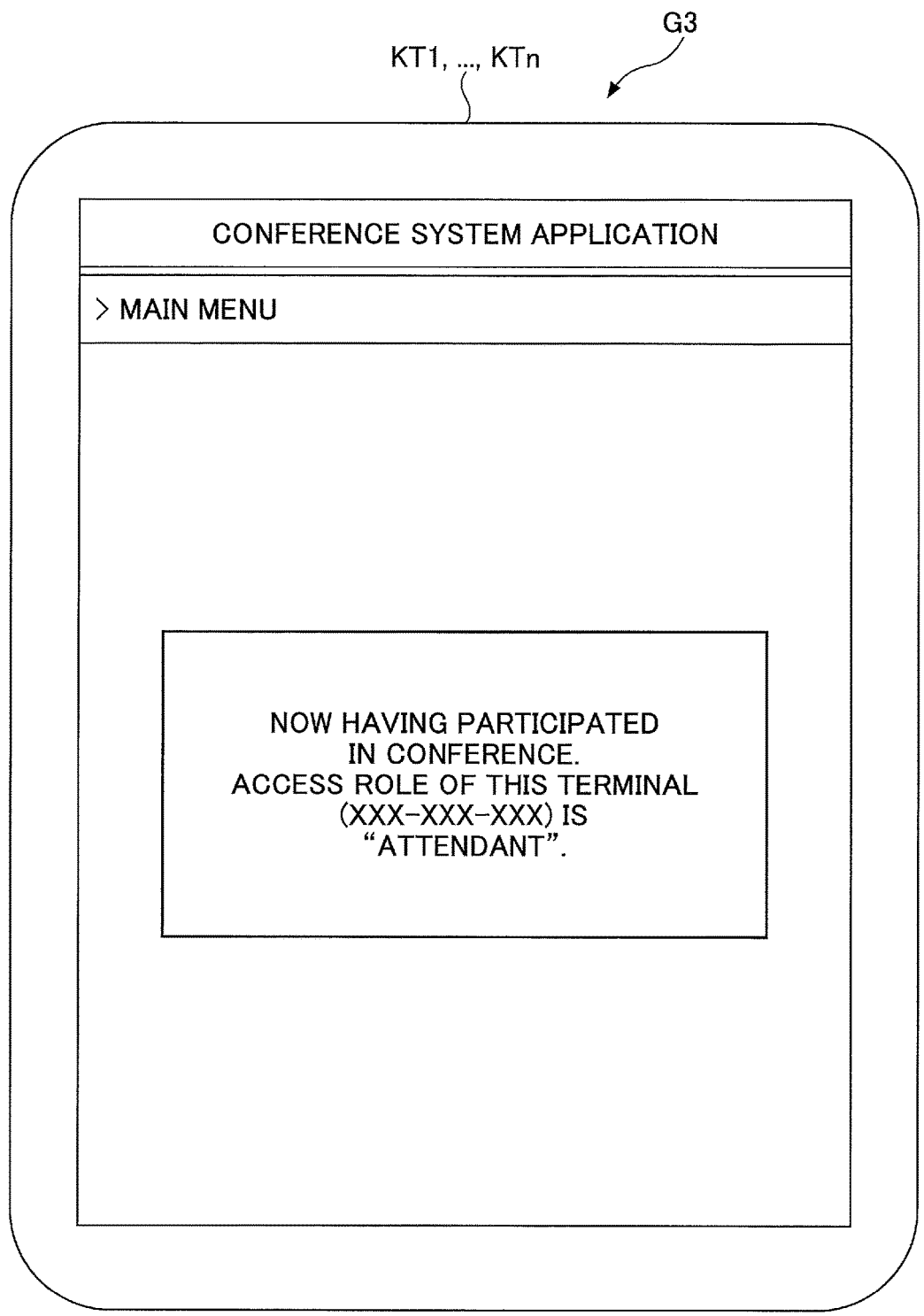
FIG. 17 illustrates another example of the access level reporting screen page.

The conference system 1 sends information to the portable terminals KT1 through KTn, which indicates that the portable terminals KT1 through KTn have participated in the conference, and the conference system application displays, for example, the access level reporting screen pages G2 and G3 as shown in FIGS. 16 and 17 on the display 71 of each portable terminal. FIG. 16 shows the access level reporting screen page G2 that indicates that the user of the corresponding one of the portable terminals KT1 through KTn has participated in the conference as the conference administrator. Also, FIG. 17 shows the access level reporting screen pages G3 that indicates that the corresponding one of the portable terminals KT1 through KTn has participated in the conference as a participant.

When the conference A is finished, and the "disconnect from conference" button is operated on the main screen page G of the conference system application of each of the portable terminals KT1, KT11 through KT13, or the portable terminals KT1, KT11 through KT13 of all the users who have participated in the conference A move outside the communications range of the wireless communications part 81 (a condition (i)), the communications determination part 89 determines that the conference A has been finished (S13, S14). The communications determination part 89 causes the wireless communications part 81 to finish the communications using the conference A communications information (the SSID, the password (the IP address)), and sends information to the communications information management part 83 that indicates the finish of the conference A.

As the condition for the communications determination part 89 to determine to finish the communications, other than the above-mentioned condition (i), a condition (ii) that it is determined that it is not possible to connect to the portable terminals KT1 through KTn via the short-range wireless network using the short-range communications part 82; a condition (iii) that it is determined that it is possible to connect to the portable terminals KT1 through KTn via either one of the network NW using the wireless communications part 81 and the short-range wireless network using the short-range communications part 82 but it is not possible to connect to the portable terminals KT1 through KTn via the other; a condition (iv) that it is determined that it is not possible to connect to the portable terminals KT1 through KTn via the network NW using the wireless communications part 81 and it is not possible to connect to the portable terminals KT1 through KTn via the short-range wireless network using the short-range communications part 82, or the like, can be used. As a method to determine whether to be able to connect to the portable terminals KT1 through KTn, for example, connection check requests can be periodically transmitted to the portable terminals KT1 through KTn via the corresponding network, and it can be determined whether to be able to connect to the portable terminals KT1 through KTn depending on whether the portable terminals KT1 through KTn respond thereto.

The communications information management part 83 deletes the conference A communications information (the SSID, the password (the IP address)) stored in an internal storage part of the communications information management part 83, and finishes the information processing concerning the conference A. Alternatively, the communications information management part 83 can finish the processing by changing the communications information. Further alternatively, such control can be carried out that the communications permission/denial control part 84 does not accept requests that are transmitted using the conference communications information. Further alternatively, such control can be carried out that the communications permission/denial control part 84 does not transmit information that is transmitted using the conference communications information to other apparatuses (the electronic apparatuses or the like) that are connected to the network NW.

Thereafter, in the same way as that mentioned above, the administrator of the conference B sends information to start the conference B (S1), and thereby, in the same way as that mentioned above, the conference using wireless communications using the conference B communications information (the SSID, the password) is started (S2-S4).

Then, in the conference, the conference system 1 uses the portable terminals KT1 through KTn, and implements use limitation as will be described below, thereby securing the security and improving the convenience.

Figure 18:
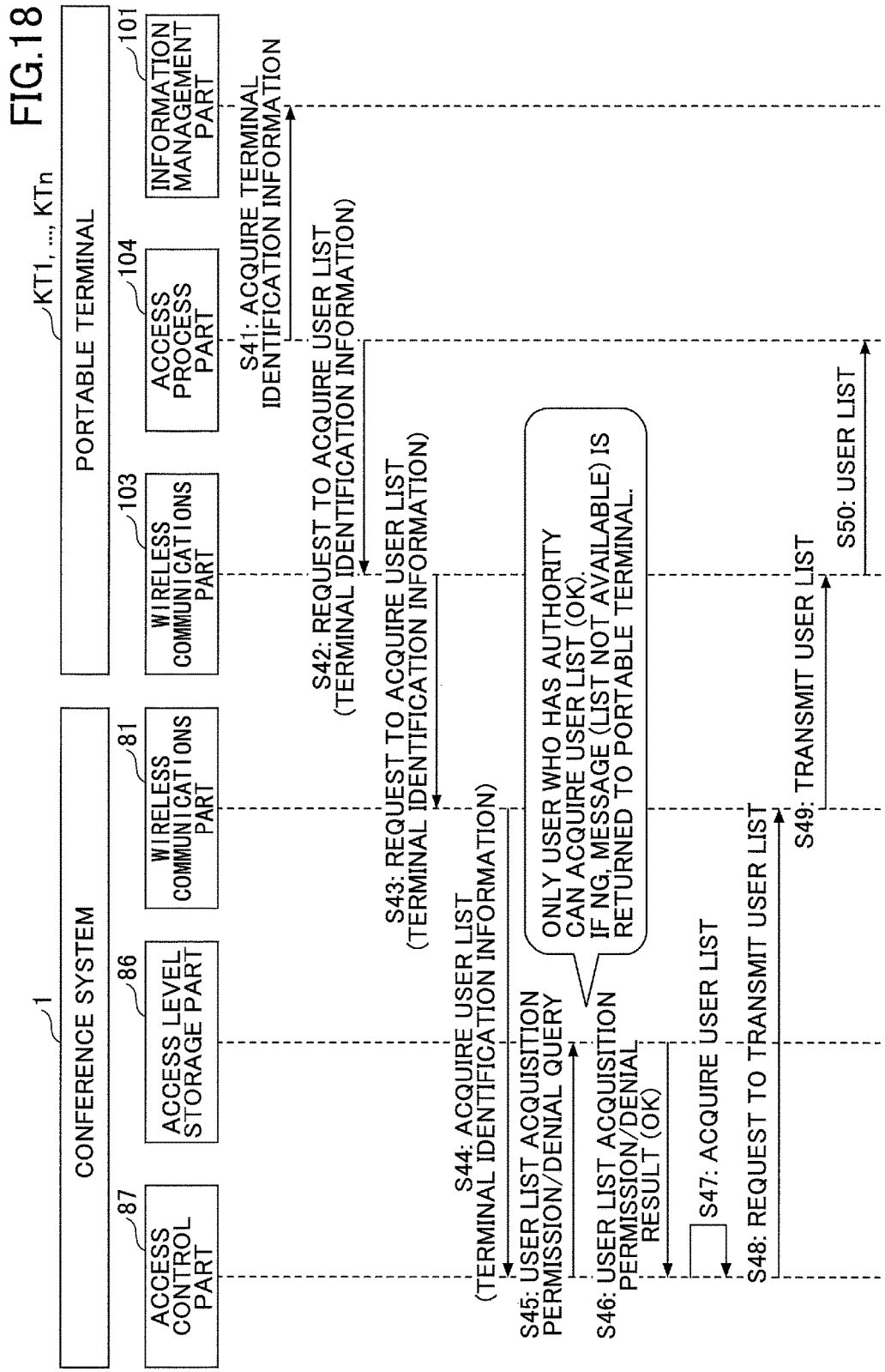
FIG. 18 is a sequence diagram illustrating a conference participant list acquisition process.

In the conference, the conference system 1 allows the user having the highest access level to acquire the list of the conference participants, and carries out a conference participant list acquisition process as shown in FIG. 18.

The users of the portable terminals KT1 through KTn that have participated in the conference can request the participant list by using the conference system application of each of the portable terminals KT1 through KTn. When the access process part 104 of the portable terminals KT1 through KTn receives a participant list acquisition request, it acquires, from the information management part 101, the terminal identification information of the own terminal (S41), transfers the acquired terminal identification information to the wireless communications part 103 (S42), and requests it to acquire the participant list. When the wireless communications part 103 receives the participant list acquisition request, it transmits the user list acquisition request together with the terminal identification information to the wireless communications part 81 of the conference system 1 (S43).

The wireless communications part 81 transfers the received user list acquisition request to the access control part 87 together with the terminal identification information (S44).

The access control part 87 determines, based on the received terminal identification information, whether to be able to acquire the user list based on the access level storage part 86, and acquires information indicating whether the received terminal identification information has the user list acquisition authority (S45). If the received terminal identification information has the user list acquisition authority, the access control part 87 acquires the user list from the access level storage part 86 (S46), transfers the acquired user list to the wireless communications part 81 (S47), and requests it to transmit the acquired user list to the one of the portable terminals KT1 through KTn, which has originally transmitted the user list acquisition request (S48).

The wireless communications part 81 transmits the acquired user list to the one of the portable terminals KT1 through KTn (S49), which has originally transmitted the user list acquisition request.

Figure 19:
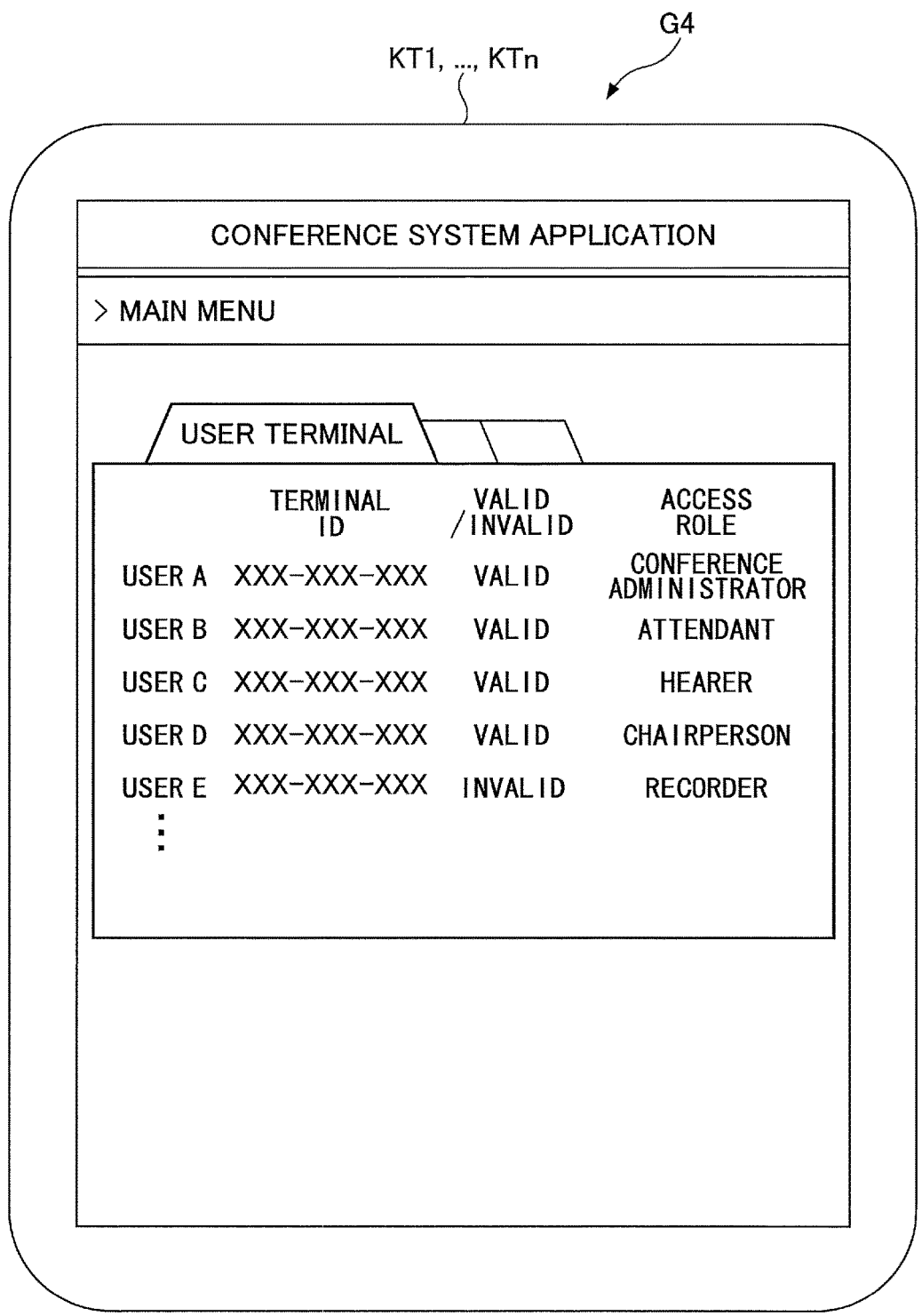
FIG. 19 illustrates one example of a user terminal list screen page.

When the wireless communications part 103 of the one of the portable terminals KT1 through KTn thus receives the user list, it transfers the user list to the access process part 104 (S50), and the access process part 104 displays, for example, a user terminal list screen page G4 shown in FIG. 19 on the display 71. The user terminal list screen page G4 includes user names, terminal IDs, information that indicates whether the terminals' participating in the conference is valid/invalid, and access roles (access authority).

The communications permission/denial control part 84 prevents one of the portable terminals KT1 through KTn from accessing if the terminal identification information thereof, which has accessed the communications permission/denial control part 84, is not registered in the identification information management part 85. Then, in this case, the communications permission/denial control part 84 registers, in the access level storage part 86, that access by the corresponding terminal identification information is prevented, i.e., registers the corresponding terminal identification information as invalid terminal identification information.

Therefore, when the access control part 87 acquires the user list from the access level storage part 86, it includes the information of the user, for whom access to the conference is invalid.

At this time, if the received terminal identification information does not have the user list acquisition authority, the access control part 87 transfers information indicating that the list acquisition is failed to the wireless communications part 81, and request the wireless communications part 81 to send the information to the one of the portable terminals KT1 through KTn, which has originally transmitted the user list acquisition request. In this case, the one of the portable terminals KT1 through KTn displays, on the display 71, the information indicating that the user list cannot be acquired and this terminal has no authority, instead of the user terminal list screen page G4.

Figure 20:
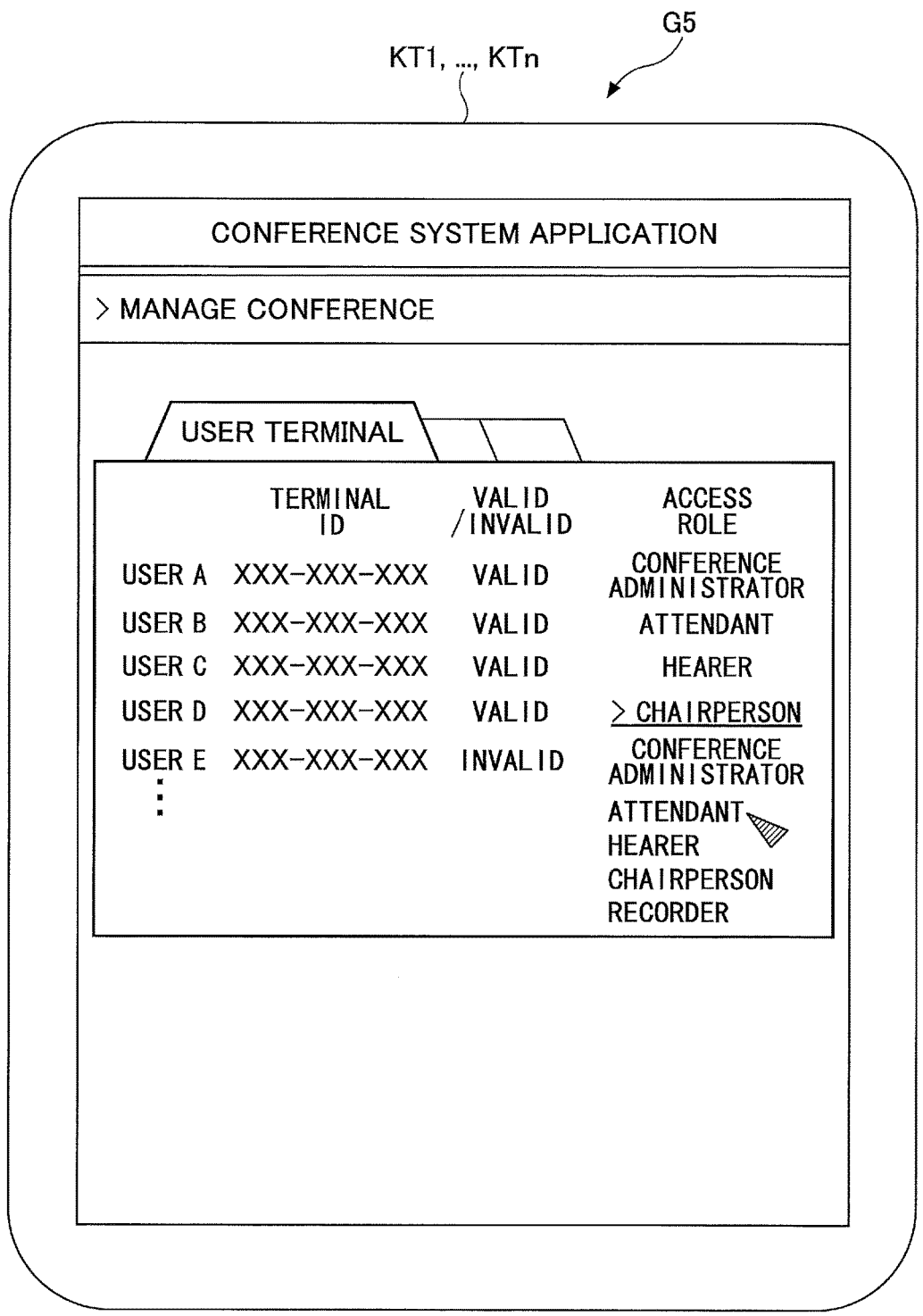
FIG. 20 illustrates one example of an access authority change screen page.
Figure 21:
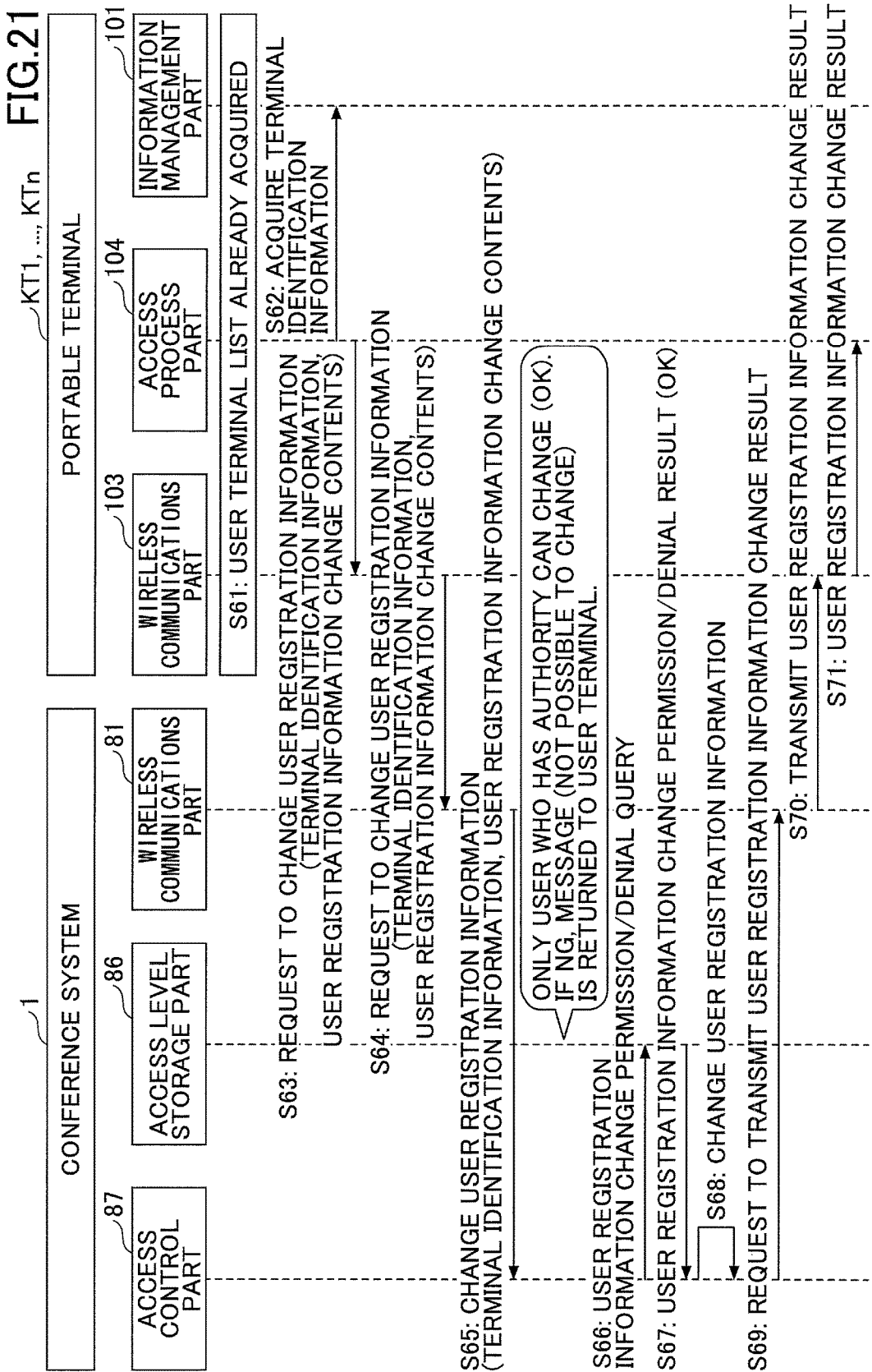
FIG. 21 is a sequence diagram illustrating an access authority change process.

The users of the portable terminals KT1 through KTn which have received the user list (S61 of FIG. 21, which will be described below), for example, the conference administrator, can switch the user terminal list screen page G4 to an access authority change screen page G5 as shown in FIG. 20, and change the user access authority appropriately. The portable terminals KT1 through KTn and the conference system 1 carry out an access authority change process as shown in FIG. 21, if such an operation is thus performed on the access authority change screen page G5 as to change the user access authority. In the access authority change screen page G5 shown in FIG. 20, the user D's access role (access authority) is being changed from "chairperson" to another authority.

That is, if the user access authority operation is thus performed, the access process part 104 of the corresponding one of the portable terminals KT1 through KTn acquires the terminal identification information of the own terminal from the information management part 101 (S62). The access process part 104 then sends a user registration information change request together with the user registration information change contents and the terminal identification information to the wireless communications part 103 (S63). The wireless communications part 103 transmits the user registration information change request to the wireless communications part 81 of the conference system 1 together with the user registration information change contents and the terminal identification information (S64).

When the wireless communications part 81 of the conference system 1 thus receives the user registration information change request, it transfers the received user registration information change request to the access control part 87 together with the user registration information change contents and the terminal identification information (S65).

The access control part 87 reads the access level storage part 86 based on the terminal identification information, and acquires information concerning whether the user of the terminal identification information has user registration information change authority (S66). If the user of the terminal identification information has the user registration information change authority, the access control part 87 changes the corresponding access authority registered in the access level storage part 86 based on the user registration information change contents (S67, S68).

After the access control part 87 thus changes the access authority, it sends user registration information change result transmission request to the wireless communications part 81 (S69). The wireless communications part 81 transmits the user registration information change result to the corresponding one of the portable terminals KT1 through KTn (S70), which has originally sent the user registration information change request.

When the wireless communications part 103 of the one of the portable terminals KT1 through KTn thus receives the user registration information change result, it transfers the user registration information change result to the access process part 104 (S71).

The access process part 104 shows the user registration information change result to the user by displaying the corresponding information on the display 71, or in another way.

In the access authority change process, the user of each of the portable terminals KT1 through KTn can acquire the own default access authority, as well as the role and the access level of each user in the conference, as access authority information, by requesting them from the conference system 1.

Figure 22:
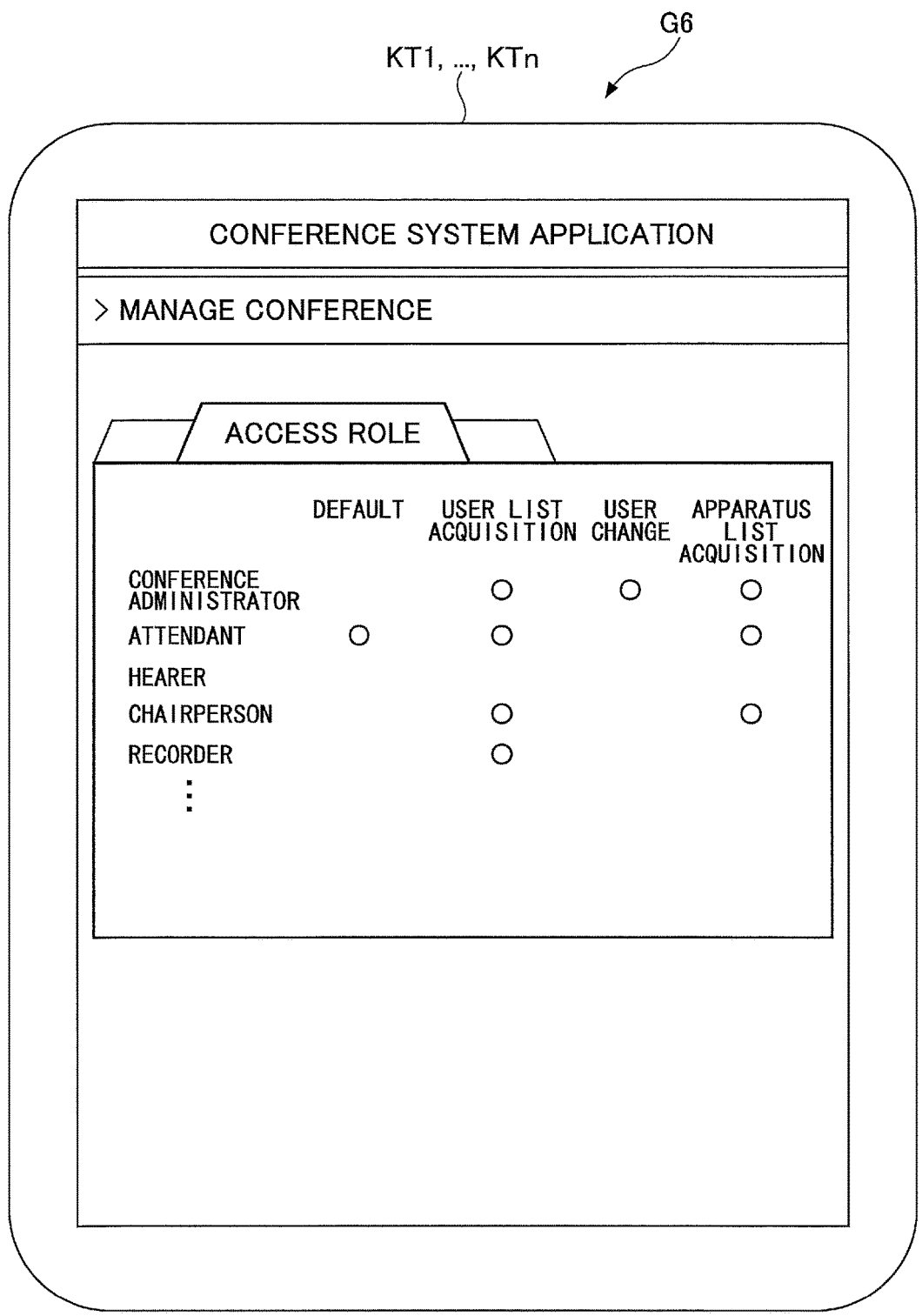
FIG. 22 illustrates one example of an access authority list screen page.

The access process part 104 of each of the portable terminals KT1 through KTn displays the thus acquired access authority information on the own display 71, for example, as an access authority list screen page G6 shown in FIG. 22. The access authority list screen page G6 of FIG. 22 shows the default role of the user who has sent the access authority information request (in FIG. 22, "attendant") and the access authority of each role. In FIG. 22, for each role, the "○" sign is given if the access authority is present for "user list acquisition", "user change", and "apparatus list acquisition".

Figure 23:
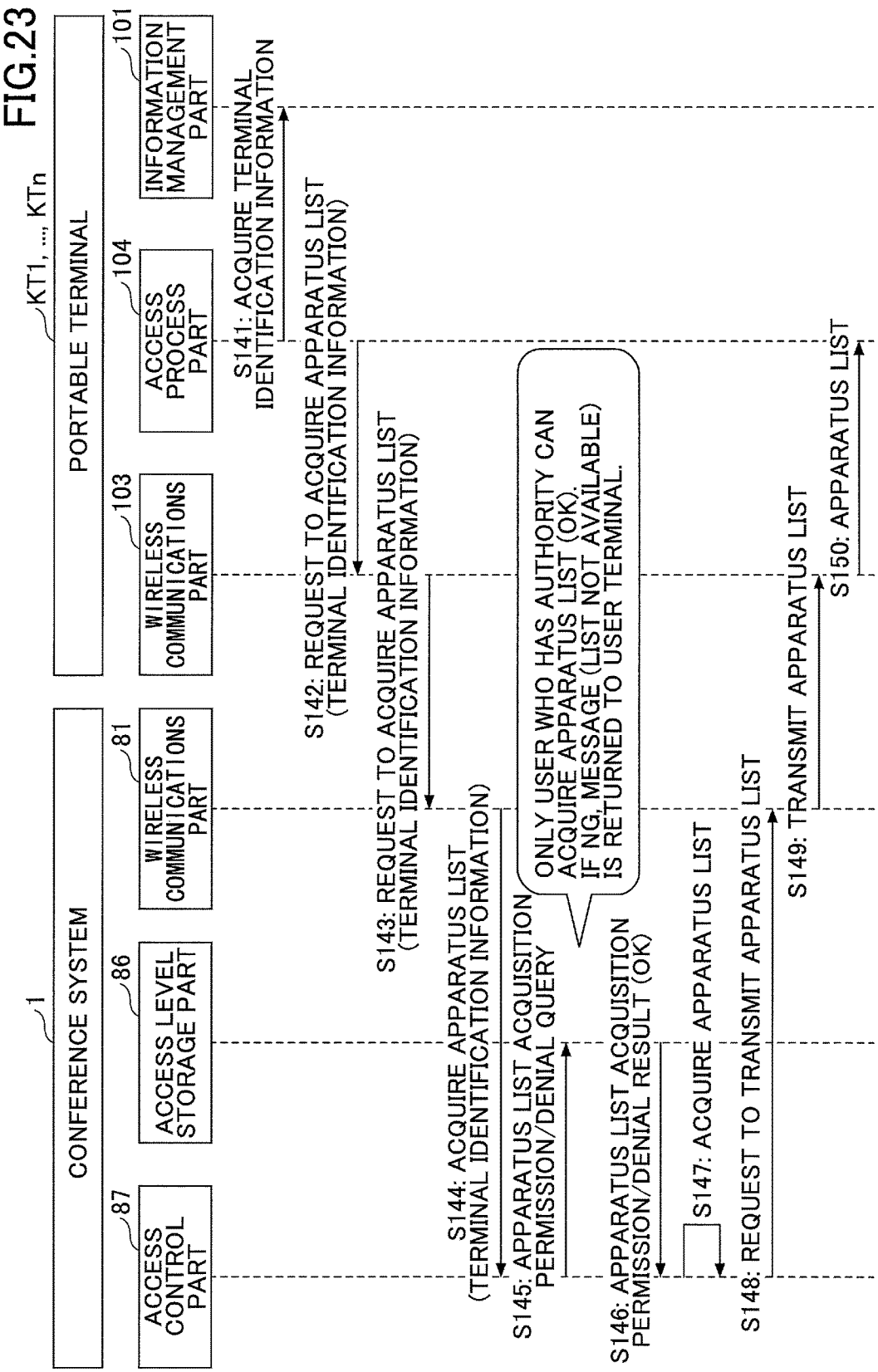
FIG. 23 is a sequence diagram illustrating an apparatus list acquisition process.

As shown in FIG. 23, the user of each of the portable terminals KT1 through KTn that have participated in the conference can request a list of the electronic apparatus DK ("apparatus list"), which are connected to the network NW. The apparatus list request can be performed by operating the "manage conference" button of the main screen page G1 shown in FIG. 13. For example, by using the access authority list screen page G6 shown in FIG. 22, the conference administrator, the attendants, and the chairperson can perform the apparatus list request.

When the apparatus list requesting operation has been performed, the access process part 104 of the corresponding one of the portable terminals KT1 through KTn acquires the terminal identification information of the own terminal from the information management part 101 (S141). The access process part 104 sends an apparatus list acquisition request to the wireless communications part 103 together with the terminal identification information (S142). The wireless communications part 103 transmits the apparatus list acquisition request together with the terminal identification information to the wireless communications part 81 of the conference system 1 (S143).

After the wireless communications part 81 of the conference system 1 receives the apparatus list acquisition request, it transfers the received apparatus list acquisition request to the access control part 87 together with the terminal identification information (S144).

The access control part 87 reads the access level storage part 86 based on the terminal identification information, and acquires information concerning whether the user of the terminal identification information has apparatus list acquisition authority (S145). If the user of the terminal identification information has the apparatus list acquisition authority (S146), the access control part 87 acquires a list of the electronic apparatuses DK including the shared storage area 92a (hereinafter, which may be referred to as an "apparatus list") registered in the access level storage part 86 (S147).

After the access control part 87 thus acquires the apparatus list, it sends an apparatus list transmission request to the wireless communications part 81 (S148). The wireless communications part 81 transmits the apparatus list to the corresponding one of the portable terminals KT1 through KTn (S149), which has originally sent the apparatus list acquisition request.

When the wireless communications part 103 of the corresponding one of the portable terminals KT1 through KTn thus receives the apparatus list, it transfers the apparatus list to the access process part 104 (S150, S91 of each of FIGS. 28 and 30, which will be described later).

Figure 24:
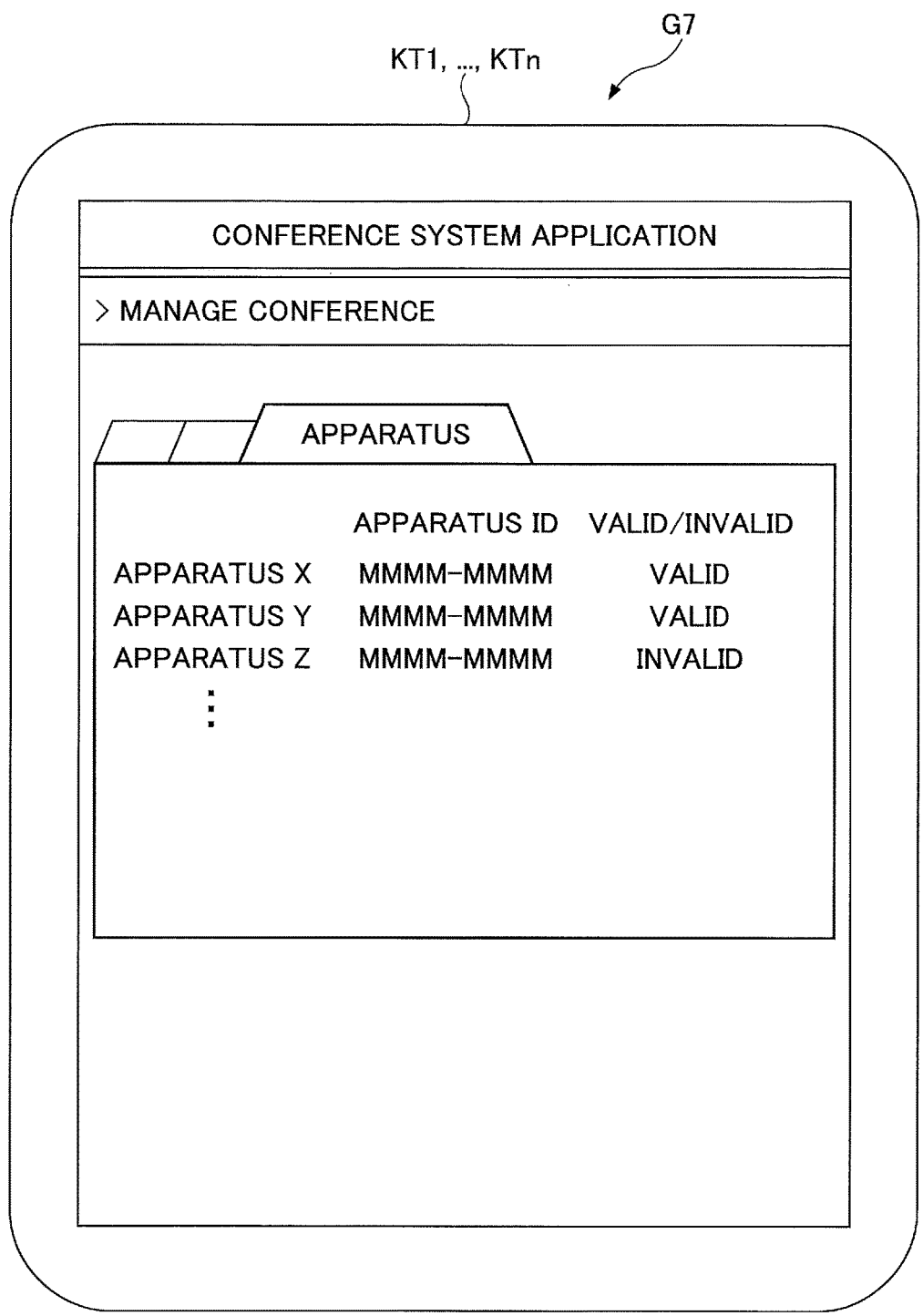
FIG. 24 illustrates one example of an apparatus list screen page.

The access process part 104 displays the apparatus list, for example, in an apparatus list screen page G7 as shown in FIG. 24, on the display 71. The apparatus list screen page G7 of FIG. 24 includes "apparatus name", "apparatus ID" and "valid/invalid". The item "valid/invalid" indicates whether the electronic apparatus DK can be used in the conference.

Figure 25:
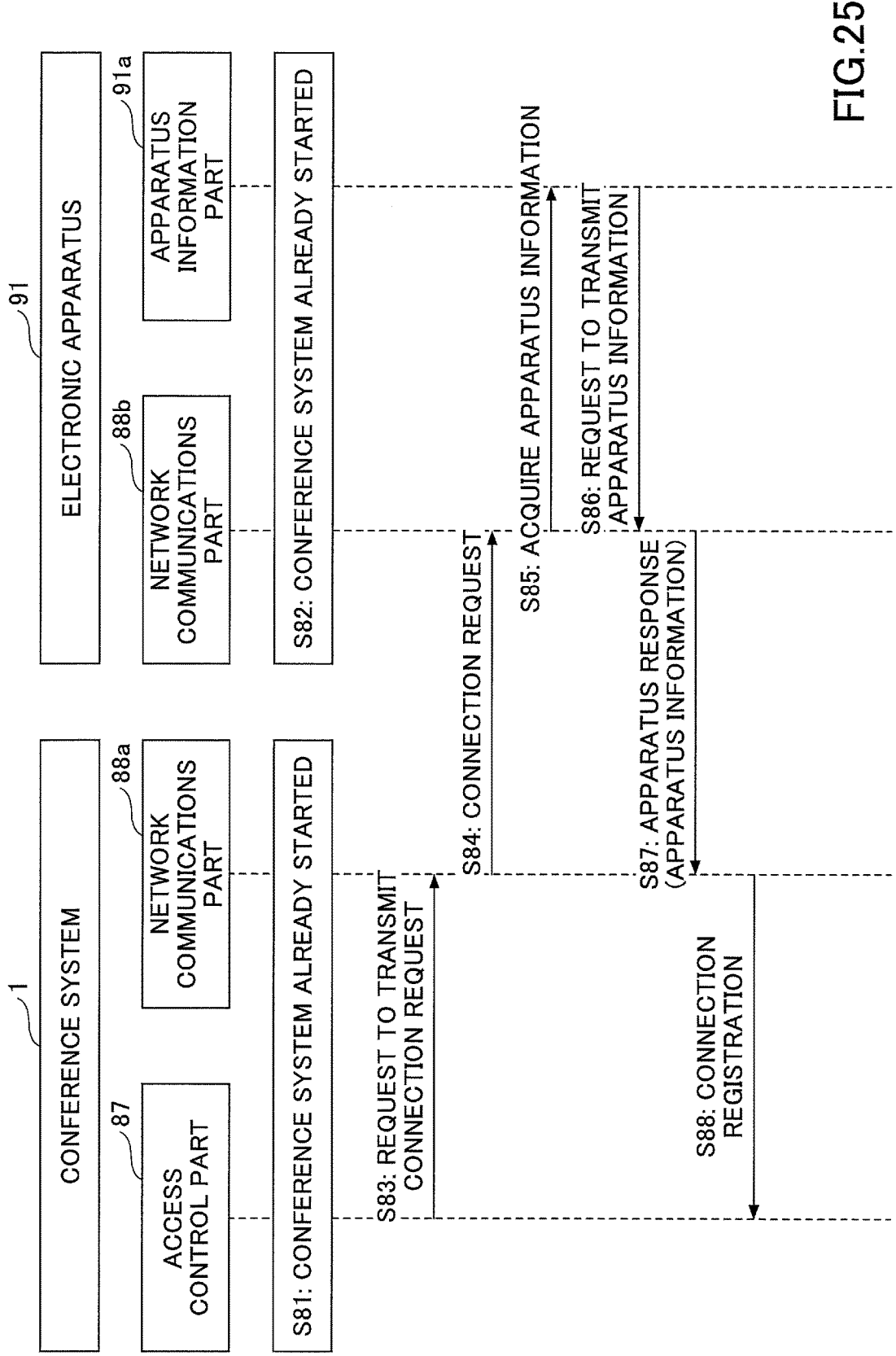
FIG. 25 is a sequence diagram illustrating an apparatus registration process.

Registration of the electronic apparatuses DK in the access level storage part 86 is carried out as a result of the access control part 87 carrying out an apparatus registration process shown in FIG. 25.

That is, the access control part 87 transmits a connection request transmission request to the electronic apparatus 91 via the network communications part 88a (S83, S84, S85), as shown in FIG. 25, in an appropriate timing after the conference system 1 is started (S81, S82).

Figure 26:
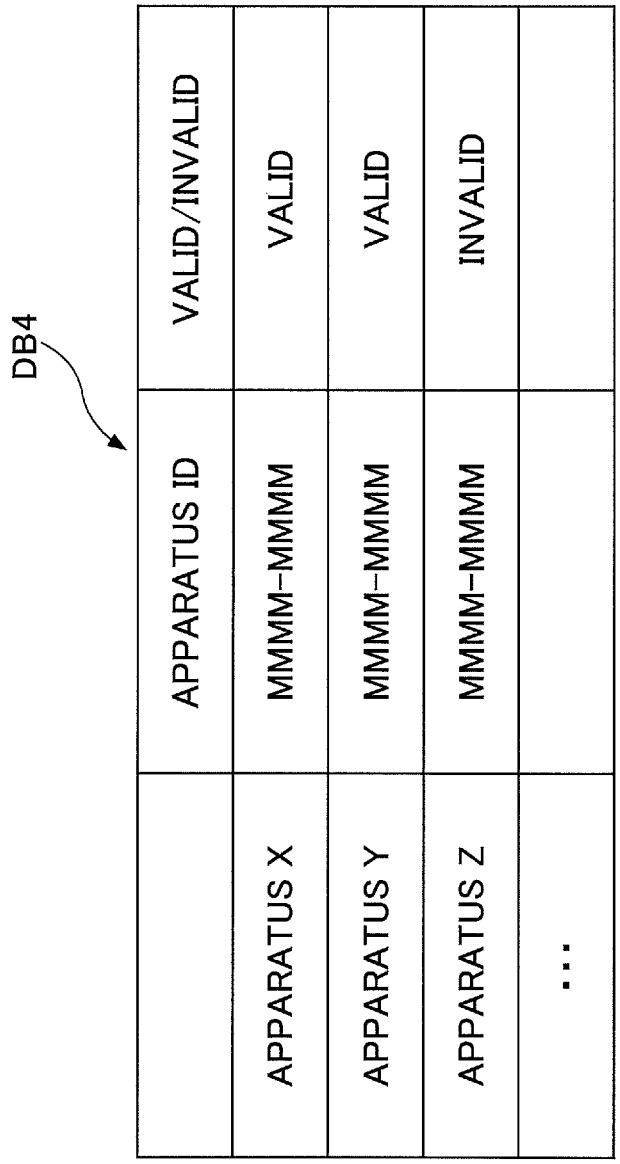
FIG. 26 illustrates one example of an apparatus database in an access level storage part.

After the electronic apparatus 91 thus receives the connection request via the network communications part 88*b*, the apparatus information part 91*a* acquires the apparatus identification information and the valid/invalid information as the necessary access level, and transmits them to the access control part 87 via the network communications parts 88*b* and 88*a* (S86, S87, S88). The access control part 87 resisters the apparatus identification information and the necessary access level of each electronic apparatus 91 thus transmitted from the electronic apparatus 91 in the access level storage part 86, for example, as an apparatus database DB4 shown in FIG. 26. In the apparatus databased DB4, for example, as shown in FIG. 26, "apparatus name", "apparatus ID" and the access level "valid/invalid" are registered.

Figure 27:
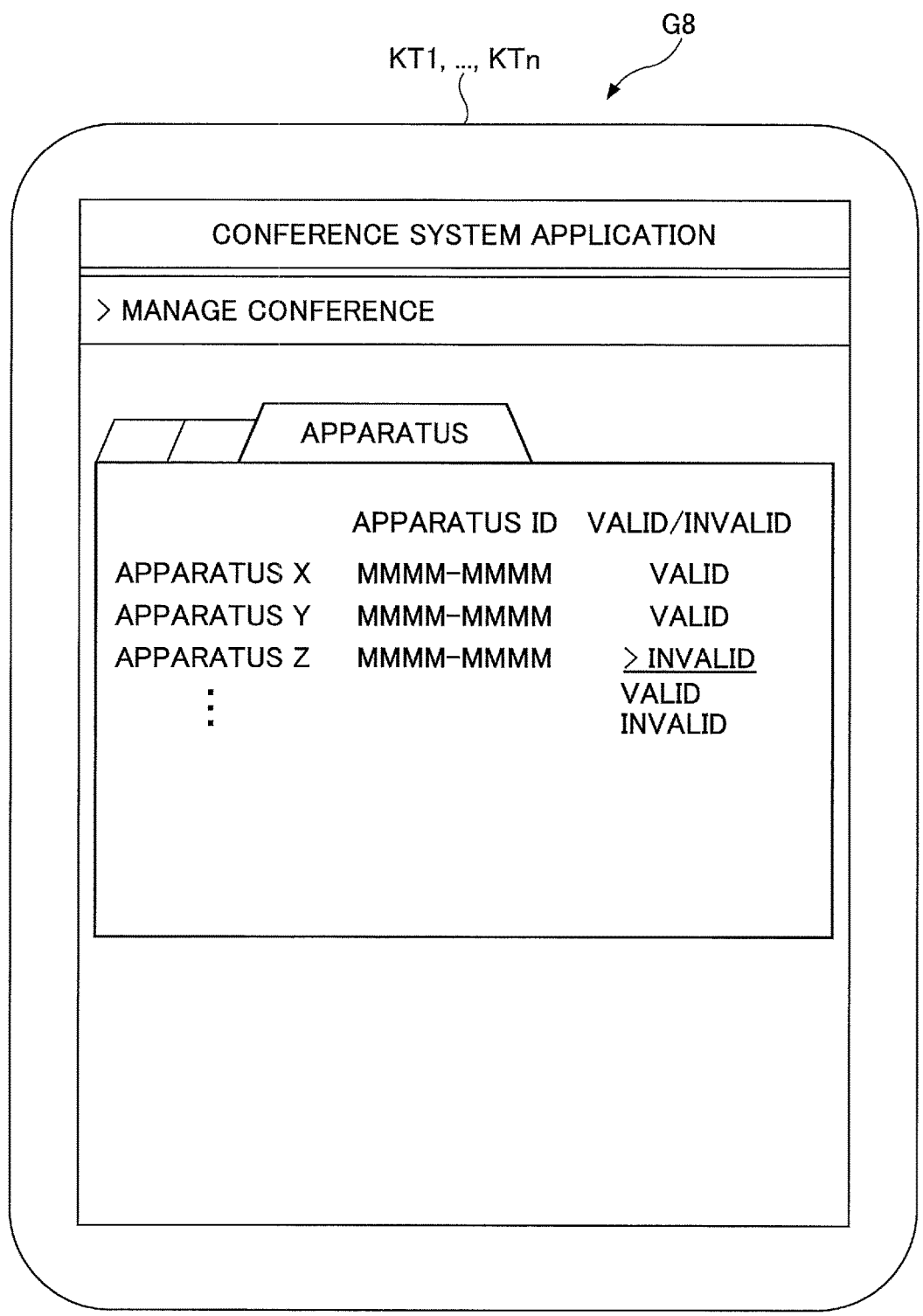
FIG. 27 illustrates one example of an apparatus information change screen page.

The users who have the apparatus information change authority among those having participated in the conference can change the apparatus information after switching the acquired apparatus list screen page G7 to an apparatus information change screen page G8 shown in FIG. 27, using the corresponding ones of the portable terminals KT1 through KTn. The apparatus information change screen page G8 of FIG. 27 shows a state where an operation of changing the information of "invalid" concerning the apparatus Z to "valid" is being performed.

Figure 28:
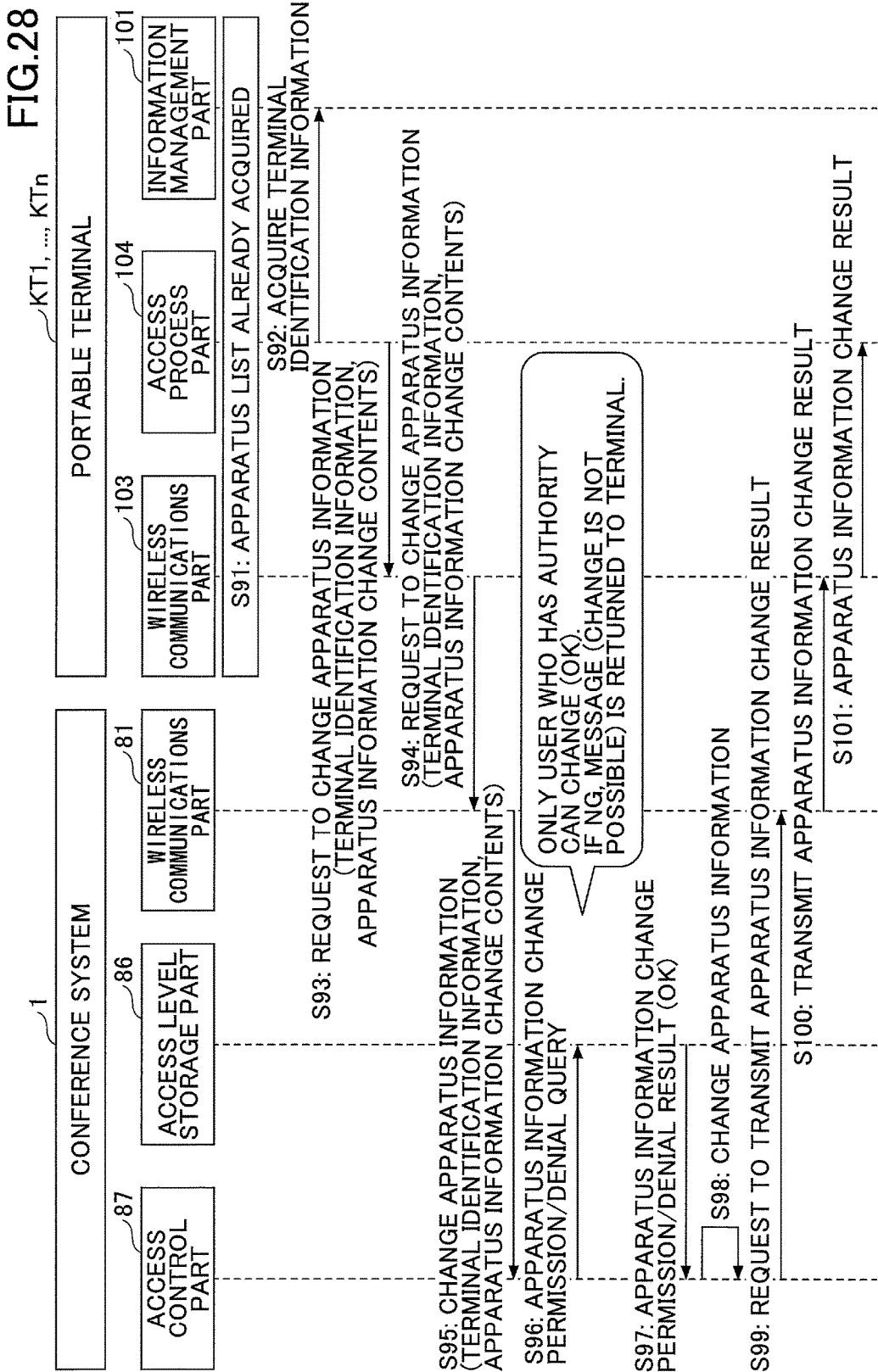
FIG. 28 is a sequence diagram illustrating an apparatus information change process.

If the user changes the apparatus information using the apparatus information change screen page G8, the access process part 104 acquires the terminal identification information of the own terminal from the information management part 101 (S92), as shown in FIG. 28. The access process part 104 sends an apparatus information change request together with the apparatus information change contents and the terminal identification information to the wireless communications part 103 (S93). The wireless communications part 103 transmits the apparatus information change request to the wireless communications part 81 of the conference system 1 together with the apparatus information change contents and the terminal identification information (S94).

After the wireless communications part 81 of the conference system 1 receives the apparatus information change request, it transfers the received apparatus information change request to the access control part 87 together with the apparatus information change contents and the terminal identification information (S95).

The access control part 87 reads the access level storage part 86 based on the terminal identification information to acquire information concerning whether the user of the terminal identification information has apparatus information change authority (S96). If the user of the terminal identification information has the apparatus information change authority (S97), the access control part 87 changes the apparatus information (valid/invalid) in the apparatus databased DB4 registered in the access level storage part 86 based on the apparatus information change contents (S98).

After the access control part 87 thus changes the apparatus information, it sends an apparatus information change result transmission request to the wireless communications part 81 (S99). The wireless communications part 81 transmits the apparatus information change result to the corresponding one of the portable terminals KT1 through KTn (S100), which has originally sent the apparatus information change request.

After the wireless communications part 103 of the corresponding one of the portable terminals KT1 through KTn receives the apparatus information change result, it transfers the apparatus information change result to the access process part 104 (S101).

The access process part 104 reports the user of the apparatus information change result by displaying the corresponding information on the display 71 or in another way.

Figure 29:
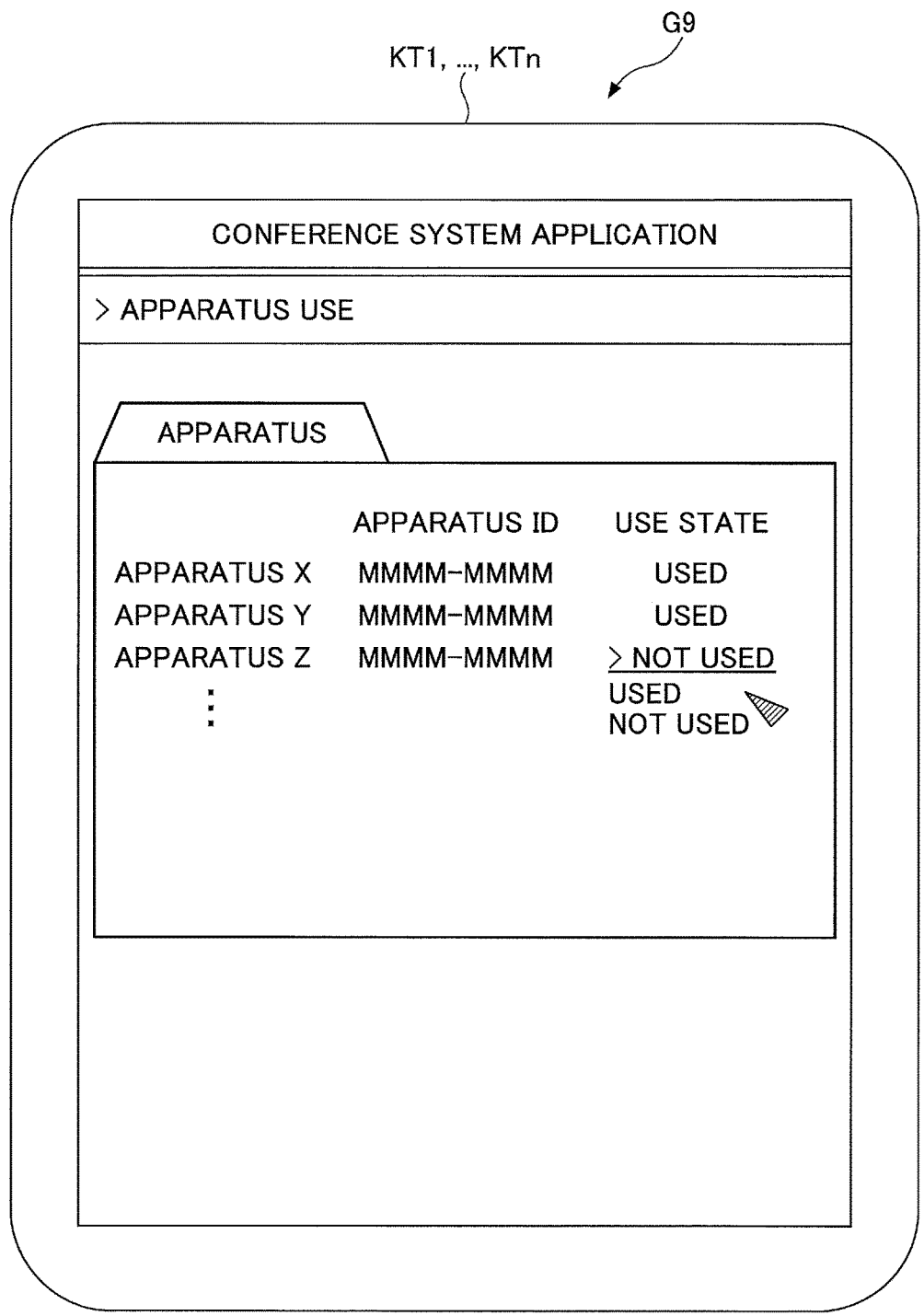
FIG. 29 illustrates one example of an apparatus use screen page.

Also, as a result of each user who has participated in the conference using the corresponding one of the portable terminals KT1 through KTn and operating the "use apparatus" button of the main screen page G1 shown in FIG. 13, a use apparatus screen page G9 shown in FIG. 29 is displayed. As a result of the user setting at the "use state" field for the electronic apparatus DK of the apparatus use screen page G9, which the user wishes to use, use of the apparatus is permitted or denied depending on the access level.

Figure 30:
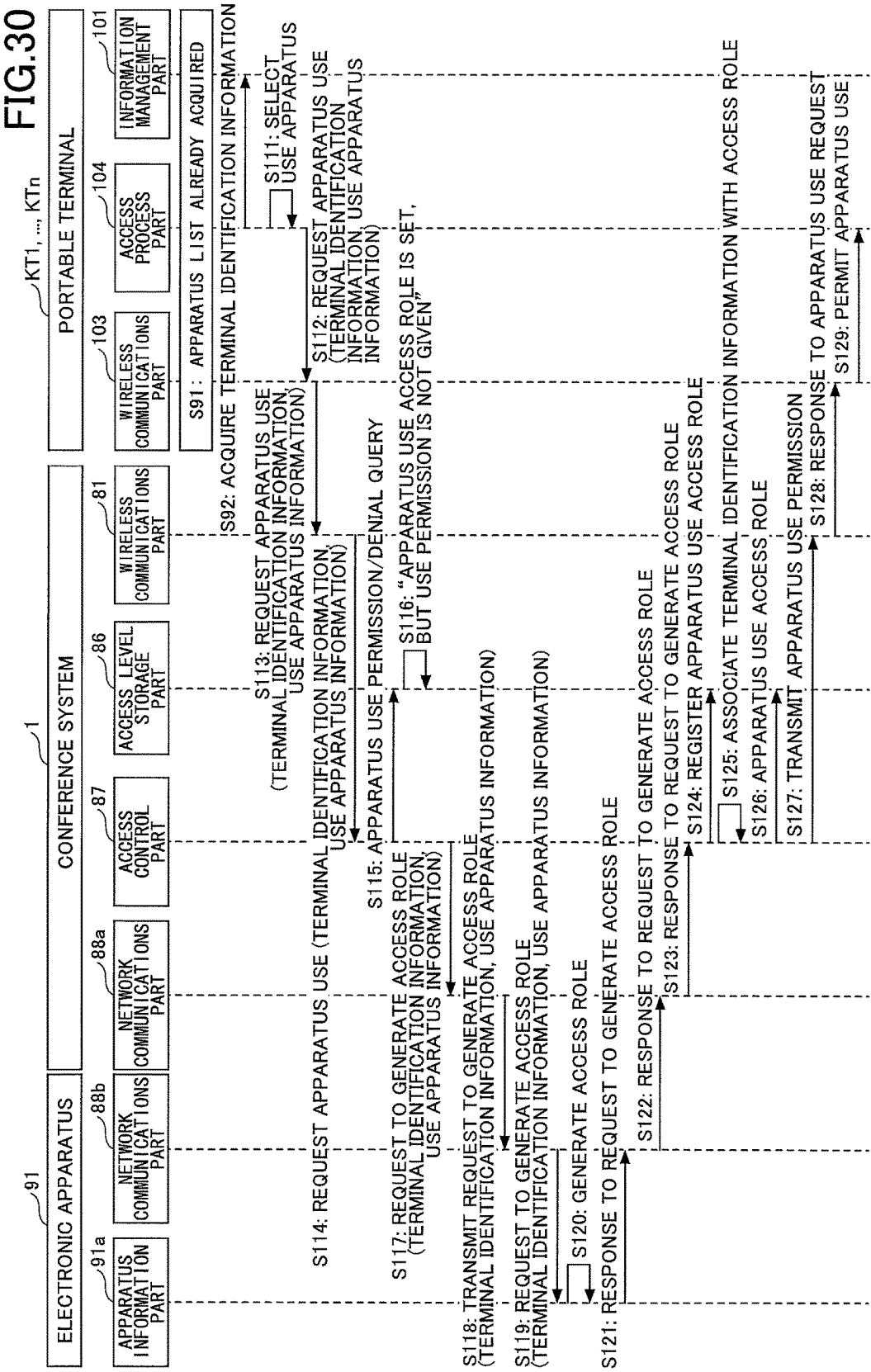
FIG. 30 is a sequence diagram illustrating an apparatus use permission process.

If the access process part 104 of the corresponding one of the portable terminals KT1 through KTn receives an apparatus use request, in which the apparatus to use is designated, it acquires the terminal identification information of the own terminal from the information management part 101 (S92), as shown in FIG. 30. The access process part 104 sends an apparatus use request to the wireless communications part 103 together with the apparatus information ("use apparatus information") of the electronic apparatus 91 requested to use and the terminal identification information (S111 and S112). The wireless communications part 103 transmits the apparatus use request to the wireless communications part 81 of the conference system 1 together with the use apparatus information and the terminal identification information (S113).

After the wireless communications part 81 of the conference system 1 receives the apparatus use request, it transfers the received apparatus use request to the access control part 87 together with the use apparatus information and the terminal identification information (S114).

The access control part 87 reads the access level storage part 86 based on the terminal identification information to determine whether the corresponding terminal is permitted to use the apparatus (S115).

Here, it is assumed that although an apparatus use access role has been set, use permission has not been set yet (S116).

The access control part 87 sends an access role generation request to the network communications part 88*a* together with the terminal identification information and the use apparatus information (S117), and the network communications part 88*a* transmits an access role generation request to the electronic apparatus 91 via the network communications part 88*b* (S118).

After the apparatus information part 91*a* of the electronic apparatus 91 receives the access role generation request (S119), it generates an access role (S120), and transfers an access role generation request response to the network communications part 88*b* (S121), which then transmits the access role generation request response to the network communications part 88*a* (S122).

The access control part 87 then receives the access role generation request response via the network communications part 88*a* (S123), and registers the apparatus use access role in the access level storage part 86 (S124) while associating the terminal identification information with the access role (S125).

After the access control part 87 thus registers the access role, it generates an apparatus use access role for the user of the corresponding one of the portable terminals KT1 through KTn of the terminal identification information (S126), and sends an apparatus use permission transmission request to the wireless communications part 81 (S127).

The wireless communications part 81 sends an apparatus use request response ("an apparatus use permission response") to the wireless communications part 103 of the corresponding one of the portable terminals KT1 through KTn (S128), and the wireless communications part 103 transfers the apparatus use permission response to the access process part 104 (S129).

The access process part 104 reports an apparatus use permission result to the user by displaying the corresponding information on the display 71, or in another way.

Figure 31:
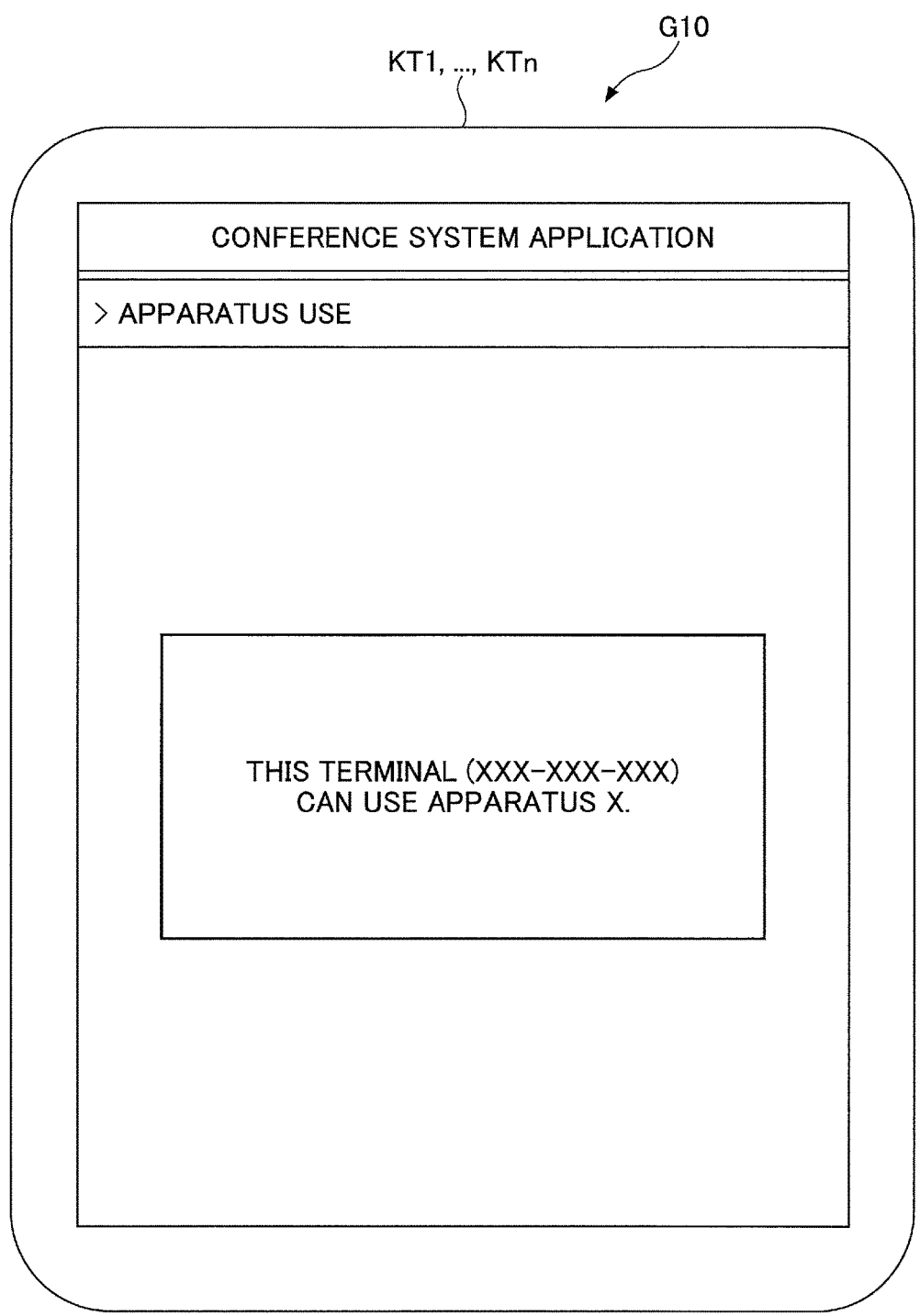
FIG. 31 illustrates one example of an apparatus use permission result screen page.

If the apparatus use permission result thus indicates "apparatus use permission", the access process part 104 displays, for example, an apparatus use result screen page G10 shown in FIG. 31 on the display 71. The apparatus use result screen page G10 includes a message "this terminal can use the apparatus X" or the like to indicate that the apparatus can be used.

Figure 32:
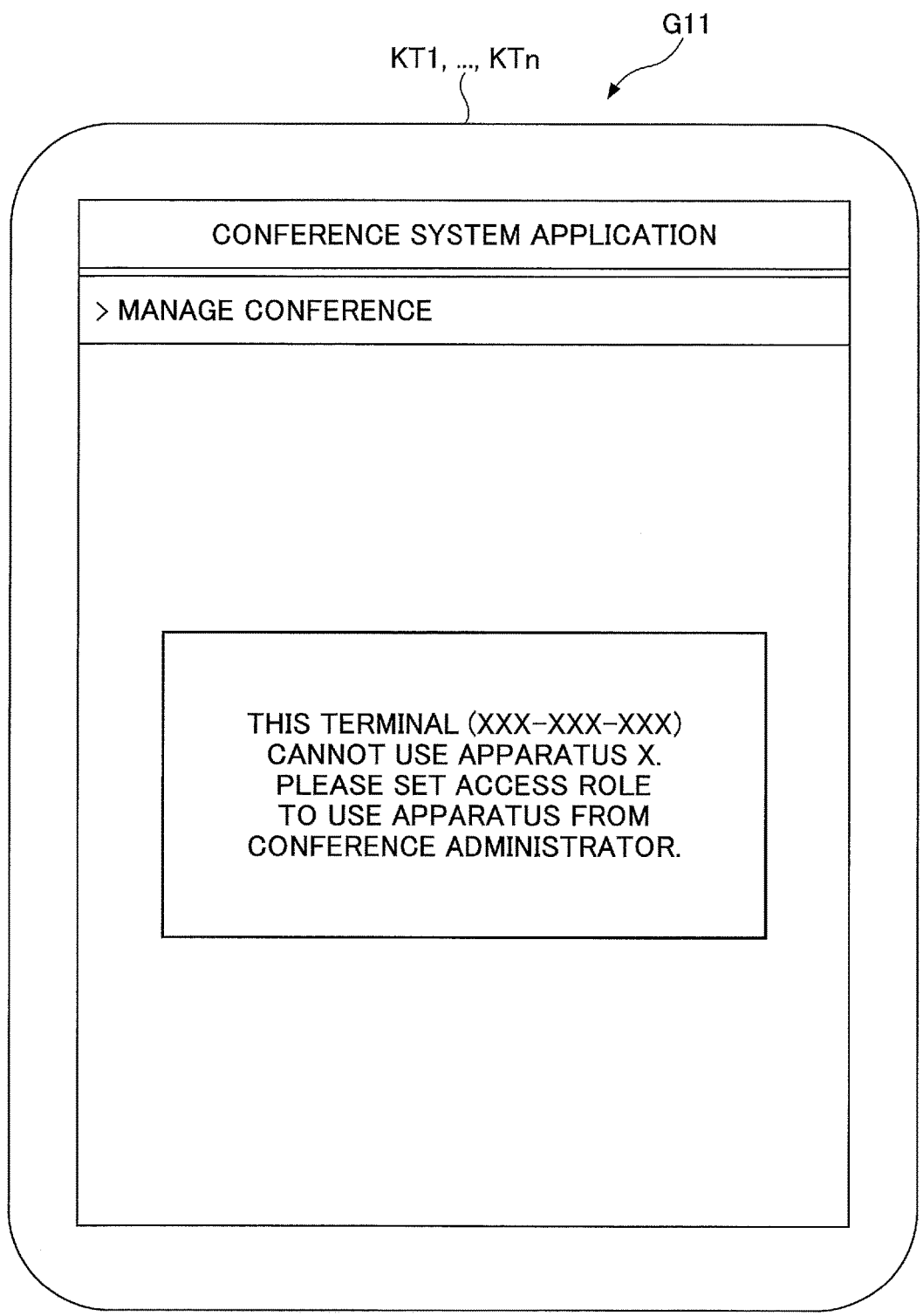
FIG. 32 illustrates one example of an apparatus use denial result screen page.

If the apparatus use permission result indicates "apparatus use denial", the access process part 104 displays, for example, an apparatus use result screen page G11 as shown in FIG. 32, on the display 71. The apparatus use result screen page G11 includes a message "this terminal cannot use the apparatus X" or the like to indicate that the apparatus cannot be used.

Figure 33:
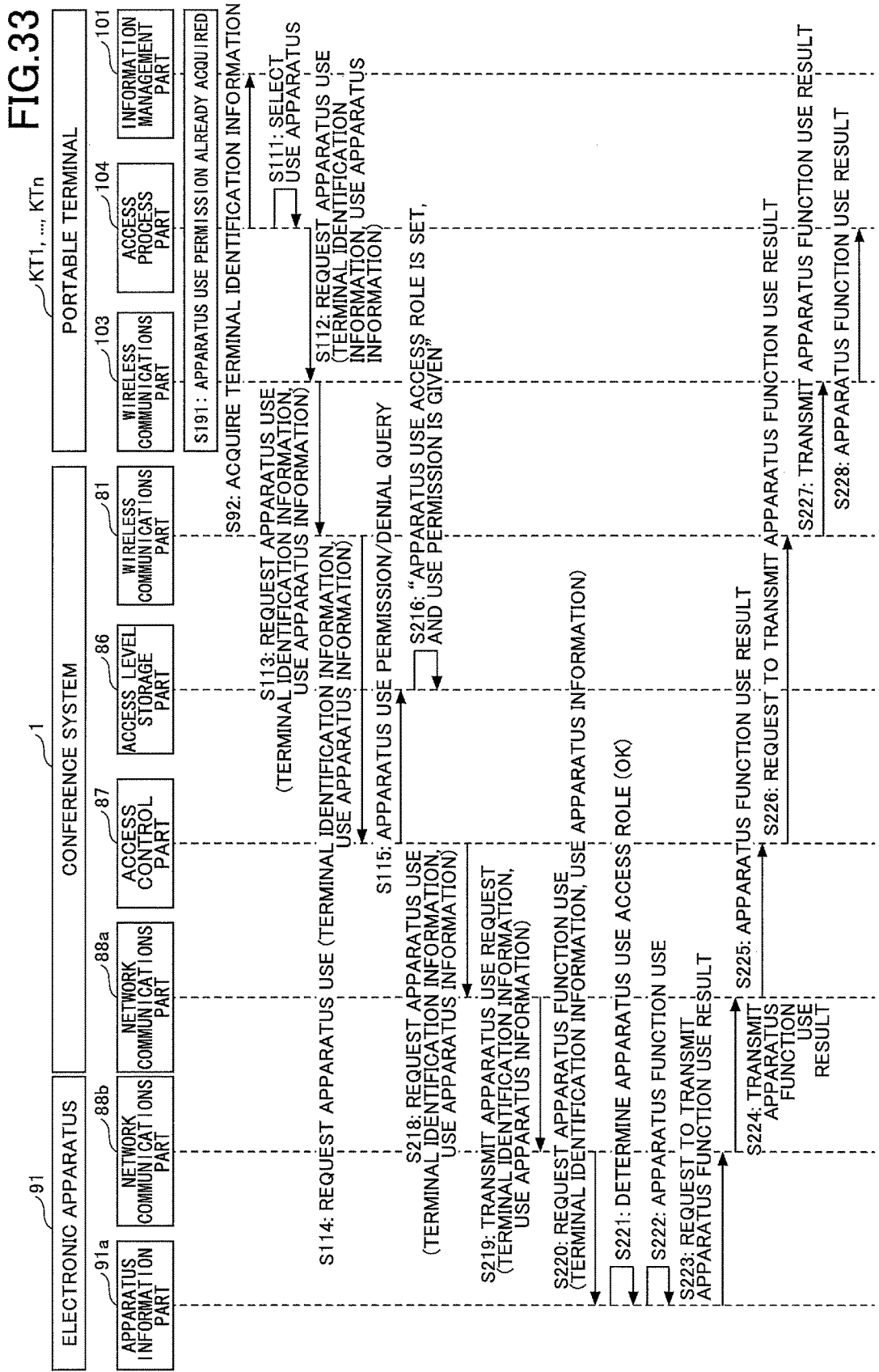
FIG. 33 is a sequence diagram illustrating an apparatus use process.

Further, if an apparatus use request, in which the apparatus to use is designated, is given in a state where the apparatus use permission has been acquired (S191 of FIG. 33), the access process part 104 acquires the terminal identification information of the own terminal from the information management part 101 (S92), as shown in FIG. 33. The access process part 104 sends the apparatus use request to the wireless communications part 103 together with the apparatus information (the use apparatus information) of the electronic apparatus 91 that is requested to use and the terminal identification information (S111, S112). The wireless communications part 103 transmits the apparatus use request to the wireless communications part 81 of the conference system 1 together with the use apparatus information and the terminal identification information (S113).

After the wireless communications part 81 of the conference system 1 receives the apparatus use request, it transfers the received apparatus use request to the access control part 87 together with the terminal identification information and the use apparatus information (S114).

The access control part 87 reads the access level storage part 86 based on the terminal identification information to determine whether the apparatus can be used (S115).

Here, it is assumed that the apparatus use access role has been set and use permission has been given (S216).

The access control part 87 transfers the apparatus use request together with the terminal identification information and the use apparatus information to the network communications part 88*a* (S218), and the network communications part 88*a* transmits the apparatus use request to the electronic apparatus 91 via the network communications part 88*b* (S219).

After the apparatus information part 91*a* of the electronic apparatus 91 receives the apparatus use request (S220), it determines the access role of the portable terminal identified by the terminal identification information for the electronic apparatus 91 (S221). In this case, the portable terminal has the access authority to be able to use the electronic apparatus 91, and therefore, a corresponding function (for example, printing print data using the printer engine) is actually executed (S222) in the electronic apparatus 91. As a result, the apparatus information part 91*a* of the electronic apparatus 91 transfers an apparatus function use result transmission request to the network communications part 88*b* to request it to transmit the result that the apparatus function has been thus used (S223).

In response to the apparatus function use result transmission request, the network communications part 88*b* transmits the apparatus function use result to the network communications part 88*a* (S224).

After the access control part 87 receives the apparatus function use result (S225), it sends an apparatus function use result transmission request to the wireless communications part 81 (S226).

The wireless communications part 81 transmits the apparatus function use result to the wireless communications part 103 of the corresponding one of the portable terminals KT1 through KTn (S227), and the wireless communications part 103 transfers the apparatus function use result to the access process part 104 (S228).

The access process part 104 reports the apparatus function use result to the user by displaying the corresponding information on the display 71 or by another way.

Then, if an access request is sent from one of the portable terminals KT1 through KTn of the user who has participated in the conference, the conference system 1 carries out an access process such as that shown in FIGS. 34-50 depending on the user's access authority. For the access process, the conference system 1 creates the shared storage area 92*a* in the storage part 92, and carries out various sorts of an access process using the shared storage area 92*a*.

Figure 34:
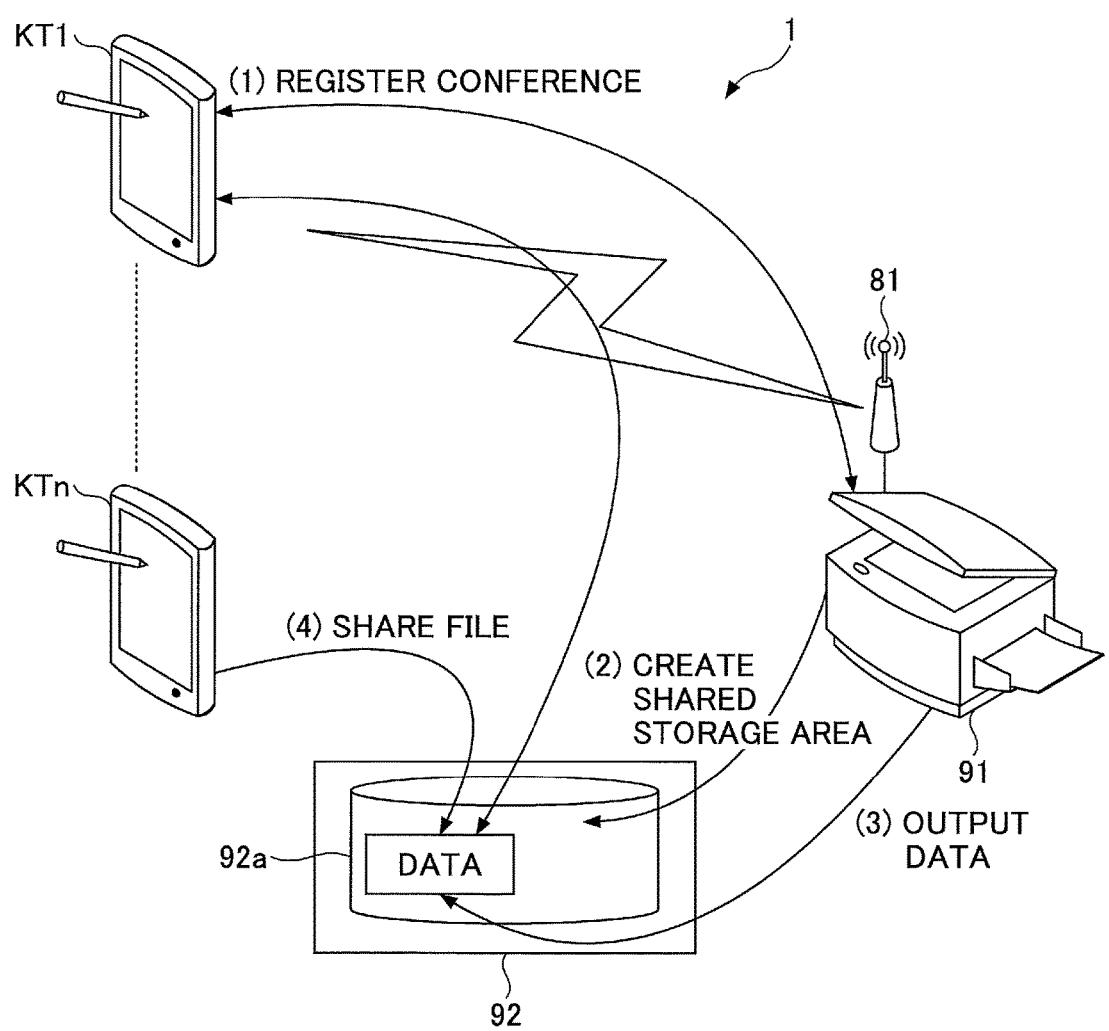
FIG. 34 illustrates a shared storage area creation process.

As shown in FIG. 34, in the conference system 1, the user of the conference can use the shared storage area 92*a* created the storage part 92 of the electronic apparatus 91 that can be the conference server SV, and store and share a document file for a conference, using the corresponding one of the portable terminals KT1 through KTn. Actually, after the conference is started ((1)), and a request is given by one of the portable terminals KT1 through KTn to use the electronic apparatus 91, the access control part 87 of the conference system 1 creates an access role (access authority) in the access level storage part 86 and the apparatus information part 91*a* of the electronic apparatus 91, and creates the shared storage area 92*a* in the storage part 92 ((2)), as described above. Under the control of the access control part 87, the conference system 1 permits an access from each of the portable terminals KT1 through KTn of the users who have participated in the conference depending on the user's access authority, and permits storing, editing, deleting, or the like, of the data ((3) and (4)).

Figure 35:
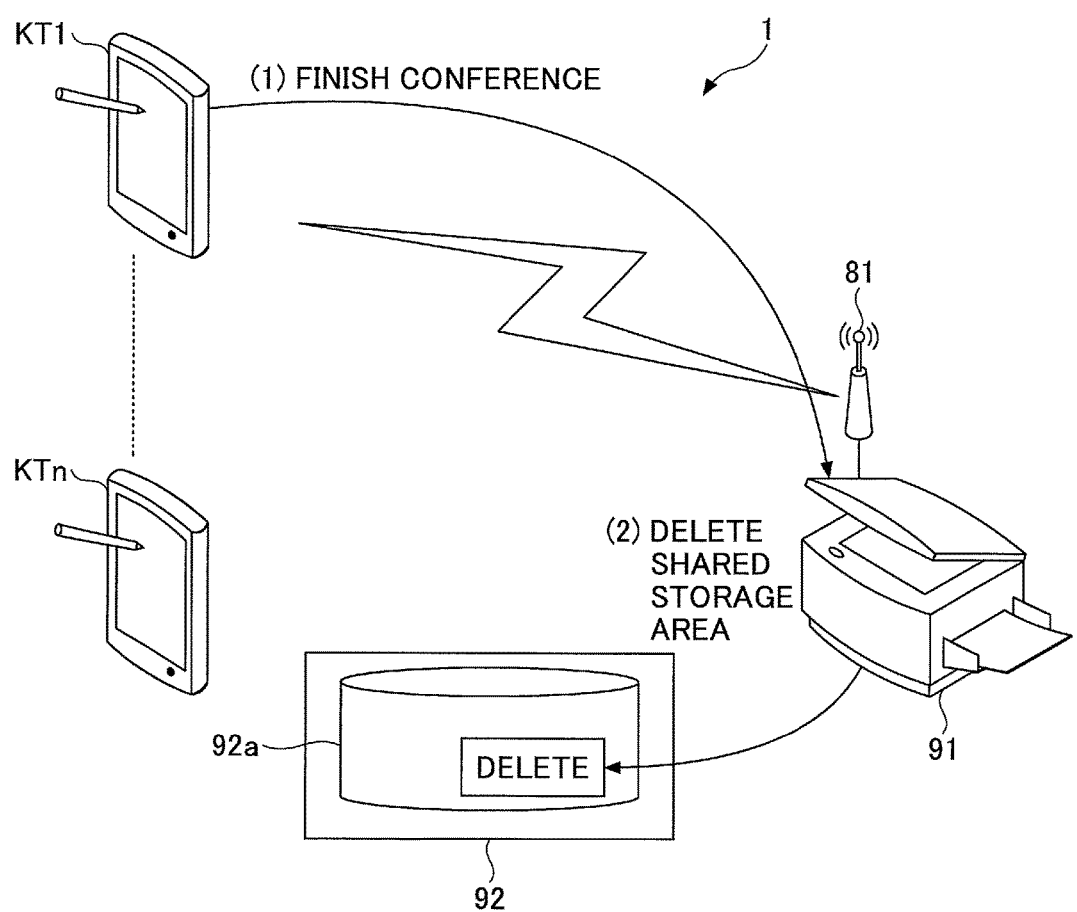
FIG. 35 illustrates a process of deleting data from a shared storage area at a time of the end of a conference.

As shown in FIG. 35, if, for example, a "finish conference" instruction is sent from the portable terminal KT1 of the conference administrator ((1)), the access control part 87 of the conference system 1 deletes the shared storage area 92*a* created in the storage part 92 and deletes the data stored in the shared storage area 92*a* ((2)).

Figure 36:
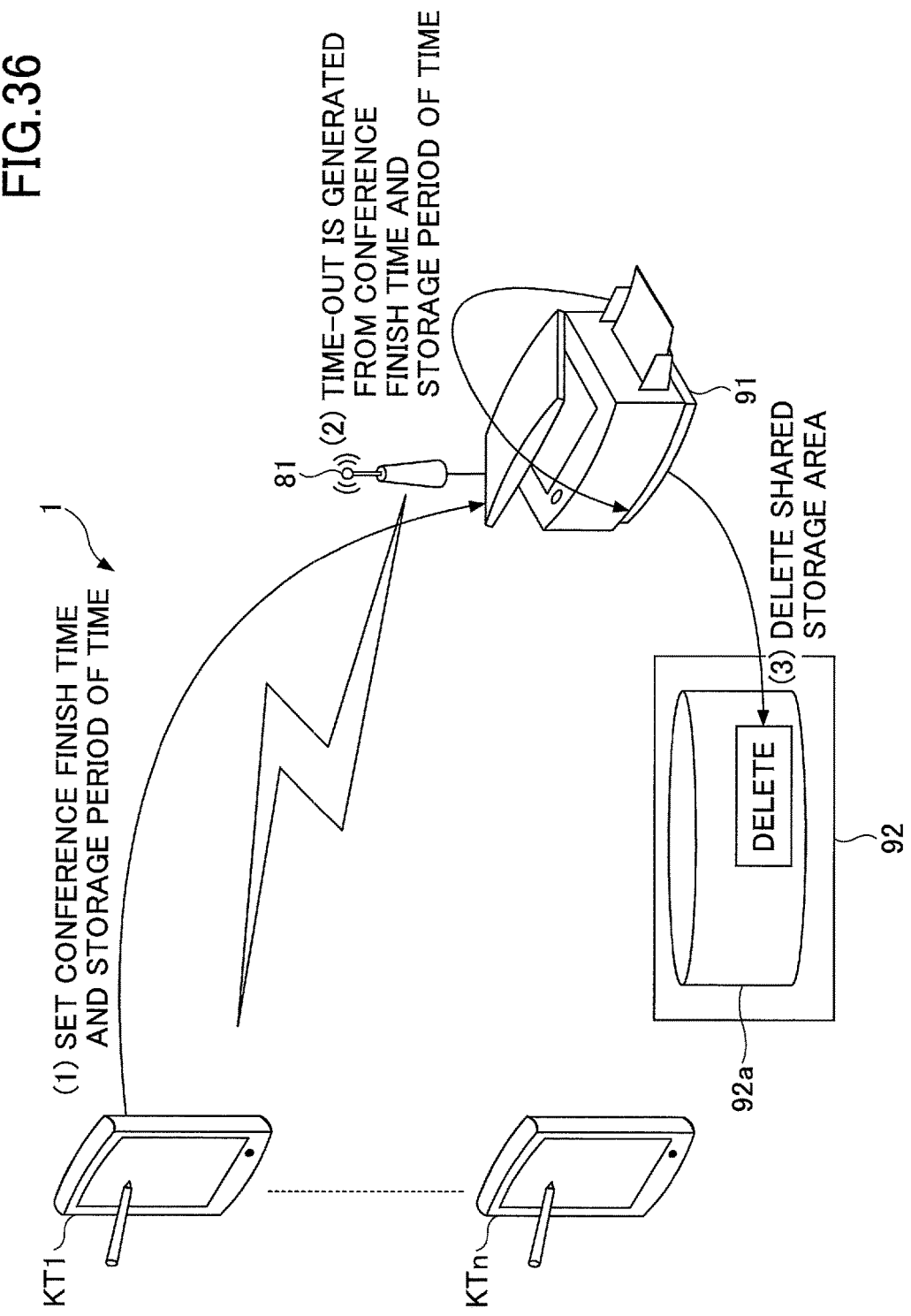
FIG. 36 illustrates a process of deleting data from the shared storage area based on time.

In this case, as shown in FIG. 36, the access control part 87 can delete the shared storage area 92*a* created in the storage part 92 and delete the data stored in the shared storage area 92*a* ((3)) based on the conference finish time and the storage period of time that are previously set by the conference administrator or the like ((1) and (2)).

Figure 37:
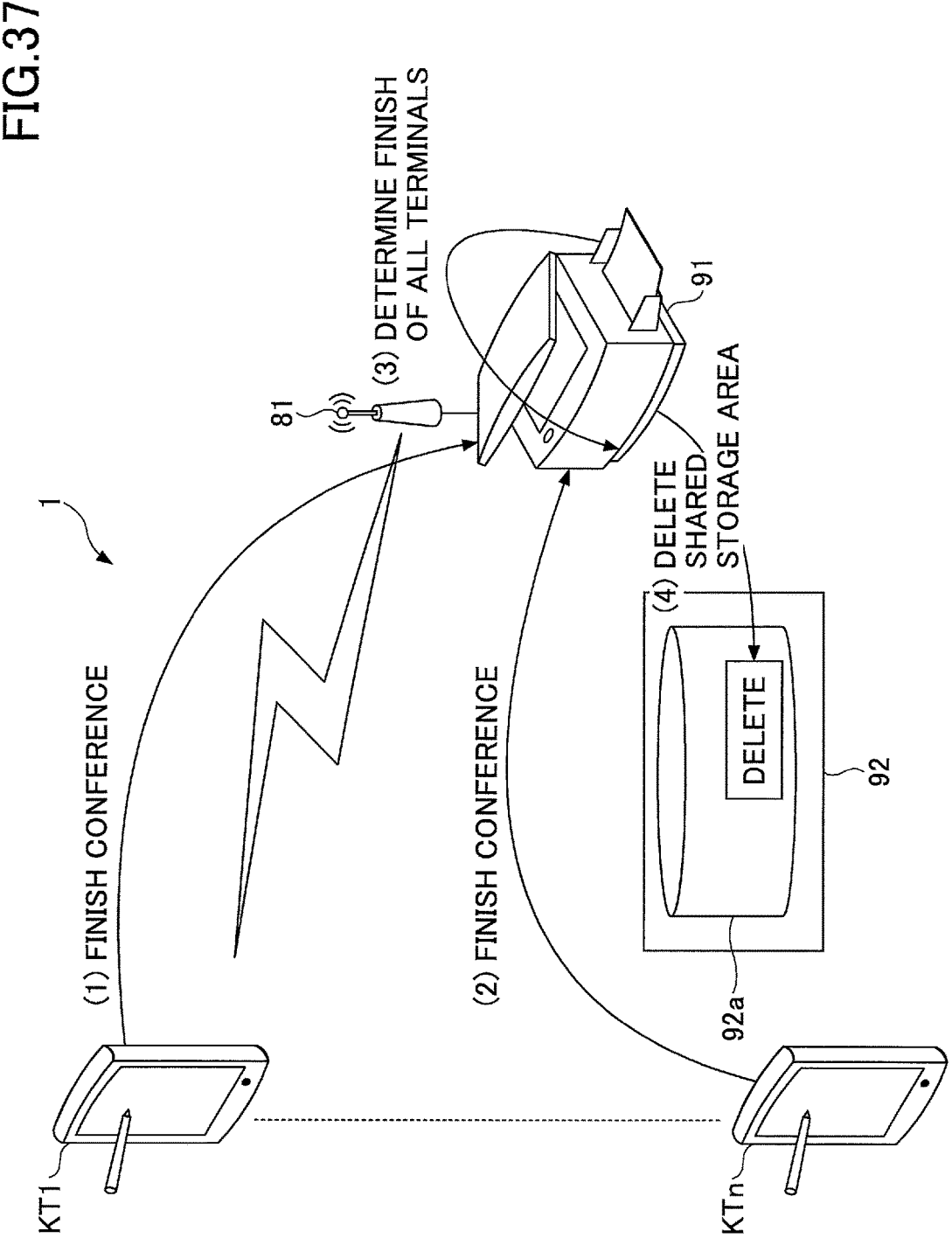
FIG. 37 illustrates a process of deleting data from the shared storage area due to the end of a conference at all the portable terminals.

Also, as shown in FIG. 37, if the communications determination part 89 detects that operations to finish the conference are performed on the portable terminals KT1 through KTn of all the participants of the conference ((1) and (2)), or the portable terminals KT1 through KTn of all the participants of the conference become out of the communications range of the wireless communications part 81, and sends conference finish information ((3)), the access control part 87 can delete the shared storage area 92a and the data in the shared storage area 92a ((4)).

Figure 38:
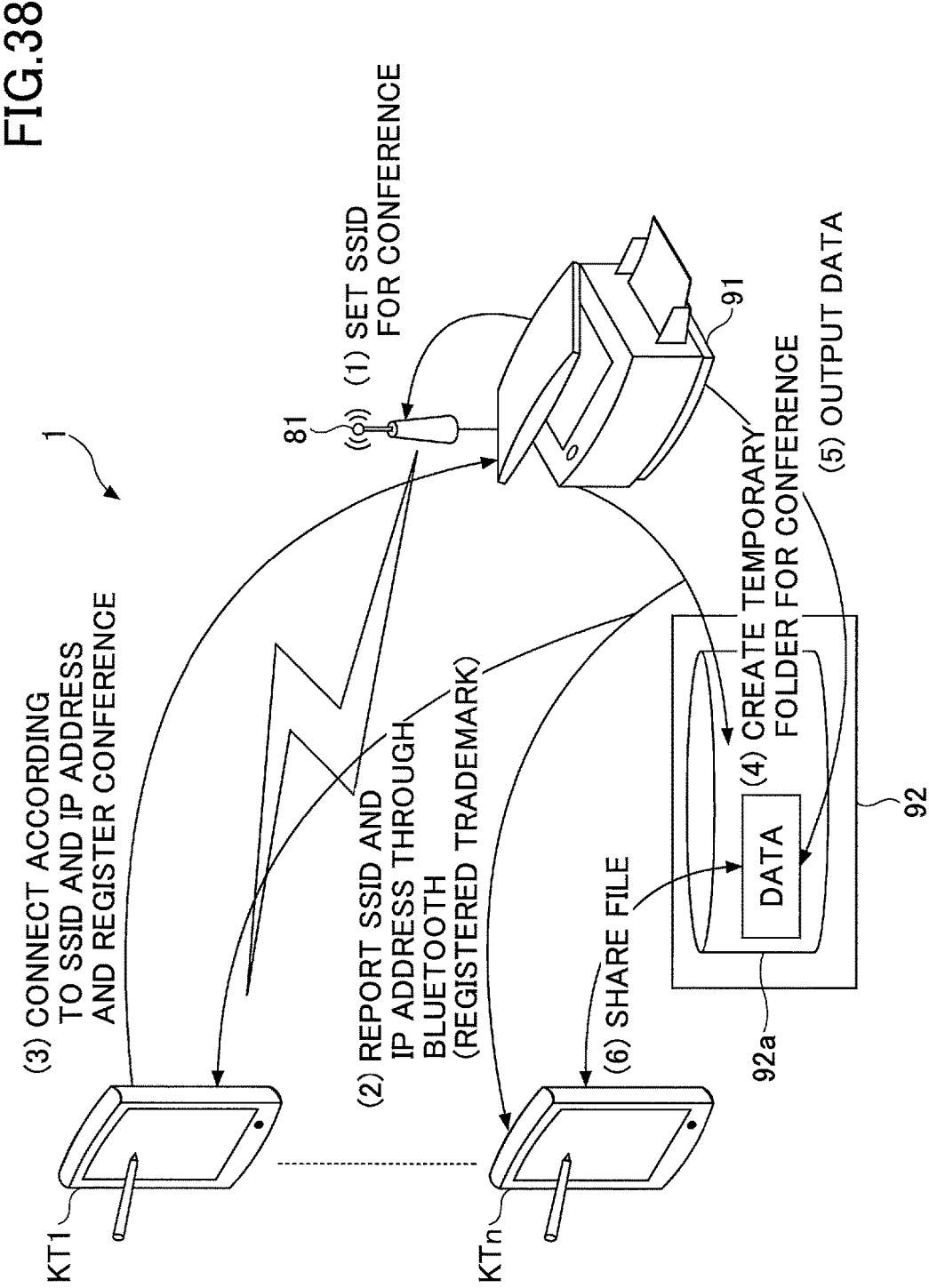
FIG. 38 illustrates a process of creating the shared storage area due to a conference administrator's conference registration.

As shown in FIG. 38, communications information (an SSID, an IP address) is sent to the portable terminals KT1 through KTn ((1) and (2)) from the short-range communications part 82 using Bluetooth or the like, and, for example, the portable terminal KT1 of the conference administrator uses the communications information to carry out the conference registration in the wireless communications part 81 ((3)). After the portable terminal KT1 of the conference administrator thus carries out the conference registration, the access control part 87 creates the shared storage area 92a in the storage part 92 ((4)) such that file exchange using the shared storage area 92a can be carried out using the portable terminals KT1 through KTn that have participated in the conference.

Figure 39:
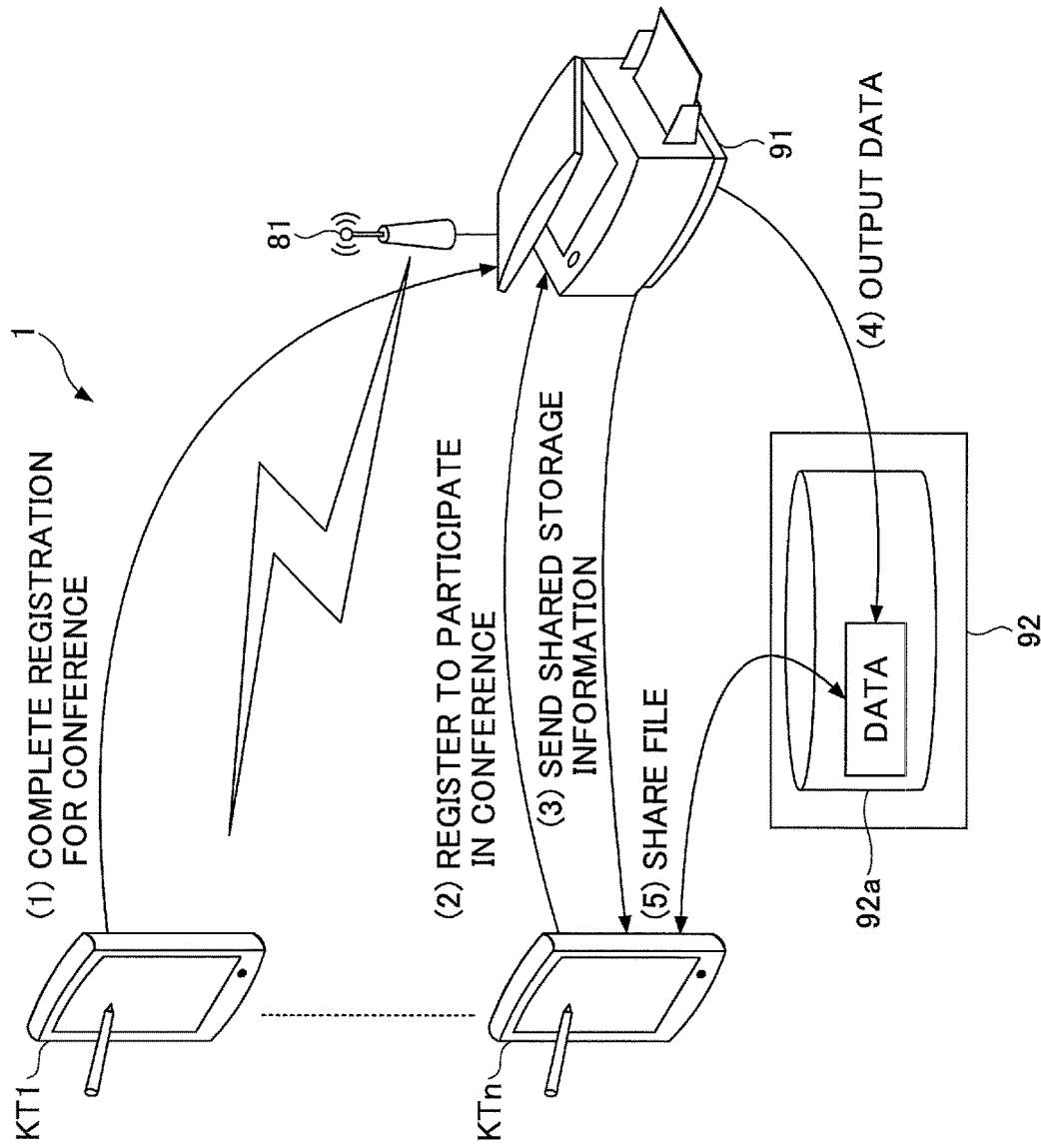
FIG. 39 illustrates a process of sharing the shared storage area by the conference participants.

Also, as shown in FIG. 39, if, under the condition where the shared storage area 92a has been created ((1)), another one of the portable terminal KT2 through KTn than the portable terminal KT1 of the conference administrator carries out conference participation registration ((2)), the access control part 87 sends an information concerning the shared storage area 92a to the other one of the portable terminal KT2 through KTn ((3)). Thereby, also the user of the other one of the portable terminals KT2 through KTn can share the data using the shared storage area 92a ((4) and (5)), and carries out the conference.

Figure 40:
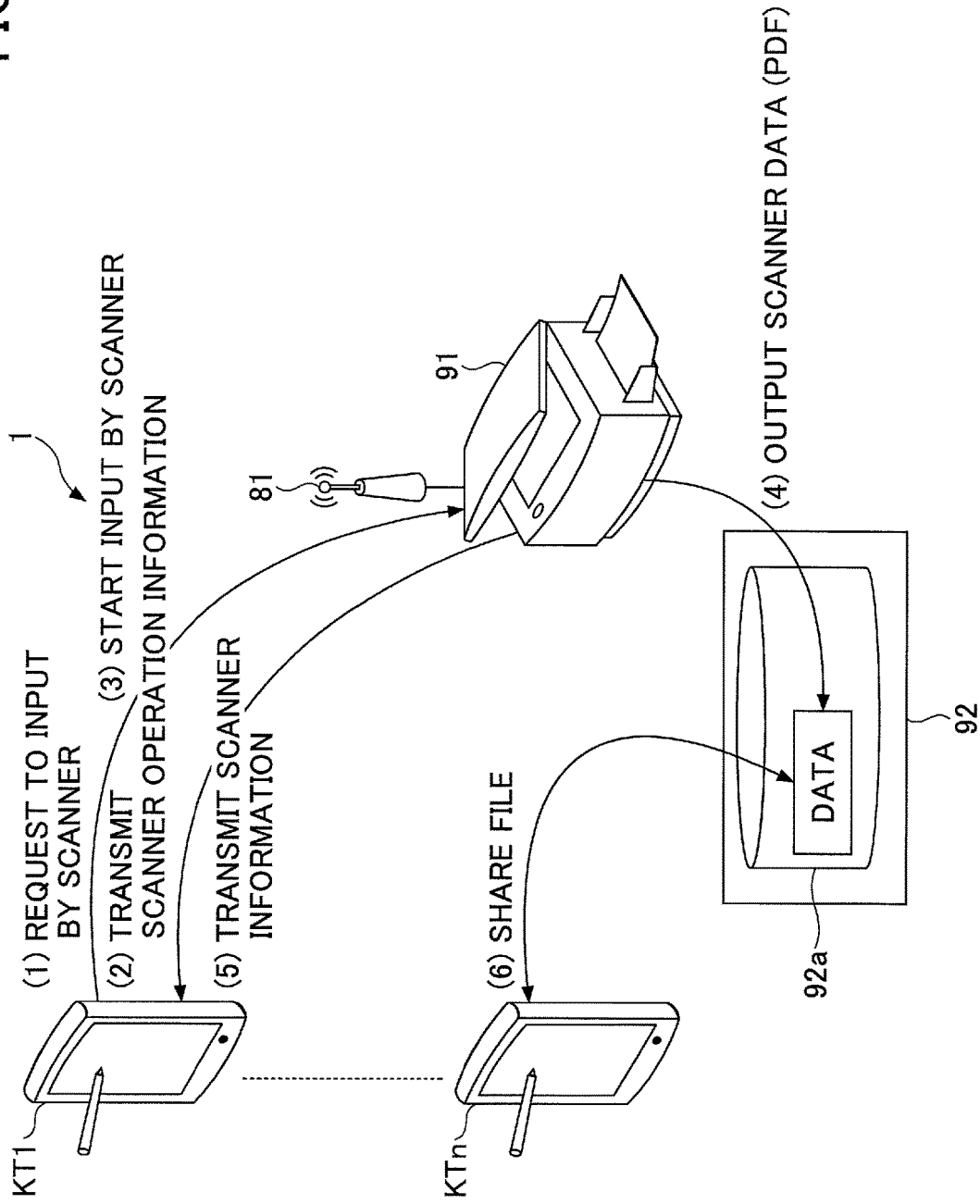
FIG. 40 illustrates a process of sharing scanner data using the shared storage area.

For example, as shown in FIG. 40, if one of the portable terminals KT1 through KTn sends a scanner input request ((1)), the access control part 87 of the conference system 1 transmits scanner operation information necessary to operate the scanner to the one of the portable terminals KT1 through KTn depending on the access authority ((2)). If a scanner input start instruction is sent from the one of the portable terminals KT1 through KTn ((3)), to which the scanner operation information has been sent, the access control part 87 carries out a scanner operation on the designated electronic apparatus 91, stores the thus acquired scanner information in the shared storage area 92a ((4)), and transmits a corresponding thumbnail image to the one of the portable terminals KT1 through KTn ((5)). The access control part 87 permits sharing the scanner information with the other ones of the portable terminals KT1 through KTn using the shared storage area 92a.

Figure 41:
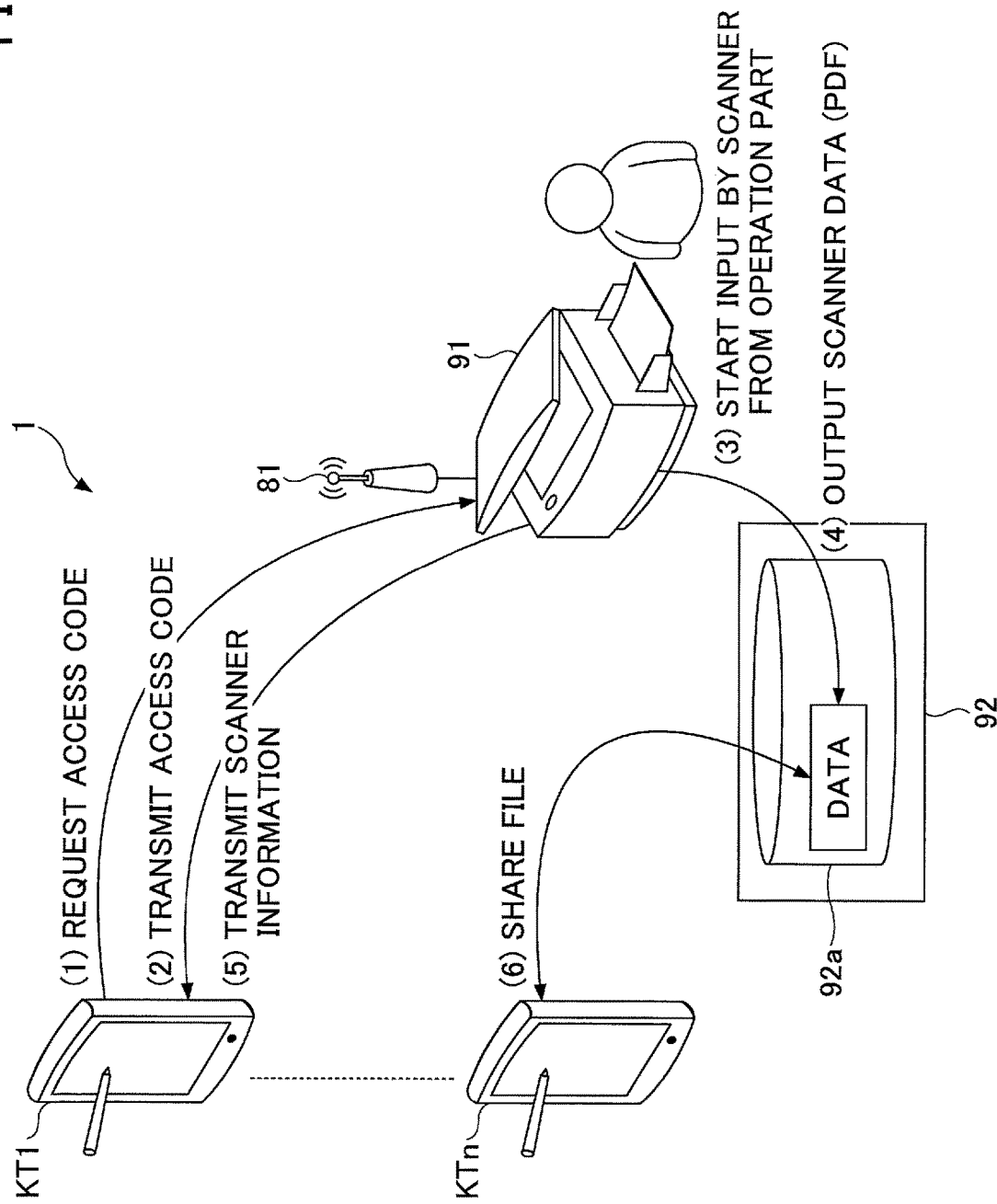
FIG. 41 illustrates a process of sharing scanner data using the shared storage area as a result of an electronic apparatus being operated.

Also, according to the conference system 1, as shown in FIG. 41, if one of the portable terminals KT1 through KTn of the user who has the access authority sends a request to acquire an access code for the electronic apparatus 91 ((1)), the access control part 87 transmits the access code to the corresponding one of the portable terminals KT1 through KTn. The user of the corresponding one of the portable terminals KT1 through KTn can thus carry out a scanner operation by using the access code to operate the electronic apparatus 91, or another operation thereon.

Figure 42:
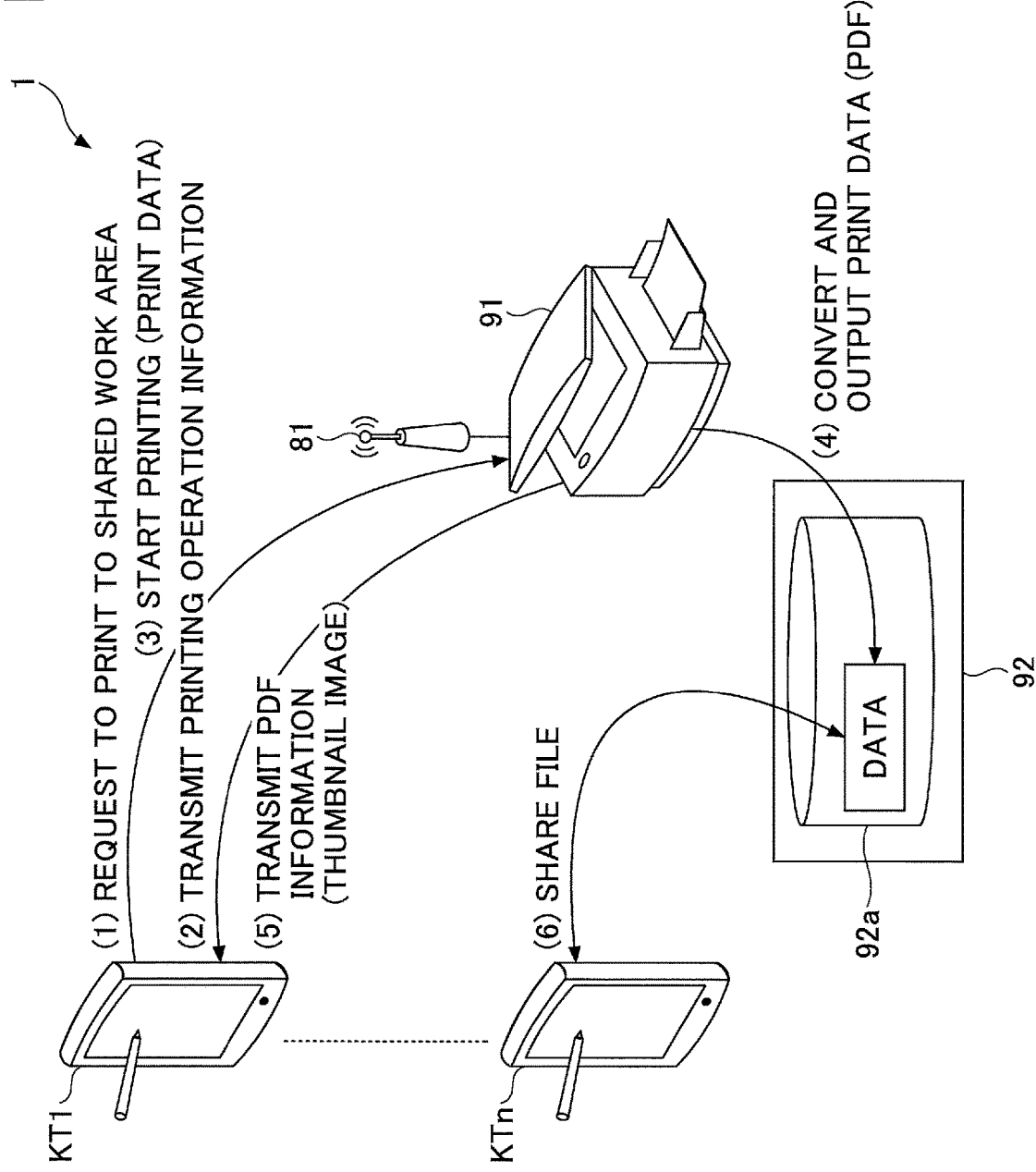
FIG. 42 illustrates a process of sharing print data using the shared storage area.

Further, according to the conference system 1, as shown in FIG. 42, each of the portable terminals KT1 through KTn can transmit print data to the electronic apparatus 91 for outputting it through the electronic apparatus 91 ((1), (2) and (3)), or convert the print data to PDF, or the like ((4)), to share it using the shared storage area 92a with the users of the other ones of the portable terminals KT1 through KTn.

Figure 43:
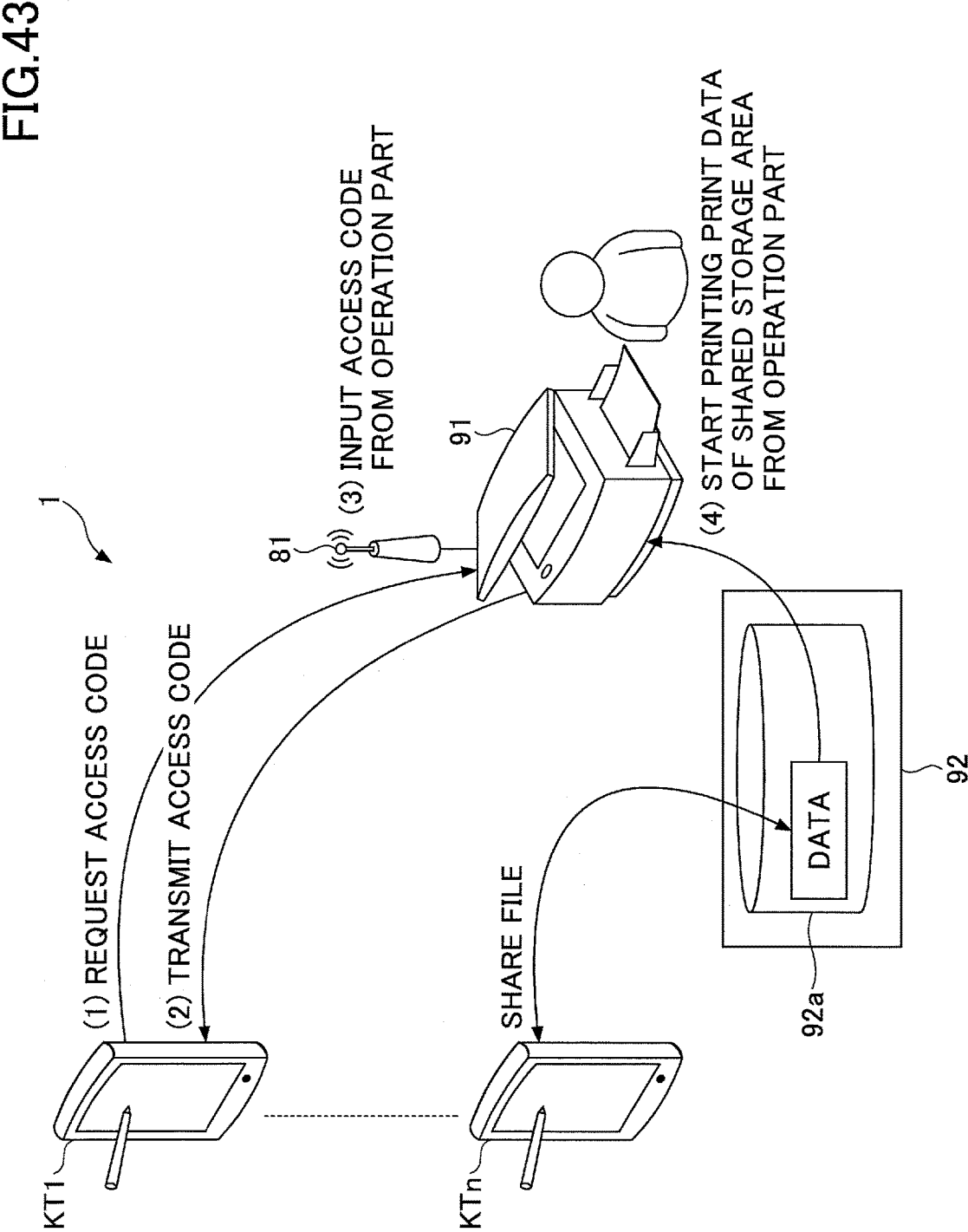
FIG. 43 illustrates a process of printing data stored in the shared storage area as a result of an electronic apparatus being operated.

Also, according to the conference system 1, as shown in FIG. 43, if one of the portable terminals KT1 through KTn of the user who has the access authority requests to acquire an access code for the electronic apparatus 91 ((1)), the access control part 87 transmits the access code to the corresponding one of the portable terminals KT1 through KTn ((2)). Then, as a result of the user of the one of the portable terminals KT1 through KTn using the access code to operate the electronic apparatus 91, the user can print data stored in the shared storage area 92, or carry out another sort of process on the data through the electronic apparatus 91.

Figure 44:
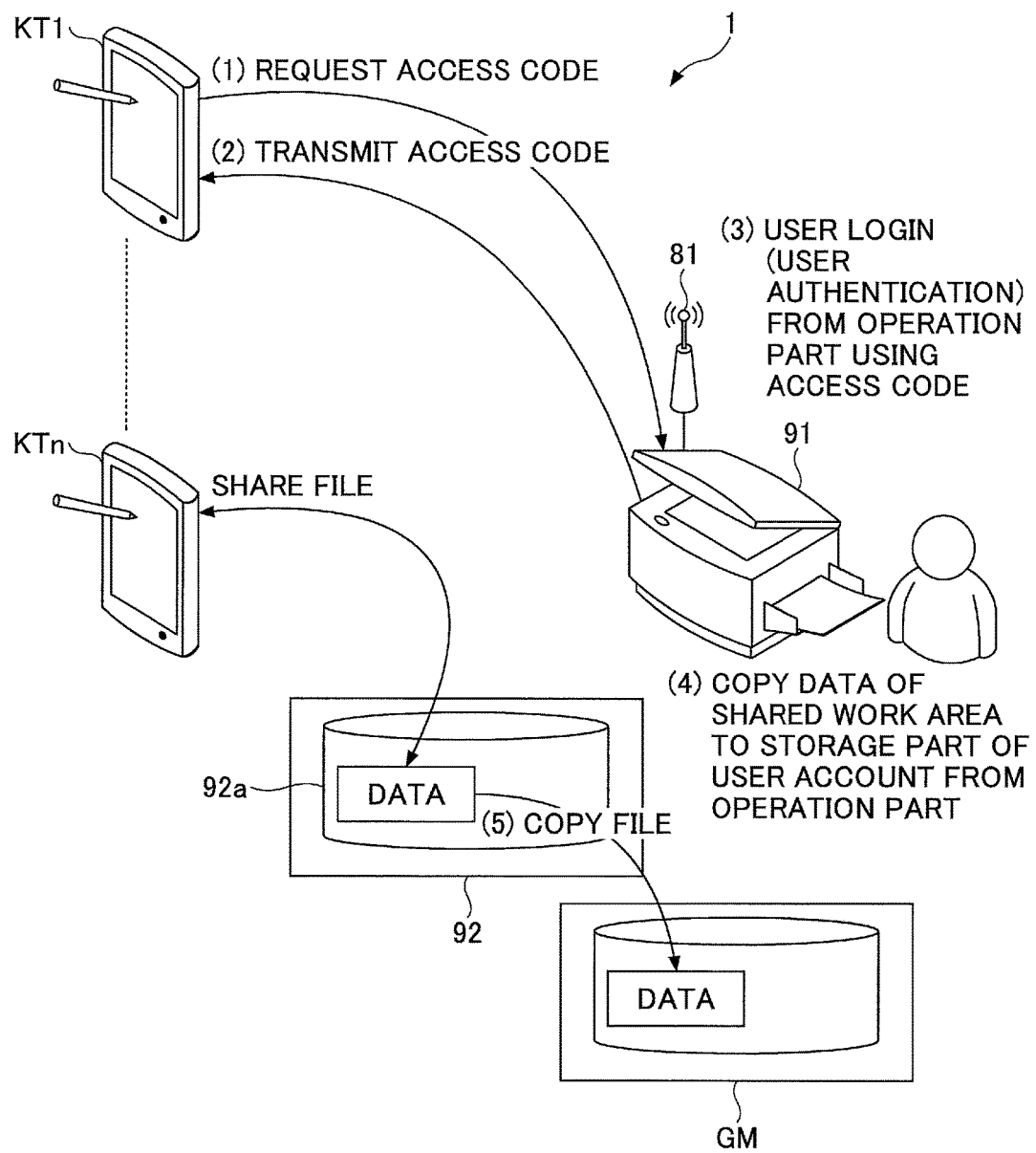
FIG. 44 illustrates a process of copying data stored in the shared storage area as a result of an electronic apparatus being operated.

Further, according to the conference system 1, as shown in FIG. 44, if one of the portable terminals KT1 through KTn of the user who has the access authority requests an access code for the electronic apparatus 91 ((1)), the access control part 87 transmits the access code to the one of the portable terminals KT1 through KTn ((2)). As a result of the user of the one of the portable terminals KT1 through KTn using the access code to operate the electronic apparatus 91, the user can copy data stored in the shared storage area 92a and store the copied data to another storage part GM, or the like, of the user himself or herself ((3), (4) and (5)).

Figure 45:
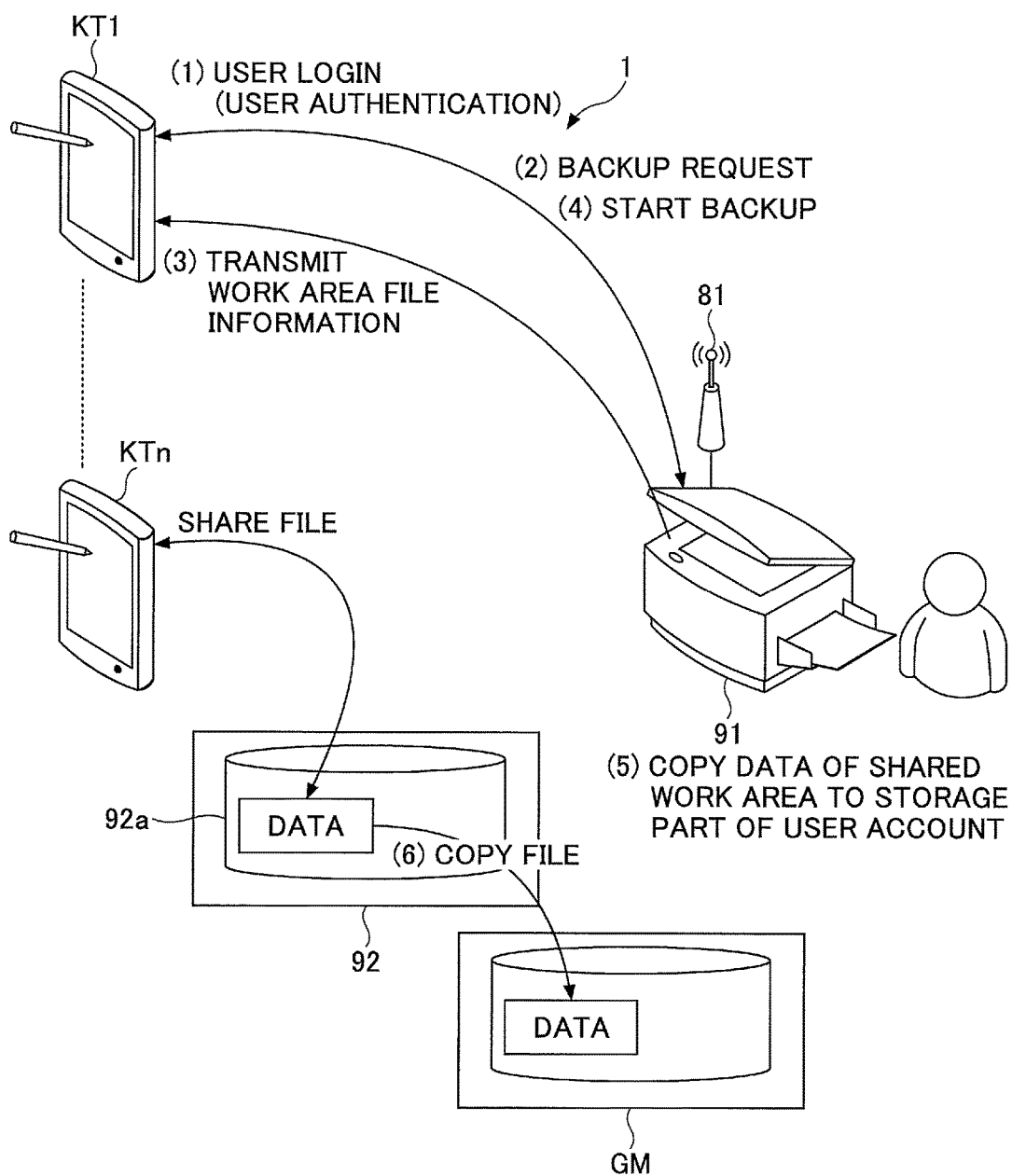
FIG. 45 illustrates a process of copying data stored in the shared storage area.

Also, according to the conference system 1, as shown in FIG. 45, if one of the portable terminals KT1 through KTn of the user who has the access authority requests to back up data stored in the shared storage area 92a to an external storage part GM of the user himself or herself, the access control part 87 copies designated data stored in the shared storage area 92a to the external storage part GM.

Figure 46:
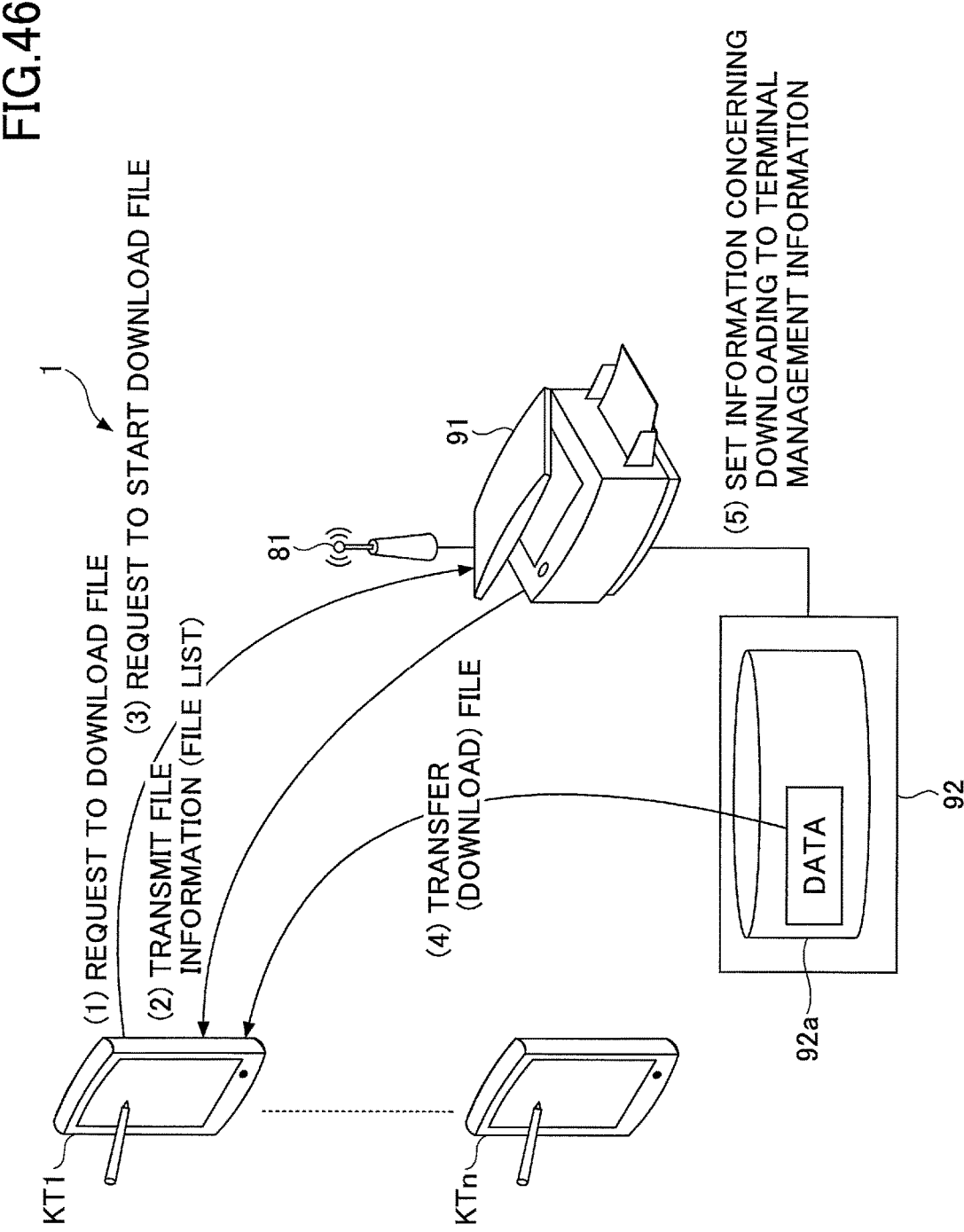
FIG. 46 illustrates a process of downloading data stored in the shared storage area.

Further, according to the conference system 1, as shown in FIG. 46, if one of the portable terminals KT1 through KTn of the user who has the access authority requests to download data stored in the shared storage area 92a ((1), (2) and (3)), the access control part 87 transfers designated data stored in the shared storage area 92a to the one of the portable terminals KT1 through KTn ((4) and (5)).

Figure 47:
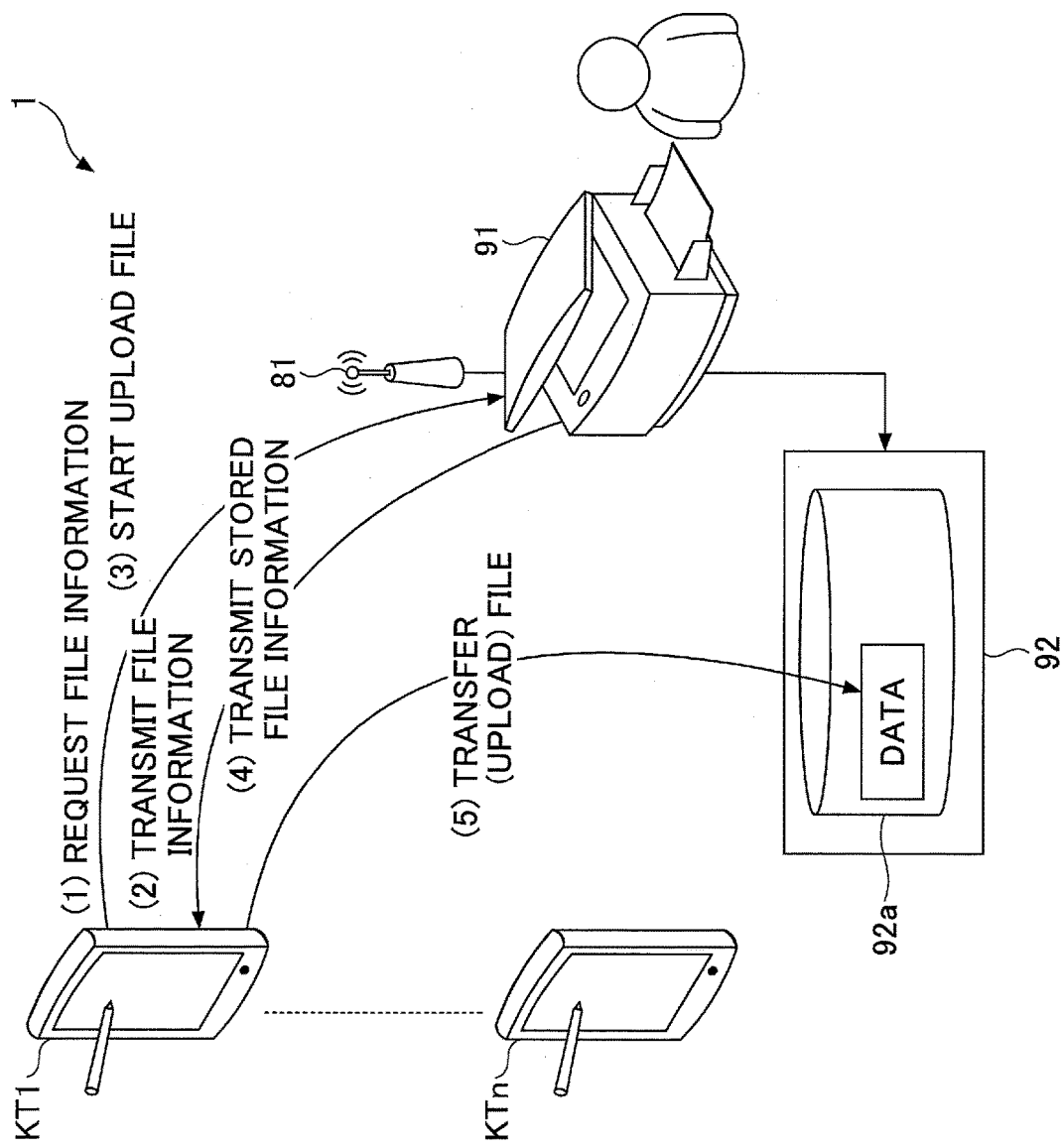
FIG. 47 illustrates a process of uploading data to the shared storage area.

Also, according to the conference system 1, as shown in FIG. 47, if one of the portable terminals KT1 through KTn of the user who has the access authority requests to upload data to the shared storage area 92a ((1), (2) and (3)), the access control part 87 permits data transfer to the shared storage area 92a ((4) and (5)).

Figure 48:
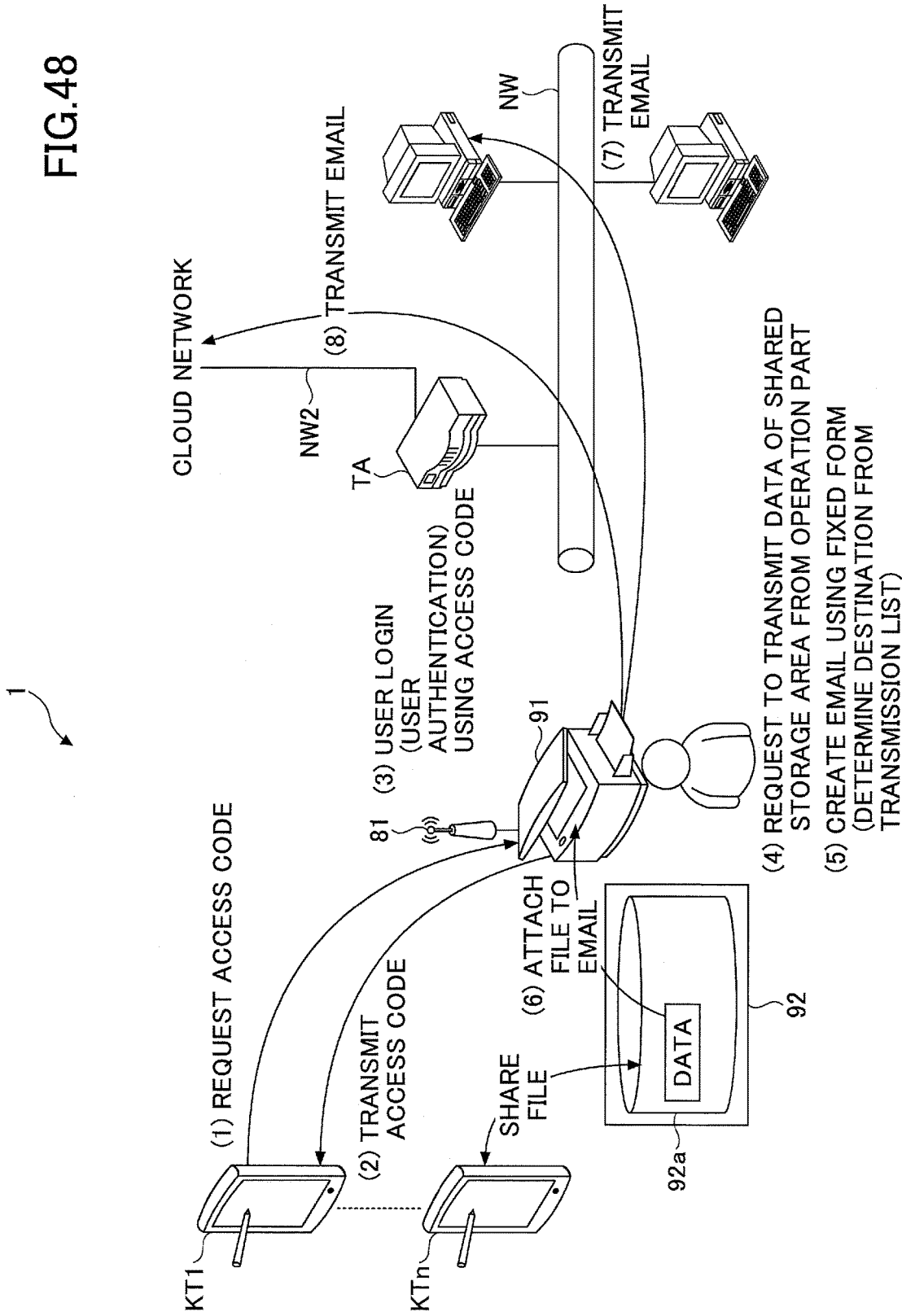
FIG. 48 illustrates a process of email transmission of data stored in the shared storage area to the outside.

Further, according to the conference system 1, as shown in FIG. 48, the user who has the access authority can operate the electronic apparatus 91 to transmit an email, to which data stored in the shared storage area 92a is attached. In this case, the user requests, using the corresponding one of the portable terminals KT1 through KTn, an access code ((1)). In response thereto, the access control part 87 transmits the access code to the corresponding one of the portable terminals KT1 through KTn ((2)). Then, as a result of the user using the access code ((3)) to operate the electronic apparatus 91 for transmitting an email ((4),(5)), to which data stored in the shared storage area 92a is attached, the access control part 87 transmits the email ((7)), to which the data is attached ((6)), to a designated email destination. In this case, the conference system 1 permits also email transmission ((8)) to an email destination in another network NW2, if the other network NW2 such as the Internet is connected to the network NW via a terminal adaptor TA.

Figure 49:
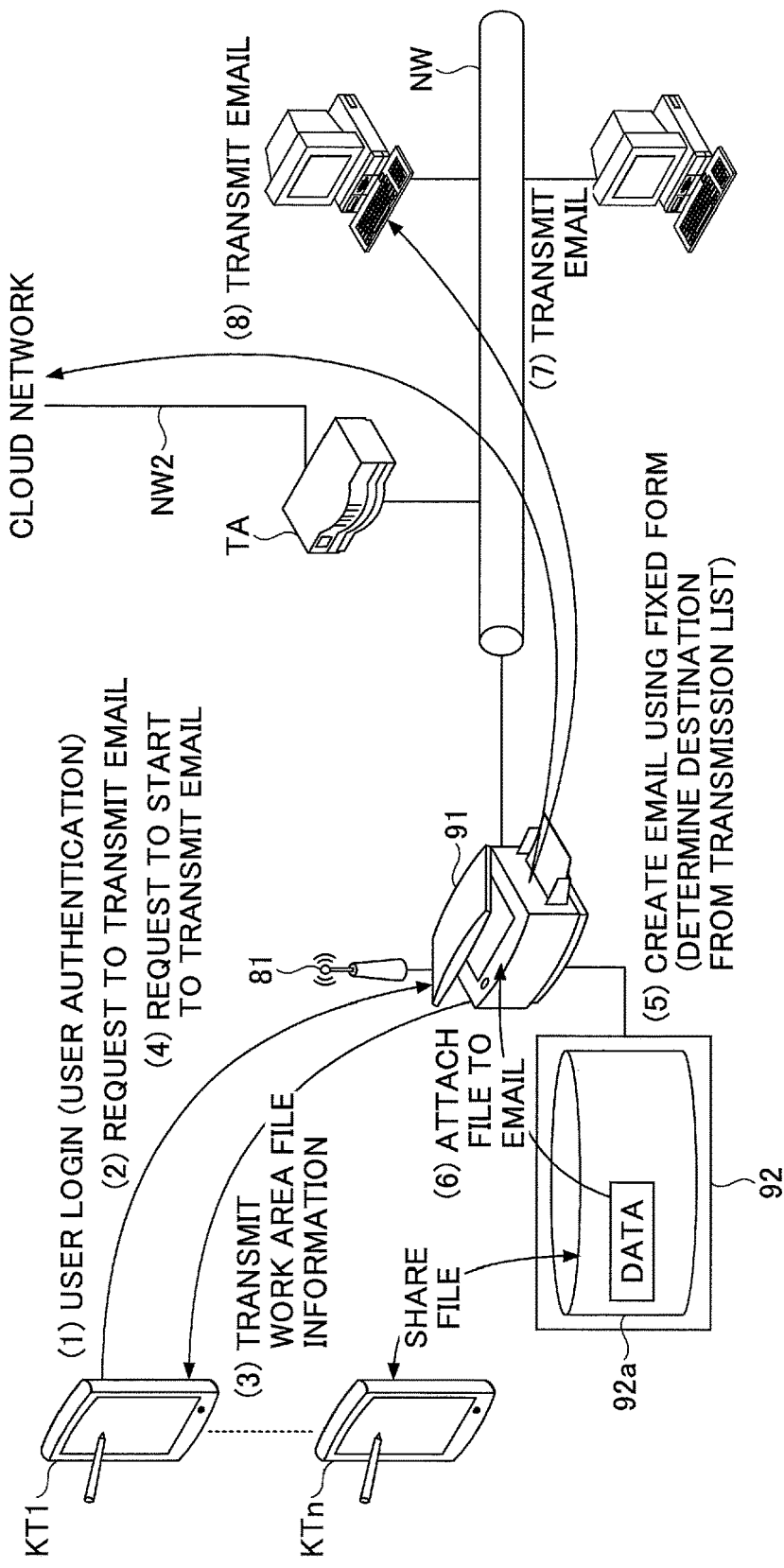
FIG. 49 illustrates a process of transmitting an email, to which data stored in the shared storage area is attached.

Also, according to the conference system 1, as shown in FIG. 49, if one of the portable terminals KT1 through KTn of the user who has the access authority requests to transmit an email, to which data stored in the shared storage area 92a is attached, the access control part 87 transmits the data to a designated email destination ((1) through (7)). In this case, the conference system 1 permits also email transmission ((8)) to an email destination in another network NW2, if the other network NW2 such as the Internet is connected to the network NW via a terminal adaptor TA.

Figure 50:
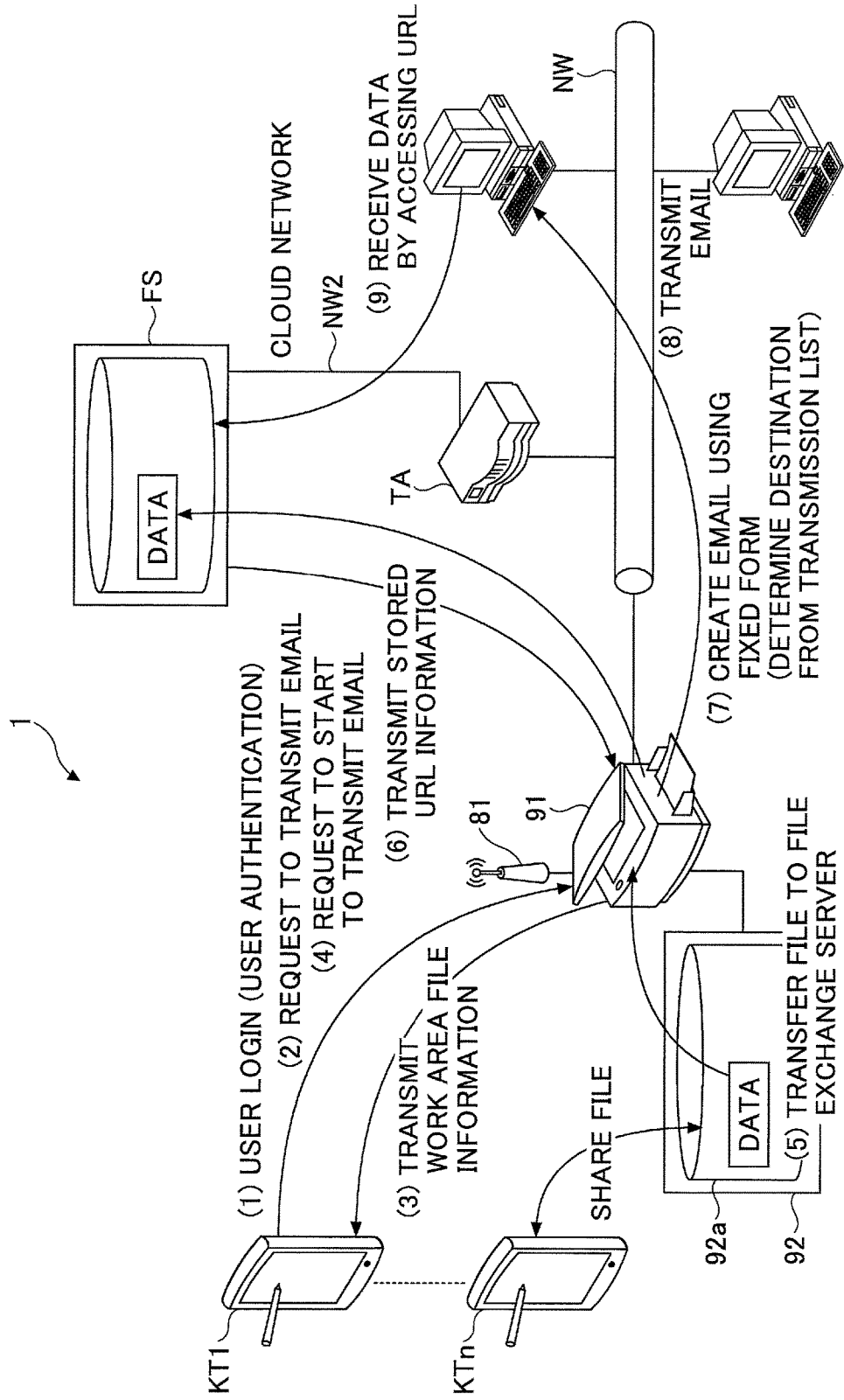
FIG. 50 illustrates a process of transferring data and email transmission of access information.

Further, according to the conference system 1, as shown in FIG. 50, when a cloud network NW2 is connected to the network NW, and a file exchange server FS is connected to the cloud network NW2, data transfer using the file exchange server FS can be carried out. For example, if one of the portable terminals KT1 through KTn of the user who has the access authority requests to transmit an email ("email transmission request") designating to use the file exchange server FS to transfer data stored in the shared storage area 92a, the access control part 87 transfers the designated data to the file exchange server FS ((1) through (5)). The file exchange server FS then sends information of its URL ((6)), at which the thus transferred data is stored. The access control part 87 then transmits an email to a destination that is designated in the email transmission request to transmit the URL of the file exchange server FS ((7) and (8)), at which the transferred data is stored. The destination apparatus that receives the email accesses the URL to acquire the data stored there ((9)).

Thus, the conference system 1 in the first embodiment is an information processing system, which includes at least one communications apparatus. The information processing system includes at least one processor, which can be configured to transmit, via a first network, connection information for a second network that is different from the first network to a plurality of terminal apparatuses (a first communications part); carry out communications with the terminal apparatuses via the second network based on the transmitted connection information (a second communications part); store respective items of terminal identification information for the terminal apparatuses, with which the communications are carried out via the second network (a storage part); determine whether the terminal apparatuses that are identified by the stored items of terminal identification information can carry out communications via the second network (a determination part); and when determining that the terminal apparatuses cannot carry out communications via the second network, carry out such control as to prevent the second network from being used to carry out communications (a control part).

Thus, wireless connection to the users' portable terminals KT1 through KTn that come into the short-range communications range of the short-range communications part 82 becomes possible, and control of communications with the wireless communications part 81 can be carried out based on the users and the terminal identification information. Also, even after wireless communications are permitted, access to the electronic apparatuses 91 and the shared storage area 92a can be controlled based on the users' access levels. As a result, it is possible to carry out wireless connection to the electronic apparatus 91 that is connected to the network NW in a state where the security is ensured and the convenience is satisfactory. It is also possible to permit wireless connection for a person such as a guest who does not perform wireless connection usually.

Also, the conference system 1 in the first embodiment is an information processing system, which includes at least one communications apparatus. The information processing system includes at least one processor, which can be configured to transmit, via a first network, connection information for a second network that is different from the first network to a plurality of terminal apparatuses (a first communications part); carry out communications with the terminal apparatuses via the second network based on the transmitted connection information (a second communications part); store respective items of terminal identification information for the terminal apparatuses, with which the communications are carried out via the second network (a storage part); determine whether the terminal apparatuses that are identified by the stored items of terminal identification information can carry out communications via the first network (a determination part); and when determining that the terminal apparatuses cannot carry out communications via the first network, carry out such control as to prevent the second network from being used to carry out communications (a control part).

Thus, wireless connection to the users' portable terminals KT1 through KTn that come into the short-range communications range of the short-range communications part 82 becomes possible, and control of communications with the wireless communications part 81 can be carried out based on the users and the terminal identification information. Also, even after wireless communications are permitted, access to the electronic apparatuses 91 and the shared storage area 92a can be controlled based on the users' access levels. As a result, it is possible to carry out wireless connection to the electronic apparatus 91 that is connected to the network NW in a state where the security is ensured and the convenience is satisfactory.

Further, the conference system 1 in the first embodiment is an information processing system, which includes at least one communications apparatus. The information processing system includes at least one processor, which can be configured to transmit, via a first network, connection information for a second network that is different from the first network to a plurality of terminal apparatuses (a first communications part); carry out communications with the terminal apparatuses via the second network based on the transmitted connection information (a second communications part); store respective items of terminal identification information for the terminal apparatuses, with which the communications are carried out via the second network (a storage part); determine whether the terminal apparatuses that are identified by the stored items of terminal identification information can carry out communications via the first network and via the second network; and when determining that the terminal apparatuses can carry out communications via either one of the first network and the second network but cannot carry out communications via the other or determining that the terminal apparatuses cannot carry out communications via the first network and cannot carry out communications via the second network, carry out such control as to prevent the second network from being used to carry out communications.

Thus, wireless connection to the users' portable terminals KT1 through KTn that come into the short-range communications range of the short-range communications part 82 becomes possible, and control of communications with the wireless communications part 81 can be carried out based on the users and the terminal identification information. Also, even after wireless communications are permitted, access to the electronic apparatuses 91 and the shared storage area 92a can be controlled based on the users' access levels. As a result, it is possible to carry out wireless connection to the electronic apparatus 91 that is connected to the network NW in a state where the security is ensured and the convenience is satisfactory.

Further, according to the conference system 1 in the first embodiment, the at least one processor can be further configured to, when determining that the respective terminal apparatuses cannot carry out communications via the first network and cannot carry out communications via the second network, carry out such control as to prevent the second network from being used to carry out communications (the control part).

As a result, it is possible to carry out wireless connection to the electronic apparatus 91 that is connected to the network NW in a state where the security is ensured and the convenience is satisfactory.

Further, the conference system 1 according to the first embodiment carries out an information processing method for an information processing system, which includes at least one communications apparatus. The information processing apparatus includes at least one memory. The information processing method can include transmitting, via a first network, connection information for a second network that is different from the first network to a plurality of terminal apparatuses; carrying out communications with the terminal apparatuses via the second network based on the transmitted connection information; storing, in the at least one memory, respective items of terminal identification information for the terminal apparatuses, with which the communications are carried out via the second network; determining whether the terminal apparatuses that are identified by the stored items of terminal identification information can carry out communications via the second network; and when determining that the terminal apparatuses cannot carry out communications via the second network, carrying out such control as to prevent the second network from being used to carry out communications.

Therefore, wireless connection to the users' portable terminals KT1 through KTn that come into the short-range communications range of the short-range communications part 82 becomes possible, and control of communications with the wireless communications part 81 can be carried out based on the users and the terminal identification information. Also, even after wireless communications are permitted, access to the electronic apparatuses 91 and the shared storage area 92a can be controlled based on the users' access levels. As a result, it is possible to carry out wireless connection to the electronic apparatus 91 that is connected to the network NW in a state where the security is ensured and the convenience is satisfactory.

Also, according to the conference system 1 in the first embodiment, the at least one processor can be further configured to, when determining that the terminal apparatuses cannot carry out communications via the second network, carry out such control as to prevent the second network from being used to carry out communications by changing the connection information for the second network (the control part).

Thus, by changing the connection information, it is possible to ensure proper communications and the security.

Further, according to the conference system 1 in the first embodiment, the at least one processor can be further configured to, when determining that the terminal apparatuses cannot carry out communications via the second network, carry out such control as to prevent the second network from being used to carry out communications by deleting the connection information for the second network (the control part).

Therefore, when all the portable terminals KT1 through KTn that have participated in a communications unit such as a conference have moved outside the communications range, it is possible to determine that the communications unit is finished to delete the communications information, for example. Thus, it is possible to simply and easily carry out finishing a communications unit and ensure the safety of the communications.

Also, according to the conference system 1 in the first embodiment, the at least one processor can be further configured to, when determining that the terminal apparatuses cannot carry out communications via the second network, carry out such control as to not receive a request from a terminal apparatus which carries out communications via the second network based on the connection information for the second network (the control part).

Therefore, it is possible to safely manage communications information for a communications unit, and it is possible to further improve the safety of the communications easily.

Further, according to the conference system 1 in the first embodiment, the at least one processor can be further configured to, when determining that the terminal apparatuses cannot carry out communications via the second network, carry out such control as to not transmit, to another apparatus, information that is transmitted via the second network based on the connection information for the second network (the control part).

Therefore, it is possible to further improve the safety of communications easily.

Also, according to the conference system 1 in the first embodiment, the at least one processor can be further configured to use at least one storage area accessible depending on an access level, and store, for each item of the terminal identification information, user identification information to be used to identify a user, and the access level of the user, in a manner of associating them with one another, and control access to one of the at least one storage area from one of the terminal apparatuses, based on the access level that is stored in association with the item of terminal identification information of the one of the terminal apparatuses and the access level of the one of the at least one storage area (an access control part).

Therefore, for example, it is possible to manage conference participants, and so forth, based on the access levels of the conference participants. Thus, it is possible to ensure the security and further improve the convenience.

Further, according to the conference system 1 in the first embodiment, the at least one processor can be further configured to, in response to a request from the user who has the highest access level, for whom the user identification information is stored, change at least the stored access levels or the items of terminal identification information (the changing part).

Therefore, for example, a user such as a conference administrator, who has the high access level, can appropriately increase the conference participants, changes the participants' access levels, or the like. Thus, it is possible to further improve the convenience.

Also, according to the conference system 1 in the first embodiment, the controlled access to the at least one storage area from one of the terminal apparatuses can include writing data in the at least one storage area, reading data from the at least one storage area, and editing data in the at least one storage area.

Therefore, it is possible to improve the safety of information, and improve the convenience.

Further, according to the conference system 1 in the first embodiment, the at least one processor can be further configured to carry out communications with at least one electronic apparatus via the second network (the second communications part), and control, based on the access level, access to the at least one electronic apparatus, at least for each of the at least one electronic apparatus or each function of the at least one electronic apparatus (the access control part).

Therefore, it is possible to improve the safety of information, and improve the convenience.

Concerning the first embodiment, the case has been described where the network NW is provided for the single conference room R. However, the networks NW can be provided for a plurality of the conference rooms R.

Figure 51:
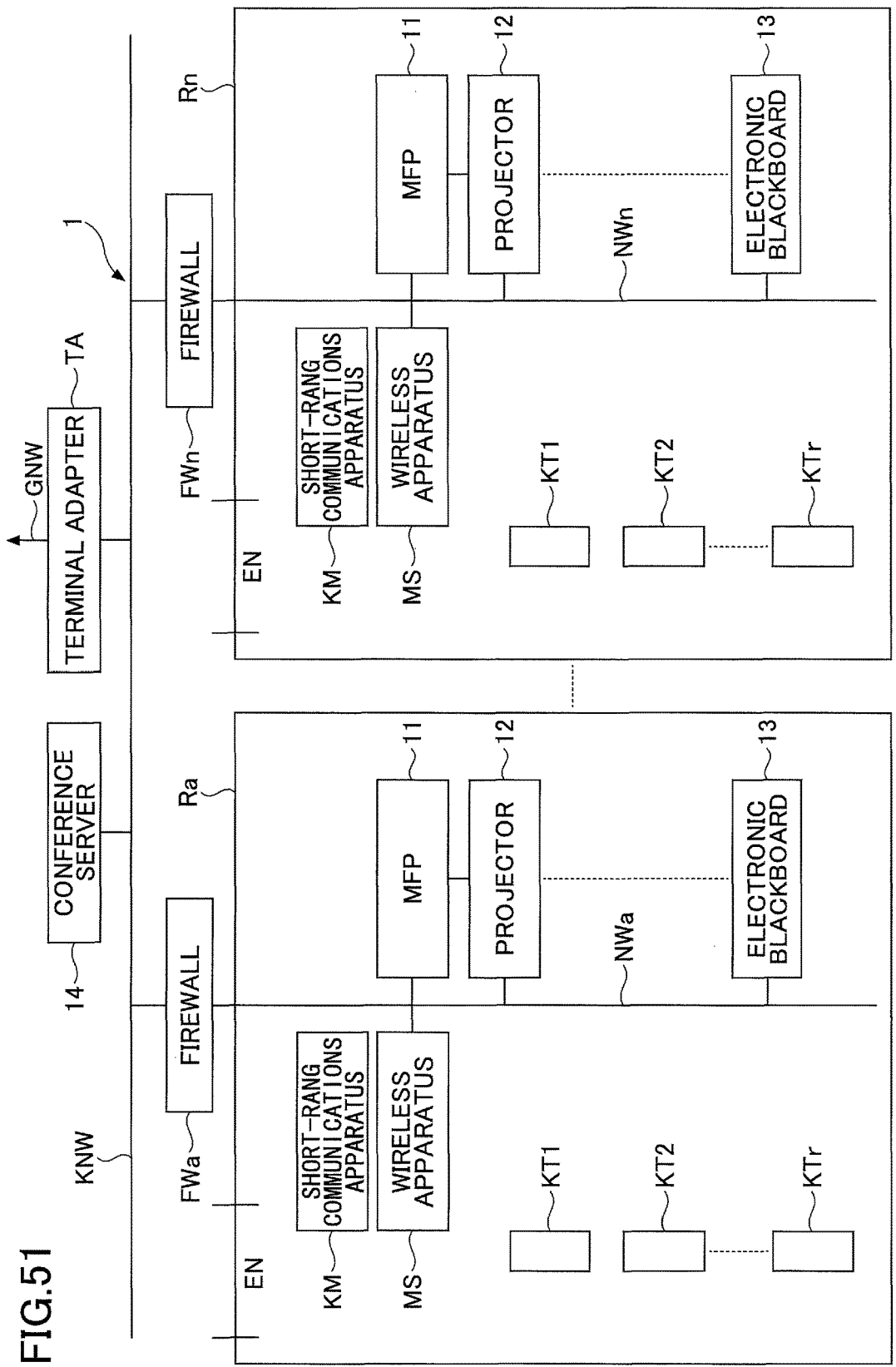
FIG. 51 is a configuration diagram of another conference system.

For example, a conference system 200 as shown in FIG. 51 can be used. In the conference system 200, a plurality of conference rooms Ra through Rn have networks NWa through NWn, respectively. The networks NWa through NWn are connected to a backbone network KNW via firewall FWa through FWn, respectively. In the conference system 200, a conference server 14 and a terminal adaptor TA are connected to the backbone network KNW, the terminal adaptor TA is connected to an external network GNW such as the Internet. In the conference system 200, electronic apparatuses DK such as a short-range communications part KM, a wireless apparatus MS, an MFP 11, a projector 12, an electronic blackboard 12, and so forth, are connected to each of the networks NWa through NWn of the corresponding one of the conference rooms Ra through Rn. In the conference system 200, portable terminals KT1 through KTr of users who come into the conference rooms Ra through Rn carry out communications with the short-range communications parts KM and the wireless apparatus MS. Thus, it is possible to implement a conference using the electronic apparatuses DK.

Also in the conference system 200, information processing can be carried out in the same way as described above for the first embodiment.

As a result, for each of the conference rooms R, communications information and access levels can be determined for each conference. Thus, it is possible to carry out conferences using the electronic apparatuses 91 and the portable terminals KT1 through KTr in a state where the security is ensured and the convenience is satisfactory.

Next, the above-described process to control communications permission/denial using the communications permission/denial control part 84 (the wireless apparatus MS) based on the terminal identification information in a case where a plurality of short-range communications apparatuses KM are provided, for example, as shown in FIG. 51, will now be described with reference to FIGS. 52 and 53.

The communications permission/denial control part 84 controls as to whether to transmit, to a terminal, the connection information of the second network that is provided by the wireless communications part 81 (for example, the wireless access point) depending on the distance between the short-range communications part 82 (a first communications part) and the terminal.

The communications permission/denial control part 84 determines (sets) information for the above-mentioned distance, for each of a plurality of the short-range communications parts 82 (the short-range communications apparatus KM or the first communications part). Thus, it is possible to make the settings depending on situations such as the sizes of the rooms where the short-range communications apparatuses KM are placed.

When the communications permission/denial control part 84 transmits the connection information of the second network, it previously stores the identification information of the terminal apparatuses, to which the connection information of the second network is transmitted. Then, the communications permission/denial control part 84 carries out such control as to prevent the terminal apparatuses that have the items of identification information that are not stored from carrying out communications via the second network. Thus, it is possible to control as to whether to permit communications depending on a range, within which the terminal apparatuses are present. Thus, it is possible to further improve the security.

Figure 52:
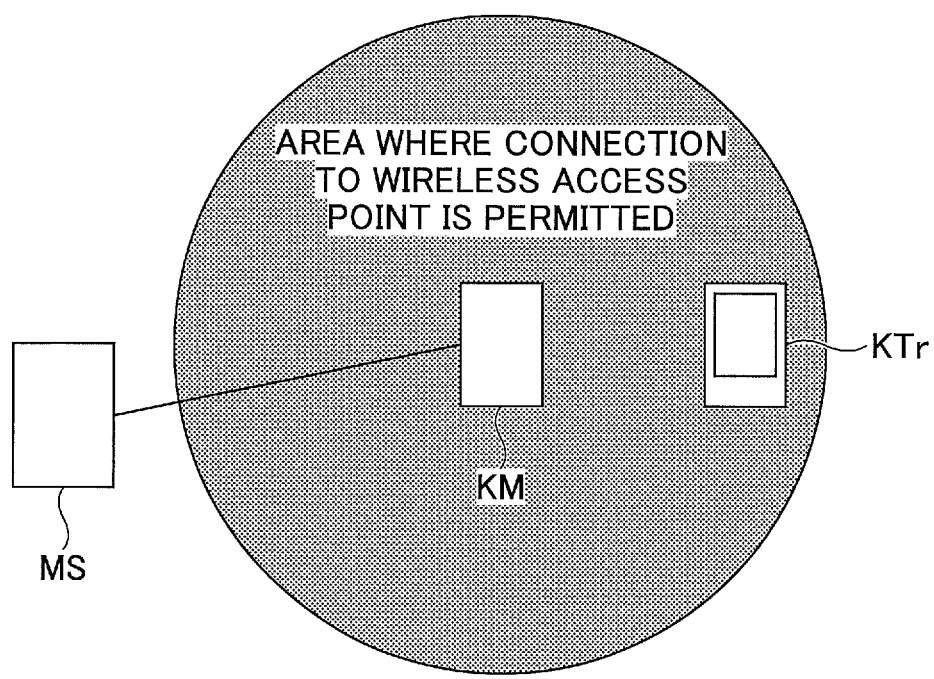
FIG. 52 illustrates a range of positions of portable terminals, for which communications are permitted.

FIG. 52 illustrates a range of positions of the portable terminals KT1 through KTr, for which the communications permission/denial control part 84 permit communications. As shown in FIG. 52, the communications permission/denial control part 84 permits communications for the portable terminals KT1 through KTr that are present within a predetermined range with respect to the position of the short-range communications part 82 (the short-range communications apparatus KM), for example, a range where short-range wireless communications such as Bluetooth can be carried out with a signal intensity (electric wave intensity, i.e., RSSI) of a predetermined threshold or more. As described above, after the communications permission/denial control part 84 thus permits the portable terminals KT1 through KTr to carry out communications, it transfers, to the access control part 87, the respective items of terminal identification information of the portable terminals, for which communications are thus permitted.

FIG. 53 is a sequence diagram that illustrates a process to control communications permission/denial by the communications permission/denial control part 84. Below, a description will be made referring any one of the portable terminals KT1 through KTr as a "portable terminal KT11".

First, by operating an operation part of a predetermined external terminal, the wireless apparatus MS, or the like, the administrator determines, for the identification information of each short-range communications part 82 (each short-range communications apparatus KM), a threshold corresponding to the distance of short-rang wireless communications, for example, a threshold for a signal intensity to be used to determine whether to permit communications from the portable terminals KT1 through KTr, which have approached the short-range communications part 82 (step S1101).

The communications permission/denial control part 84 stores the thresholds that are thus set in a manner of being associated with the respective items of identification information of the short-range communications parts 82 (the short-range communications apparatuses KM) (step S1102).

The portable terminal KT11 transmits, in step S7 of FIG. 10, to the short-range communications part 82, a short-range wireless signal that includes the terminal identification information (ID) such as the MAC address of the portable terminal KT11 (step S1103).

The short-range communications part 82, in step S8 of FIG. 10, sends information that includes the terminal identification information included in the received short-range wireless signal, the signal intensity of the received short-range wireless signal, and the identification information of the short-range communications part 82 to the communications permission/denial control part 84 (step S1104). The identification information of the short-range communications part 82 can be, for example, the MAC address of the short-range communications part 82.

The communications permission/denial control part 84 determines whether the signal intensity included in the received information is greater than or equal to the threshold that is set in step S1102 corresponding to the short-range communications part (step S1105).

If the signal intensity is greater than or equal to the threshold that is thus previously set, the communications permission/denial control part 84 determines that the distance between the portable terminal KT11 and the short-range communications part 82 is smaller than the predetermined distance, and stores the terminal identification information of the portable terminal KT11 in a connection permission list (step S1106). If the signal intensity included in the received information is less than the threshold that is previously set, the communications permission/denial control part 84 does not store the terminal identification information of the portable terminal KT11 in the connection permission list, for example, and finishes the current process.

Then, in step S9 of FIG. 10, the communications permission/denial control part 84 sends the SSID and the password to the short-range communications part 82 (step S1107).

In step S10 of FIG. 10, the short-range communications part 82 sends the SSID and the password to the portable terminal KT11 (step S1108).

In step S11 of FIG. 10, the portable terminal KT11 sends a connection request to the communications permission/denial control part 84 (step S1109).

The communications permission/denial control part 84 determines whether the terminal identification information of the portable terminal KT11 included in the received connection request is included in the connection permission list (step S1110).

If the terminal identification information of the portable terminal KT11 is included in the connection permission list, the communications permission/denial control part 84 permits communications, and transfers, to the access control part 87, information that indicates the terminal identification information of the portable terminal KT11, for which communications are thus permitted (step S111). If the terminal identification information of the portable terminal KT11 is not included in the connection permission list, the communications permission/denial control part 84 does not permit communications, and, for example, returns an error response to the portable terminal KT11.

The short-range communications part 82 can periodically monitor the signal intensity between the short-range communications part 82 and the portable terminal KT11, for example. Then, in the above-described step S1104, The short-range communications part 82 can send the corresponding information to the communications permission/denial control part 84. In this case, the communications permission/denial control part 84 deletes the terminal identification information of the portable terminal KT11 from the connection permission list if, in step S1105 described above, the signal intensity included in the received information is less than the above-mentioned threshold. Thus, it is possible to avoid improper connection from a terminal, which connected to the wireless access point previously.

Thus, the information processing systems and the information processing methods have been described in the embodiments. However, application of the present disclosure is not limited to the embodiments, and various modifications and replacements can be made.

According to the present disclosure, it is possible to carry out wireless connection to electronic apparatuses connected to a network in a state of improving the convenience while ensuring the security.

What is claimed is:
1. An information processing system comprising at least one processor and a plurality of terminal apparatuses, the at least one processor being configured to:
transmit, via a first network, connection information for a second network that is different from the first network to the file plurality of terminal apparatuses;
carry out communications with the terminal apparatuses via the second network based on the transmitted connection information;
store a respective item of terminal identification information for each of the terminal apparatuses, with which the communications are carried out via the second network;
determine whether the terminal apparatuses that are identified by the stored items of terminal identification information can carry out communications via the second network;
when determining that the terminal apparatuses cannot carry out communications via the second network, carry out such control as to prevent the second network from being used to carry out communications;
store, for each of the items of terminal identification information, a user identification item that identifies a user associated with the respective item of terminal identification information, and an access level identification item that indicates whether the user has permission to use an electronic apparatus that is connected to the information processing system through the second network; wherein an item of terminal identification information, the user identification item, and the access level identification item are stored in association with each other for each user;
permit and deny access to the electronic apparatus by each of the terminal apparatuses, according to a respective access level identification items associated with the terminal identification information items that identify the respective terminal apparatuses;
permit and deny access to a storage area by each of the terminal apparatuses, according to the respective access level identification items associated with the terminal identification information items that identify the respective terminal apparatuses;
in response to a request from the user associated with the access level identification item that corresponds to a highest access level that is stored, change at least the stored access level identification items or the stored items of terminal identification information;
determine whether it is possible to acquire a user list, when a user list acquisition request is received; and
send the user list to a first terminal apparatus among the plurality of terminal apparatuses, when user list acquisition authority exists; and
the first terminal apparatus being configured to:
display a user terminal list screen on the first terminal apparatus; and
change an access authority upon receiving an access authority change request from a user configured to changing access authority.

2. The information processing system as claimed in claim 1, wherein
the at least one processor is further configured to when determining that the terminal apparatuses cannot carry out communications via the second network, carry out such control as to prevent the second network from being used to carry out communications by changing the connection information for the second network.

3. The information processing system as claimed in claim 1, wherein the at least one processor is further configured to when determining that the terminal apparatuses cannot carry out communications via the second network, carry out such control as to prevent the second network from being used to carry out communications by deleting the connection information for the second network.

4. The information processing system as claimed in claim 1, wherein the at least one processor is further configured to when determining that the terminal apparatuses cannot carry out communications via the second network, carry out such control as to not receive a request from one of the terminal apparatuses, which carries out communications via the second network based on the connection information for the second network.

5. The information processing system as claimed in claim 1, wherein
the at least one processor is further configured to when determining that the terminal apparatuses cannot carry out communications via the second network, carry out such control as to not transmit, to another apparatus, information that is transmitted via the second network based on the connection information for the second network.

6. The information processing system as claimed in claim 1, wherein the access to the storage area by each of the terminal apparatuses includes access to write data in the storage area, access to read data from the storage area, and access to edit data in the storage area.

7. The information processing system as claimed in claim 1, wherein the at least one processor is further configured to permit and deny access by each of the terminal apparatuses to each function of the electronic apparatus, according to the respective access level identification items associated with the terminal identification items that identify the respective terminal apparatuses.

8. The information processing system as claimed in claim 1, wherein the at least one processor is further configured to determine whether to transmit or not transmit the connection information of the second network to a terminal apparatus, according to a distance between the processor and the terminal apparatus.

9. The information processing system as claimed in claim 8, wherein the at least one processor is further configured to determine the distance between the processor and the terminal apparatus.

10. The information processing system as claimed in claim 9, wherein the at least one processor is further configured to if the respective terminal apparatuses are determined as not being able to carry out communications via the first network and not being able to carry out communications via the second network, carry out such control as to prevent the terminal apparatuses from carrying out communications via the second network.

11. The information processing system as claimed in claim 8, wherein the at least one processor is further configured to store the items of terminal identification information of terminal apparatuses, to which the connection information of the second network is transmitted, and prevent terminal apparatuses, whose items of terminal identification information are not stored, from carrying out communications via the second network.

12. An information processing system
comprising at least one processor and a plurality of portable terminals, the at least one processor being configured to:
transmit, via a first network, connection information for a second network that is different from the first network to a plurality of portable terminals;
carry out communications with the portable terminals via the second network based on the transmitted connection information;
store a respective item of terminal identification information for each of the portable terminals, with which the communications are carried out via the second network;
determine whether the terminal apparatuses that are identified by the stored items of terminal identification information can carry out communications via the first network;
when determining that the terminal apparatuses cannot carry out communications via the first network, carry out such control as to prevent the second network from being used to carry out communications;
store, for each of the items of terminal identification information, a user identification item that identifies a user associated with the respective item of terminal identification information, and an access level identification item that indicates whether the user has permission to use an electronic apparatus that is connected to the information processing system through the second network; wherein an item of terminal identification information, the user identification item, and the access level identification item are stored in association with each other for each user;
permit and deny access to the electronic apparatus by each of the portable terminals, according to a respective access level identification items associated with the terminal identification information items that identify the respective portable terminals;
permit and deny access to a storage area by each of the portable terminals, according to the respective access level identification items associated with the terminal identification information items that identify the respective portable terminals:
in response to a request from the user associated with the access level identification item that corresponds to a highest access level that is stored, change at least the stored access level identification items or the stored items of terminal identification information;
determine whether it is possible to acquire a user list, when a user list acquisition request is received;
send the user list to a first portable terminal among the plurality of portable terminals, when user list acquisition authority exists; and the first portable terminal being configured to:
display a user terminal list screen on the first portable terminal; and
change an access authority upon receiving an access authority change request from a user configured to changing access authority.

13. An information processing method for an information processing system, which comprises at least one communications apparatus and a plurality of terminal apparatuses, the at least one communications apparatus comprising at least one memory having a storage area, the information processing method comprising:
transmitting, via a first network, connection information for a second network that is different from the first network to a plurality of terminal apparatuses;
carrying out communications with the terminal apparatuses via the second network based on the transmitted connection information;
storing, in the at least one memory, a respective item of terminal identification information for each of the terminal apparatuses;
determining whether the terminal apparatuses that are identified by the items of terminal identification information stored in the at least one memory can carry out communications via the second network;

when determining that the terminal apparatuses cannot carry out communications via the second network, carrying out such control as to prevent the second network from being used to carry out communications;

storing, for each of the items of terminal identification information, a user identification item that identifies a user associated with the respective item of terminal identification information, and an access level identification item that indicates whether the user has permission to use an electronic apparatus that is connected to the information processing system through the second network; wherein an item of terminal identification information, the user identification item, and the access level identification item are stored in association with each other for each user; and permitting and denying access to the electronic apparatus by each of the terminal apparatuses, according to a respective access level identification items associated with the terminal identification information items that identify the respective terminal apparatuses;

permitting and denying access to the storage area by each of the terminal apparatuses, according to the respective access level identification items associated with the terminal identification information items that identify the respective terminal apparatuses;

in response to a request from the user associated with the access level identification item that corresponds to a highest access level that is stored, changing at least the stored access level identification items or the stored items of terminal identification information;

determining whether it is possible to acquire a user list, when a user list acquisition request is received;

sending the user list to a first terminal apparatus among the plurality of terminal apparatuses, when user list acquisition authority exists:

displaying a user terminal list screen on the first terminal apparatus: and changing an access authority upon receiving an access authority change request from a user configured to changing access authority.

14. The information processing method as claimed in claim 13, further comprising:

when determining that the terminal apparatuses cannot carry out communications via the second network, carrying out such control as to prevent the second network from being used to carry out communications by changing the connection information for the second network.

15. The information processing method as claimed in claim 13, further comprising:

when determining that the terminal apparatuses cannot carry out communications via the second network, carrying out such control as to prevent the second network from being used to carry out communications by deleting the connection information for the second network.

16. The information processing method as claimed in claim 13, further comprising:

when determining that the terminal apparatuses cannot carry out communications via the second network, carrying out such control as to not receive a request from one of the terminal apparatuses, which carries out communications via the second network based on the connection information for the second network.

17. The information processing method as claimed in claim 13, further comprising:

when determining that the terminal apparatuses cannot carry out communications via the second network, carrying out such control as to not transmit, to another apparatus, information that is transmitted via the second network based on the connection information for the second network.

* * * * *